United States Patent
Weiss et al.

(10) Patent No.: US 12,510,770 B2
(45) Date of Patent: Dec. 30, 2025

(54) LENSES AND METHODS FOR AFFECTING THE PROGRESSION OF MYOPIA

(71) Applicant: SHAMIR OPTICAL INDUSTRY LTD., Kibbutz Shamir (IL)

(72) Inventors: Atalia Weiss, Hoshaya (IL); Liron Gleser, Rosh Pina (IL)

(73) Assignee: SHAMIR OPTICAL INDUSTRY LTD., Kibbutz Shamir (IL)

( * ) Notice: Subject to any disclaimer, the term of this patent is extended or adjusted under 35 U.S.C. 154(b) by 414 days.

(21) Appl. No.: 18/041,008

(22) PCT Filed: Aug. 8, 2021

(86) PCT No.: PCT/IL2021/050961
§ 371 (c)(1),
(2) Date: Feb. 8, 2023

(87) PCT Pub. No.: WO2022/034577
PCT Pub. Date: Feb. 17, 2022

(65) Prior Publication Data
US 2023/0288730 A1 Sep. 14, 2023

Related U.S. Application Data

(60) Provisional application No. 63/152,371, filed on Feb. 23, 2021, provisional application No. 63/063,430, filed on Aug. 10, 2020.

(51) Int. Cl.
*G02C 7/06* (2006.01)
*A61B 3/103* (2006.01)
(Continued)

(52) U.S. Cl.
CPC ............ *G02C 7/06* (2013.01); *A61B 3/103* (2013.01); *G02C 7/027* (2013.01); *G16H 50/30* (2018.01); *G02C 2202/24* (2013.01)

(58) Field of Classification Search
None
See application file for complete search history.

(56) References Cited

U.S. PATENT DOCUMENTS 7,025,460 B2 * 4/2006 Smitth ............... G02C 7/04
351/205
7,803,153 B2 * 9/2010 Thorn ............... G02C 7/04
606/5

(Continued)

FOREIGN PATENT DOCUMENTS

CN 101686801 A 3/2010
CN 104090380 A 10/2014
(Continued)

OTHER PUBLICATIONS

Atowa UC, Wajuihian SO, Munsamy AJ. Associations between near work, outdoor activity, parental myopia and myopia among school children in Aba, Nigeria. Int J Ophthalmol 2020;13(2):309-316.
(Continued)

*Primary Examiner* — Darryl J Collins
(74) *Attorney, Agent, or Firm* — FisherBroyles, LLP; Roger L. Browdy; James E. Mrose

(57) ABSTRACT

The presently disclosed subject-matter relates to an ophthalmic lens for affecting the progression of myopia in an eye of an individual having a certain prescription (Rx). In one aspect, the presently disclosed subject-matter refers to a customization of the optical property profile based on the age and conventional prescription of an individual. According to another aspect of the presently disclosed subject-matter, a process in which the customization is performed inter alia by correlating between the conventional prescription and the peripheral optical property at the temporal and/or nasal retina is proposed. According to another aspect
(Continued)

of the presently disclosed subject-matter an asymmetric myopia control lens with cylinder customization is provided.

18 Claims, 28 Drawing Sheets

(51) Int. Cl.
    *G02C 7/02*     (2006.01)
    *G16H 50/30*     (2018.01)

(56) References Cited

U.S. PATENT DOCUMENTS

| | | |
|---|---|---|
| 2011/0313058 A1 | 12/2011 | Neitz |
| 2012/0281183 A1* | 11/2012 | Mousset .............. G02C 13/005 351/159.77 |
| 2019/0155055 A1* | 5/2019 | Lin ....................... G02C 7/041 |

FOREIGN PATENT DOCUMENTS

| | | |
|---|---|---|
| CN | 105445959 A | 3/2016 |
| CN | 106714731 A | 5/2017 |
| CN | 110785113 A | 2/2020 |
| JP | 2008067834 A | 3/2008 |
| WO | 2008/131479 A1 | 11/2008 |
| WO | 2010/103160 A1 | 9/2010 |
| WO | 2015/177651 A1 | 11/2015 |
| WO | 2017/222421 A1 | 12/2017 |
| WO | 2018/195600 A1 | 11/2018 |
| WO | 2019178862 A1 | 9/2019 |

OTHER PUBLICATIONS

Bullimore MA, Richdale K. "Myopia Control 2020: Where Are We and Where Are We Heading?". Ophthalmic Physiol Opt ;40(3):254-270. 2020.

Flitcroft DI: "The complex interactions of retinal, optical and environmental factors in myopia aetiology", Progress in Retinal and Eye Research, vol. 31, No. 6, Jul. 4, 2012 (Jul. 4, 2012), pp. 622-660, XP028945787, ISSN: 1350-9462, DOI: 10.1016/J.PRETEYERES.2012.06.004.

Hasebe Satoshi et al: "Myopia ControlWith Positively Aspherized Progressive Addition Lenses: A 2-Year, Multicenter, Randomized, Controlled Trial", Investigative Opthalmology & Visual Science, vol. 55, No. 11, Nov. 3, 2014 (Nov. 3, 2014), p. 7177, XP055881192, US; ISSN: 1552-5783, DOI: 10.1167/iovs.12-11462 abstract; figure 5.

Jiang X, Tarczy-Hornoch K, Cotter SA, et al. Association of Parental Myopia With Higher Risk of Myopia Among Multiethnic Children Before School Age. JAMA Ophthalmol. 2020;138(5):501-509. doi:10.1001/jamaophthalmol.2020.0412.

Kang P, et al. Peripheral Refraction in Different Ethnicities 2010. Investigative Ophthalmology & Visual Science, vol. 51, No. 11.

Mutti DO, Hayes JR, Mitchell GL, Jones LA, Moeschberger ML, Cotter SA, Kleinstein RN, Manny RE, Twelker JD, Zadnik K, Cleere Study Group. "Refractive Error, Axial Length, and Relative Peripheral Refractive Error Before and After the Onset of Myopia". Invest Ophthalmol Vis Sci 48(6):2510-2509, 2007.

Tang S.M, et al. Independent Influence of Parental Myopia on Childhood Myopia in a Dose-Related Manner in 2,055 Trios: The Hong Kong Children Eye Study. Am J Ophthalmol 2020; 218:199-207.

* cited by examiner

LENSES AND METHODS FOR AFFECTING THE PROGRESSION OF MYOPIA

TECHNOLOGICAL FIELD

This relates to lenses and methods for affecting the progression of myopia and more particularly to configuring an ophthalmic lens to affect the progression of myopia.

BACKGROUND ART

References considered to be relevant as background to the presently disclosed subject matter are listed below:
1. International Publication No. WO 2010/103160.
2. International Publication No. WO 2017/222421.
3. International Publication No. WO 2018/195600.
4. Mutti D O, Hayes J R, Mitchell G L, Jones L A, Moeschberger M L, Cotter S A, Kleinstein R N, Manny R E, Twelker J D, Zadnik K, CLEERE Study Group. "Refractive Error, Axial Length, and Relative Peripheral Refractive Error Before and After the Onset of Myopia". Invest Ophthalmol Vis Sci 48(6):2510-2509, 2007.
5. Bullimore M A, Richdale K. "Myopia Control 2020: Where Are We and Where Are We Heading?". Ophthalmic Physiol Opt; 40(3):254-270. 2020.
6. Jiang X, Tarczy-Hornoch K, Cotter S A, et al. Association of Parental Myopia With Higher Risk of Myopia Among Multiethnic Children Before School Age. JAMA Ophthalmol. 2020; 138(5): 501-509. doi:10.1001/jamaophthalmol2020.0412.
7. Atowa U C, Wajuihian S O, Munsamy A J. Associations between near work, outdoor activity, parental myopia and myopia among school children in Aba, Nigeria. Int J Ophthalmol 2020; 13(2):309-316.
8. Tang S. M, et al. Independent Influence of Parental Myopia on Childhood Myopia in a Dose-Related Manner in 2,055 Trios: The Hong Kong Children Eye Study. Am J Ophthalmol 2020; 218:199-207.
9. Kang P, et al. Peripheral Refraction in Different Ethnicities 2010. Investigative Ophthalmology & Visual Science, Vol. 51, No. 11

Acknowledgement of the above references herein is not to be inferred as meaning that these are in any way relevant to the patentability of the presently disclosed subject matter.

BACKGROUND

Near-sightedness, also known as myopia, is a condition of the eye where light from distant objects focuses in front of, instead of on, the retina. This causes distant objects to be seen blurry by the observer, while near objects appear normal. Other symptoms may include headaches and eye strain whereas severe near-sightedness increases the risk of retinal detachment, cataracts, and glaucoma. Near-sightedness is the most common eye problem and is estimated to affect 1.5 billion people worldwide (22% of the population).

The exact underlying mechanism for myopia is still not fully understood, however in most cases it is caused by elongation of the eyeball or, less commonly, by the excess of optical power in the eye. There is tentative evidence that the risk of myopia can be decreased by having young children spend more time outdoors.

The juvenile eye typically develops until the age of 18 to 21 years, and, with it, the progression of myopia. By the time the eye fully matures, it may become severely myopic and difficult to treat. Additionally, high myopia has been shown to be associated with retinal detachment and other severe pathologies. Therefore, an effective preventive countermeasure for myopia and its progression has the potential to improve the sight of 2 to 5 billion people worldwide by the year 2050, according to some estimates. Contemporary interventions to prevent juvenile myopia progression include pharmacologic agents, glasses, and contact lenses. However, these treatments are less suitable for preventing the emergence of myopia since the onset of myopia usually occurs before the minimal recommended age for the treatment, the offered treatments may slow down myopia progression, but not eliminate myopia entirely, and these treatments may have considerable side effects.

In general, there are two paradigms striving to prevent myopia or its progression by wearable devices: 1) Orthokeratological remodeling of the cornea and 2) peripheral defocus\/progressive addition/multifocal lenses. A multitude of products are based on these two paradigms or their combination. Corneal remodeling can be achieved by hard contact lenses, and peripheral defocus using multifocal lenses can be achieved by either contact lenses or by eyeglasses.

While the theory assumes that the eye is not in focus across its entire retinal surface simultaneously, it is believed that the peripheral retina can be out of focus, either under or over focused, while the central retina, the fovea, is in sharp focus. Based on this premise, it is speculated that introducing a lens with positive induced power in its periphery will result in reduction of myopia progression rates. However, the exact details of the required optical power and its distribution across the field of view remains uncertain and varies from one treatment to the next.

Spectacles and contact lenses based on these methods have shown some improvements in the prevention of myopia in clinical testing. Similarly, orthokeratology should not be considered as a first-line strategy, given the high risk of infectious keratitis and the relatively low individual compliance. Currently, atropine ophthalmic drops seem to be the most effective treatment for slowing the progression of myopia, although the exact mechanism and long-term effectiveness of treatment is still uncertain.

It is, therefore, the object of the presently disclosed subject-matter to provide an improved technique for early treatment and/or prevention of myopia and its progression.

As described above, the presence of myopia indicates that the eye is too elongated in relation to its focal distance, in such a way that the image of an object that is far from the optical elements of the eye (basically the cornea and the lens) is focused in front of the retina, in such a way that the projection on the retina will be unclear, which causes deficient vision. Some techniques have been proposed for controlling the progression of myopia by correcting the refraction in the peripheral retina in an asymmetric manner. These optical devices modify the optics of the eye in its peripheral retina, as a prophylaxis of the progression of myopia. These types of asymmetric lenses comprise a positive power gradient only in the inferior-nasal quadrant.

Other approaches propose an optical element with non-axis-symmetric refraction distribution through a surface. The optical element has a central zone with stable distance refraction, which is non-axis-symmetrical, surrounded by a ring-like zone of refraction progression to its outer edge at nasal and temporal sides, and refraction peripheral zones with stable refraction that is stronger than central refraction, and the bottom edge connected zone with an addition for near-work. From the outer border of ring-like zone between outer borders of connected zones, in all directions refraction monotonically decreases. However, the above-mentioned techniques are based on empirical results and are not customized to each individual.

Other techniques propose an ophthalmic lens system for reducing the risk of progression of a myopic eye by selectively maintaining, inducing or creating asymmetry of the peripheral retinal profile for the eye of a specific individual. This is implemented by determining the magnitude of asymmetry of the on-axis/off-axis refractive error profile or eye length profile of the eye and providing an ophthalmic lens system that corrects for and provides acceptable on-axis vision and simultaneously controls the position of the off-axis refractive error profile or eye length profile, such that the resultant profile of the eye is asymmetric.

GENERAL DESCRIPTION

It has been discovered that, in many individuals, there is a difference in nasal and temporal retinal periphery geometry, which creates varied vision conditions requiring different optical correction (i.e. a different prescription) for the lens regions corresponding to nasal and temporal regions (as compared to corresponding retinal regions). More specifically, a conventional lens prescription is generally a prescription that provides vision correction to the central region of the retina, while the correction required may be different in the peripheral nasal and temporal regions. This may result in a prescription requirement different from that in the central region. As described above, techniques known in the field propose explicit measurements for the nasal and temporal regions of the retina, which require complex measurements using expensive and non-standard measurement tools. Therefore, there is a need in the art to provide a novel approach, which on the one hand takes into account the peripheral regions of the retina in addition to the central region, and on the other hand, eliminates the need for additional measurements.

The inventors found that the age of the individual and his/her conventional prescription are significant factors which are highly correlated with the difference in nasal and temporal retinal periphery vision conditions. According to one broad aspect of the presently disclosed subject-matter, there is provided an ophthalmic lens for affecting the progression of myopia in an eye of an individual having a certain prescription (Rx). The term "affecting" refers hereinafter to both slowing down the progression of vision conditions and preventing the onset of such. In some embodiments, the lens comprises an optical property profile defining (1) a central optical zone having an optical correction according to the Rx of the eye and (2) temporal and/or nasal zones providing at least one peripheral optical property being configured to focus far images in front of the nasal peripheral retina and/or in front of the temporal retina respectively, wherein the at least one peripheral optical property is determined according to a correlation between an individual's age or age group. In this connection, it should be noted that the expression "far images" refers to images being placed at the far field region of the eye. The term "ophthalmic lens" refers hereinafter to both spectacles lens (es) as well as contact lenses. The eyeglasses prescription (Rx) specified by sphere, cylinder power and axis can be optimized based on the assumption that the eyesight defect can be approximately corrected through a lens with a toroidal surface. The novel ophthalmic lens incorporates a customized peripheral optical property that is intended to focus far images in front of the nasal peripheral retina and the temporal peripheral retina. The term "optical property" refers to any optical parameter of the lens, such as power, cylinder (astigmatism) power and axis, or mean power.

The lens of the presently disclosed subject-matter thus includes a central optical zone with an induced optical correction according to a conventional prescription (Rx) corresponding to the eye's central refractive error, and temporal and nasal zones with at least one peripheral optical property being determined according to a calculation based on the age and/or the conventional prescription of the individual. As mentioned above, this technique requires a conventional eye examination, and does not require additional explicit measurements of the peripheral retina. In one aspect, the presently disclosed subject-matter refers to a customization of the optical property profile based on the age and conventional prescription of an individual, and therefore does not require peripheral refraction measurements. It should be noted that, as described above, typically, peripheral refraction measurements are time consuming and complex measurements that require equipment not typically found in standard optometry clinics.

One object of the disclosed subject-matter is to maximize myopic defocus and/or minimize hyperopic defocus of rays coming from far objects towards the eye. The lens of the presently disclosed subject-matter imposes as much myopic defocus as possible, by focusing rays coming from far in front of the retina. The term "myopic defocus" refers to an optical image being formed in front of the retina, and the term "hyperopic defocus" refers to an optical image being formed behind the retina.

In some embodiments, determining the correlation between an individual's age or age group and at least one peripheral optical property includes determining at least one change in relative peripheral refraction along horizontal eccentricities of a retinal periphery including the nasal periphery and/or the temporal periphery of the retina in different age groups. The peripheral nasal optical property may be determined by correlating between an individual's age or age group and a peripheral nasal optical property.

According to another aspect of the presently disclosed subject-matter, a process in which the customization is performed inter alia by correlating between the conventional prescription and the peripheral optical property at the temporal and/or nasal retina is proposed. This correlation is based on clinical trial findings. The correlations to age and conventional prescription (Rx) are also implemented as customization, based on clinical trial findings. Therefore, the peripheral temporal optical property may be determined by correlating between the eye's Rx and the peripheral optical property at the temporal retina. The optical property may be determined using statistical methods based on the individual's age or age group and/or the eye's Rx. Additionally or alternatively, the optical property profile is determined by correlating between the eye's Rx and a peripheral optical property at either the nasal or temporal retina, wherein the prescription includes optical parameters including at least one of sphere power, cylinder power, add power, prismatic power or axis value, and wherein the at least one peripheral optical property include optical parameters including at least one of sphere value, cylinder power, cylinder axis, at at least one point on the temporal and/or nasal zone.

In some embodiments, determining the correlation between the eye's Rx and a peripheral optical property includes determining at least one change in relative peripheral refraction along the temporal periphery of the retina as a function of Rx sphere equivalent.

According to another aspect of the presently disclosed subject-matter an asymmetric myopia control lens with cylinder customization is provided. In this embodiment, further customization of the lens(es) is provided to optimize the cylinder-related lens' parameters, based solely on the conventional prescription Rx. In contrast to myopia control lenses that relate solely to sphere equivalent, the lens surface of some embodiments of the presently disclosed subject-matter is also optimized according to the cylinder power and axis. A clear trend was found in the clinical data in the cylinder power offset (i.e. the difference between the cylinder power at a point on the lens from the central value, or conventional prescription cylinder power) in one or both of the nasal and temporal periphery, which indicates a certain nasal-temporal asymmetry (i.e. a difference in these offsets between the nasal and temporal retinal periphery), such as a higher cylinder power offset in the temporal retina compared to the nasal retina (Wilcoxon test, $p<0.05$). Another clear trend was found in the clinical data in the cylinder axis measurements (absolute) on the retinal periphery, such as the cylinder axis converging to about 90 degrees, regardless of the central cylinder axis of the conventional prescription. This phenomenon may be related to the growth profile of the human eye. Therefore, the at least one peripheral optical property may include correction of the axis value, such that the axis value converges to about 90 degrees at either the nasal or temporal periphery. For example, the axis value may be in a range of about 80 degrees to 120 degrees at the nasal periphery, and in a range of about 60 degrees to 100 degrees at the temporal periphery.

Lens optimization according to cylinder and axis means that the cylinder and axis values vary over the surface of the lens and provide an optimized correction to various defined positions (e.g. nasal and temporal peripheral retina) where these values are not uniform. This accurate optical optimization of the entire lens surface is determined according to both spherical power and cylinder power and axis along the horizontal power profile. The accurate optimization based on both spherical power and cylinder power and axis yields a more precise horizontal power profile in the lens which is expected to bring about a more effective myopia control mechanism and may have a positive impact on compliance.

According to another broad aspect of the presently disclosed subject-matter, there is provided a method including obtaining a conventional prescription (Rx) of at least one eye (i.e. a central refractive error of the eye), obtaining the age of the individual and determining an optical property of a non-central position on the lens according to the conventional prescription and/or the age of the individual. The method may also include configuring a lens with the optical property. Determining the optical property of a lens may be implemented by calculating the horizontal power profile according to the conventional prescription and/or the age of the individual. The method may include providing a lens with the optical property. This may be implemented by manufacturing the lens with the calculated horizontal power profile. Customization of the horizontal power profile according to age and conventional prescription (Rx) yields a more effective treatment in slowing the progression of myopia, such that each individual is provided with a more precise and customized power profile in order to minimize the hyperopic defocus and slow the rate of myopia progression.

In some embodiments, the method further includes measuring a prescription (Rx) of at least one eye.

In some embodiments, determining the optical property includes providing an optical property defining (1) a central optical zone with an optical correction according to the eye's Rx and (2) temporal and/or nasal zones providing at least one peripheral optical property being configured to focus far images in front of the nasal peripheral retina and/or in front of the temporal peripheral retina respectively. Determining the optical property may include correlating between an individual's age and at least one peripheral optical power. Determining the optical property may include correlating between the eye's Rx and the peripheral optical property at either the nasal retina or the temporal retina.

In some embodiments, defining the at least one peripheral optical property includes defining a correction of the axis value, such that the axis value converges to about 90 degrees at either nasal or temporal periphery.

In some embodiments, determining the peripheral nasal optical property includes correlating between an individual's age or age group and a peripheral nasal optical property, and determining the peripheral temporal optical property includes correlating between the eye's Rx and the peripheral optical property at the temporal retina.

In some embodiments, determining the optical property includes determining a first peripheral lens power of the temporal periphery zone and a second peripheral lens power of the nasal periphery zone according to the eye's Rx, such that the optical property defines an asymmetry across the lens.

According to another broad aspect of the presently disclosed subject-matter, there is provided an ophthalmic lens for affecting a progression of myopia in an eye of an individual having a certain prescription (Rx). The lens includes an optical profile defining (1) a central optical zone having an optical correction according to the eye's Rx and (2) temporal and/or nasal zones providing at least one peripheral optical property being configured to focus far images in front of the nasal peripheral retina and/or in front of the temporal peripheral retina respectively. The at least one peripheral optical property is determined by correlating between the eye's Rx and a peripheral optical property at either the nasal or temporal retina. The prescription includes optical parameters including at least one of sphere power, cylinder power, add power, prismatic power or axis value, and wherein the at least one peripheral optical property includes optical parameters including at least one of sphere value, cylinder power, cylinder axis, at at least one point on the temporal and/or nasal zone.

In some embodiments, determining the correlation between the eye's Rx and a peripheral optical property includes determining at least one change in relative peripheral refraction along the temporal periphery of the retina as a function of Rx sphere equivalent. The temporal periphery zone may be configured to have a first peripheral lens power and the nasal periphery zone is configured to have a second peripheral lens power being determined according to the eye's Rx such that the optical property defines an asymmetry across the lens. The at least one peripheral optical property may be determined by correlating between an individual's age or age group and a peripheral optical power. The at least one peripheral optical property may be determined using statistical methods based on the individual's age and/or age group and/or the eye's Rx. The at least one peripheral optical property may include correction of the axis value, such that the axis value converges to about 90 degrees at either nasal or temporal periphery.

According to another broad aspect of the presently disclosed subject-matter, there is provided a method including: obtaining a prescription of at least one eye wherein the prescription includes optical parameters including at least one of sphere power, cylinder power, add power, prismatic power or axis value; determining at least one peripheral optical property of a lens according to the eye's Rx, wherein the at least one peripheral optical property includes at least one optical parameter including at least one of sphere value, cylinder power, cylinder axis, at at least one point on the temporal and/or nasal zone, wherein determining the at least one peripheral optical property includes correlating between the eye's Rx and a peripheral optical property at either the nasal or temporal retina.

In some embodiments, the method further includes measuring a prescription (Rx) of at least one eye.

In some embodiments, the method further includes providing a lens with the optical property.

In some embodiments, the method further includes determining the correlation between the eye's Rx and a peripheral optical property including determining at least one change in relative peripheral refraction along the temporal periphery of the retina as a function of Rx sphere equivalent. Determining the optical property may include determining a first lens power of the nasal periphery zone according to an individual's age or age group and a second lens power of the temporal periphery zone according to the eye's Rx. Determining the optical property may include using statistical methods based on the individual's age and/or age group and/or the eye's Rx. The at least one peripheral optical property may include correction of the axis value, such that the axis value converges to about 90 degrees at either nasal or temporal periphery.

According to another broad aspect of the presently disclosed subject-matter, there is provided an ophthalmic lens for affecting the progression of myopia in an eye of an individual having a certain prescription (Rx). The lens includes an optical property defining (1) a central optical zone having an optical correction according to the Rx of the eye and (2) temporal and/or nasal zones providing at least one peripheral optical property being configured to focus far images in front of the nasal peripheral retina and/or in front of the temporal retina respectively. The at least one peripheral optical property includes correction of an axis value, such that the axis value converges to about 90 degrees at either the nasal or temporal periphery.

According to another broad aspect of the presently disclosed subject-matter, there is provided a method including: obtaining a prescription (Rx) of at least one eye; and determining at least one optical property of a lens by providing a correction of an axis value, such that the axis value converges to about 90 degrees at either nasal or temporal periphery.

In some embodiments, the method further includes measuring a prescription (Rx) of at least one eye.

In some embodiments, the method further includes providing a lens with the optical property. The axis value may be in a range of about 80 degrees to 120 degrees at the nasal periphery and in a range of about 60 degrees to 100 degrees at the temporal periphery.

In some embodiments, determining of the optical property includes providing an optical property defining (1) a central optical zone with an optical correction according to the eye's Rx and (2) temporal and/or nasal zones providing at least one peripheral optical property being configured to focus far images in front of the nasal peripheral retina and/or in front of the temporal peripheral retina respectively.

According to another broad aspect, the disclosed subject-matter provides a processing unit based on machine learning and/or statistical data for configuring proper ophthalmic lens(es) prescription for a plurality of regions of the lens, including those for the nasal and temporal retinal peripheries, based on the age of the individual in addition, or as an alternative, to the conventional (central region) prescription of the lens. The processing unit is configured for providing an individualized lens optical property profile. The processing unit includes a data input utility being configured and operable to receive a certain prescription (Rx) of an individual and the individual's age, a memory being configured and operable to storing a database including preselected data indicative of peripheral optical property as a function of an individual's age or age group, a data processing utility adapted being configured and operable to correlate between an individual's age or age group and at least one peripheral optical property, and a data output utility being configured and operable to provide a lens optical property profile defining a central optical zone having an optical correction according to the Rx of the eye and temporal and/or nasal zones, providing at least one peripheral optical property being configured to focus far images in front of the nasal peripheral retina and/or on the temporal retina respectively.

In some embodiments, the data processing utility is configured and operable to determine at least one change in relative peripheral refraction along horizontal eccentricities of a retinal periphery including the nasal periphery and/or the temporal periphery of the retina in different age groups. The data processing utility may be configured and operable to correlate between an individual's age or age group and at least one peripheral optical property, by machine learning.

According to another broad aspect, the disclosed subject-matter provides a processing unit for providing an individualized lens optical property profile. The processing unit includes a data input utility being configured and operable to receive a certain prescription (Rx) of an individual, a memory being configured and operable to storing a database including preselected data indicative of peripheral optical property as a function of an individual's Rx, a data processing utility, adapted and being configured and operable to correlate between the eye's Rx and a peripheral optical property at either the nasal or temporal retina, and a data output utility being configured and operable to provide a lens optical property profile defining a central optical zone having an optical correction according to the Rx of the eye and temporal and/or nasal zones providing at least one peripheral optical property being configured to focus far images in front of the nasal peripheral retina and/or on the temporal retina respectively. The data processing utility may be configured and operable to determine the correlation between the eye's Rx and a peripheral optical property includes determining at least one change in relative peripheral refraction along the temporal periphery of the retina as a function of Rx sphere equivalent.

In some embodiments, the data processing utility is configured and operable to determine an asymmetry across the lens by calculating a difference in a cylinder power along horizontal eccentricities in a retinal periphery.

In some embodiments, the data processing utility is configured and operable to correlate between the difference in the cylinder power along horizontal eccentricities of a retinal periphery including the nasal periphery or the temporal periphery of the retina and the Rx.

According to another aspect of the presently disclosed subject-matter, there is provided a myopia control ophthalmic lens for affecting the progression of myopia in an eye of an individual having a certain prescription (Rx). The prescription may be obtained following an eye examination that may include either a subjective or objective refraction and may be carried out either with or without cycloplegia. In this connection, it should be noted that the prescription may be indicative of a correction of a vision impairment and/or plano (0 power prescription) such that the myopia control ophthalmic lens of the presently disclosed subject-matter is configured and operable for affecting the progression of myopia in an eye of an individual even for a non-myopic eye. The term "affecting" refers hereinafter to both slowing down the progression of vision conditions and preventing the onset of such. The myopia control ophthalmic lens may be a spectacle lens or a contact lens and is configured for affecting the progression of myopia (prevention and minimization). In particular, the myopia control lens may be used for the prevention of myopia for young hyperopic children who are at risk for myopia along with the affection of the progression of myopia for myopic children at any age. The ophthalmic lens includes an optical property profile defining a central optical zone having an optical correction according to the prescription (Rx) of the eye and at least one peripheral zone providing at least one peripheral optical property being configured to focus far images in front of the peripheral retina, wherein the at least one peripheral optical property is determined by correlating between at least one measurable parameter affecting the peripheral refraction profile and at least one peripheral optical property. In this connection, it should be noted that, a conventional lens prescription is generally a prescription that provides full far vision correction to the central region of the retina. Since the myopia control ophthalmic lens is configured for slowing down the progression of vision conditions and/or preventing the onset of such, inter alia, in children who are still in the process of emmetropization, the prescription may be indicative of no visual correcting power (plano lens), i.e. may not reflect the full refractive error of the child at a at an instance T but being selected for slowing down the progression of vision conditions and/or preventing the onset of such. The myopia control lens of the presently disclosed subject-matter is thus configured by considering one or more measurable parameters affecting the peripheral refraction profile. It should be understood that the level of myopia in children, its progression rate, and its prevalence may be related to various genetic and environmental factors such as parental myopia, age of myopia onset, ethnicity, geographic area of living and more daily time spent indoors (less outdoors). For example, the prevalence of myopia in children is higher in East Asia compared to western countries, in urban areas compared to rural ones and in children spending more time indoors compared to those spending more time outdoors. Moreover, parental myopia may be identified as being a risk factor in the development of myopia in children in various ethnic groups. More specifically, parental myopia may be associated with a greater risk of early-onset myopia in Asian, Hispanic, non-Hispanic white, African American and African children [6,7]. In general, it can be said that children with both parents being myopic are in higher risk of developing myopia than those with only one myopic parent, and the level of parental myopia is also a factor; children with parents having high myopia (SER<−6.00 D) are in higher risk than those with parents having low myopia [8].

Therefore, the at least one measurable parameter includes at least one of geographic area of living, type of environment (e.g. rural or urban), age of myopia onset, age or age group of the individual, time spent outdoors, parental myopia (e.g. yes/no, one/both parents, level of myopia), handedness or ethnicity. Children with myopic parents tend to show more hyperopic relative peripheral refraction. Moreover, East Asian myopes have a greater degree of relative peripheral hyperopia than Caucasians. The parental myopia may be determined by a plurality of parental parameters including at least one of existence of myopia in at least one parent, a level of myopia of at least one parent, a certain amount of myopia of at least one parent, or an overall parental myopia parameter being a scaled parameter of each parental parameter.

More specifically, the peripheral refraction profile may include a horizontal power profile being determined by correlating between at least one peripheral optical property and at least one measurable parameter including the individual's age, the prescription, parental myopia, ethnicity, geographic area of living, type of environment, age of myopia onset, handedness or time spent outdoors.

In some embodiments, the optical property profile is determined by correlating between the eye's Rx and a peripheral optical property at at least one peripheral zone. The at least one peripheral optical property may include optical parameters including sphere value, cylinder power and cylinder axis, at at least one point on the peripheral zone. The at least one peripheral zone may include temporal and/or nasal zones when providing at least one peripheral optical property is configured to focus far images in front of the nasal peripheral retina and/or in front of the temporal peripheral retina respectively.

In some embodiments, the correlation between at least one measurable parameter and at least one peripheral optical property includes determining at least one change in relative peripheral power profile along horizontal eccentricities of a retinal periphery including the nasal periphery and/or the temporal periphery of the retina in different measurable parameters.

In some embodiments, since the peripheral refraction profile of the child is correlated with his/her myopia progression/level, the myopia control lens based on peripheral power profile of the presently disclosed subject-matter may be configured according to at least one measurable parameter mentioned above, along with the prescription. The peripheral power profile of the myopia control lens of a child may be determined (e.g. fitted) by considering one or more measurable parameters and therefore the lens power profile of the myopia control/prevention lens can be more accurately fitted. For example, the prevention lens may be applied to young (e.g. ages 4-6) hyperopic kids whose parents are myopic so they are identified as in high risk for developing myopia, and the myopia control lens may also be applied to older kids (e.g. ages 6-16).

According to another aspect of the presently disclosed subject-matter, there is provided a method including: obtaining a certain prescription (Rx) of at least one eye; obtaining at least one measurable parameter of an individual; and determining an optical property of a non-central position on a lens according to the eye's Rx and the measurable parameter of the individual.

In some embodiments, the method further includes determining the parental myopia by identifying a plurality of parental parameters including at least one of existence of myopia in at least one parent, a level of myopia of at least one parent, a certain amount of myopia of at least one parent, or an overall parental myopia parameter being a scaled parameter of each parental parameter.

In some embodiments, the method further includes measuring a certain prescription (Rx) of at least one eye.

In some embodiments, the method further includes providing a lens with an optical property defining a central optical zone with an optical correction according to the eye's Rx and at least one peripheral zone providing at least one peripheral optical property being configured to focus far images in front of the peripheral retina. The peripheral optical property includes a horizontal power profile.

In some embodiments, determining the optical property includes correlating between at least one measurable parameter and at least one peripheral optical parameter.

In some embodiments, determining the optical property includes correlating between the eye's Rx and at least one of peripheral refraction at the peripheral retina. The prescription includes optical parameters including sphere power, cylinder power, axis and also optionally prismatic power.

In some embodiments, determining the correlation between at least one measurable parameter and at least one peripheral optical property includes determining at least one change in relative peripheral defocus profile along horizontal eccentricities of a retinal periphery including the nasal periphery and/or the temporal periphery of the retina in different measurable parameters.

According to another aspect of the presently disclosed subject-matter, there is provided a processing unit for providing an individualized lens optical property profile. The processing unit includes a data input utility being configured and operable to receive a certain prescription (Rx) of an individual and the individual's age, a memory being configured and operable to storing database including preselected data indicative of peripheral optical property as a function of at least one measurable parameter, a data processing utility being configured and operable to correlate between at least one measurable parameter and at least one peripheral optical property, and a data output utility being configured and operable to provide a lens optical property profile defining a central optical zone having an optical correction according to the Rx of the eye and at least one peripheral zone providing at least one peripheral optical property being configured to focus far images in front of the peripheral retina.

In some embodiments, machine learning algorithms are used in order to determine the accuracy and significance level of the peripheral refraction prediction using the measurable parameters mentioned above. Big data is collected with all the measurable parameters (e.g. age, prescription, parental myopia and ethnicity) and with peripheral refraction measurements. This AI model may be based on the big data collected in order to predict the peripheral power profile that should be induced in the child's myopia control lens. The data processing utility may thus be configured and operable to correlate between at least one measurable parameter and at least one peripheral optical property by machine learning.

In some embodiments, the data processing utility is configured and operable to determine the parental myopia by identifying a plurality of parental parameters including at least one of existence of myopia in at least one parent, a level of myopia of at least one parent, a certain amount of myopia of at least one parent, or an overall parental myopia parameter being a scaled parameter of each parental parameter.

In some embodiments, the data processing utility is configured and operable to determine the optical property profile by correlating between the eye's Rx and a peripheral optical property at at least one peripheral zone.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
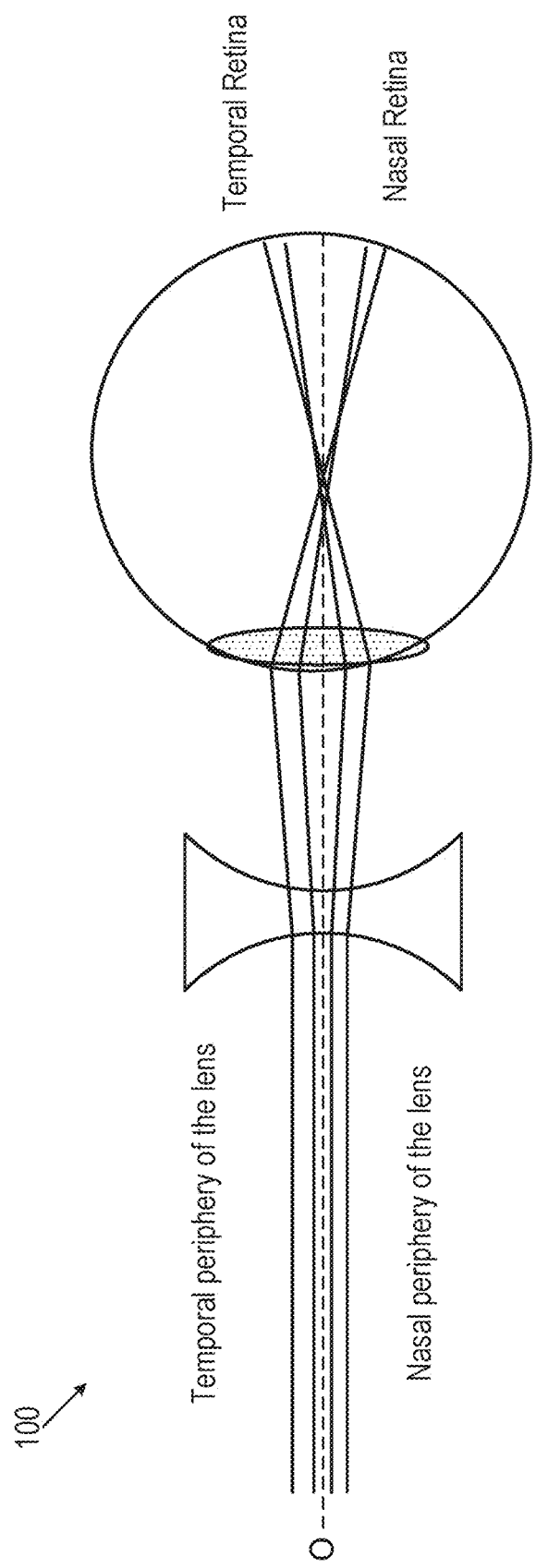
FIG. 1 is a schematic diagram of a cross-section view the ophthalmic lens of the presently disclosed subject-matter.

Reference is made to FIG. 1, showing a schematic illustration of a cross-section view of the ophthalmic lens of the presently disclosed subject-matter. Ophthalmic lens 100 is configured for affecting the progression of myopia of an eye of an individual having a certain conventional prescription (Rx). Typically, prescription Rx includes optical parameters including at least one of sphere power, cylinder power, add power, prismatic power or axis value. An aspherical surface is generally defined by the height or altitude of the points thereon. Other parameters referred to are the maximum and minimum curvature at each point, or, more frequently, their half sum and their difference which are commonly referred to as mean sphere and cylinder.

The term "SPH Equivalent (SE)" (also termed "mean SPH") used herein refers to the average power between the maximum power meridian and the minimum power meridian. More specifically, it refers to (the optical power measured in the less myopic meridian of the eye+the optical power measured in the most myopic meridian of the eye)/2 and itis defined by the expression:

$$Sph = \frac{n-1}{2}\left(\frac{1}{R_1} + \frac{1}{R_2}\right) \quad (1)$$

The cylinder (Cyl) is defined by the expression:

$$Cyl = (n-1)\left|\frac{1}{R_1} - \frac{1}{R_2}\right| \quad (2)$$

where $R_1$ and $R_2$ are the minimum and maximum radii of curvature, expressed in meters, and n is the refractive index of the lens material.

The term "sphere (SPH)" used herein refers to the optical power measured in the less myopic meridian of the eye.

The term "Cylinder (CYL)" used herein refers to a cylinder in minus convention being the optical power measured in the most myopic meridian of the eye minus the optical power measured in the less myopic meridian of the eye.

The term "add power" used herein refers to a positive SPH Equivalent (SE) power induced in a specific area in the lens in addition to the distant Rx in order to focus far images in front of the corresponding area in the peripheral retina.

Lens 100 includes an optical property profile defining (1) a central optical zone having an optical correction according to the Rx of the eye referred to in the figure as optical axis O and (2) temporal and/or nasal zones, referred in the figure as temporal and nasal periphery of the lens, providing at least one peripheral optical property being configured to focus far images in front of the nasal peripheral retina and/or in front of the temporal retina respectively. The at least one peripheral optical property includes optical parameters including at least one of sphere value, cylinder power, cylinder axis, at at least one point on the temporal and/or nasal zone. As clearly shown in the figure, lens 100 includes three zones: a central zone, a temporal zone and a nasal zone. As will be illustrated further below with respect to FIG. 4D, the fitting position FP is a point of intersection of a line of sight for a user with the lens surface. Thus, the term "fitting point" or "fitting position" FP relates to a point on a lens as mounted in a spectacle frame, aligned with the individual's center of the pupil in its distance viewing position when the individual is looking straight ahead. The temporal and the nasal zones surround the central zone and lie at the temporal and nasal side of the lens, respectively. The temporal and the nasal zones define the peripheral regions of lens 100. It should be noted that, generally, as seen in the figure, all retinal eccentricities are in opposite orientation to the lens eccentricities (since peripheral light rays entering the eye from one side of the lens periphery, for example the nasal side, eventually fall on the opposite side of the retina, in this example—the temporal side). The optical property profile of lens 100 is customized to each individual and is based on the individual's prescription and, in some embodiments, also on the individual's age. As will be described further below, the optical properties of the temporal and the nasal zones may be similar, or even identical one to the other, providing a symmetric lens. Alternatively, the optical properties of the temporal and the nasal zones may be different one from the other, providing an asymmetric lens. According to one aspect of the presently disclosed subject-matter, the at least one peripheral optical property is determined according to an individual's age or age group. According to another aspect of the presently disclosed subject-matter, the at least one peripheral optical property is determined by correlating between the conventional prescription (Rx) and a peripheral optical property at either the nasal or temporal retina.

Figure 2:
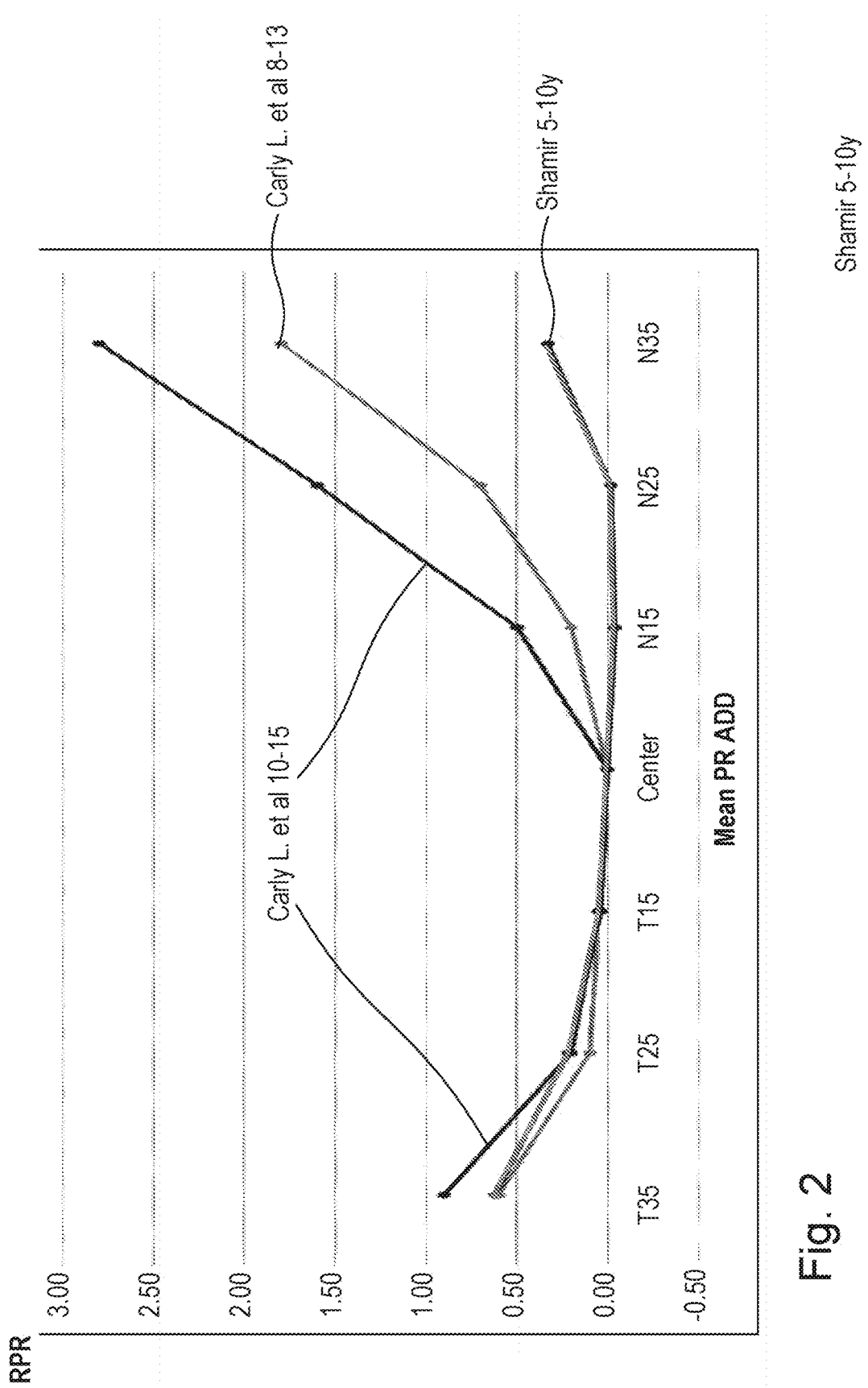
FIG. 2 is a graph of results of several independent clinical trials made on various age groups.

The inventors carried out extensive research to correlate a specific age (or age group) and a peripheral refraction profile of an individual. Reference is made to FIG. 2 showing a comparison between several myopia control clinical trials performed on various age groups. More specifically, the Y axis shows the RPR (retinal peripheral refraction), T35 is the spherical equivalent add measured on the temporal (T) retina when the eye is rotated 35 degrees, T25 is the spherical equivalent add measured on the temporal (T) retina when the eye is rotated 25 degrees, T15 is the spherical equivalent add measured on the temporal (T) retina when the eye is rotated 15 degrees, Center is the spherical equivalent add measured on the temporal (T) retina when the eye is in the center, N35 is the spherical equivalent add measured on the nasal (N) retina when the eye is rotated 35 degrees, N25 is the spherical equivalent add measured on the nasal (N) retina when the eye is rotated 25 degrees, and N15 is the spherical equivalent add measured on the nasal (N) retina when the eye is rotated 15 degrees. These curves show possible correlations between different age groups (i.e. 5-10 years, 8-13 years, 10-15 years) and the peripheral refraction profile. More specifically, this graphical representation illustrates changes in relative peripheral refraction (RPR) along the horizontal eccentricities of the retinal periphery in different age groups of myopia control clinical trials (including trials made by the assignee of the presently disclosed subject-matter).

Relative peripheral refraction (RPR) may be calculated by subtracting central refraction (spherical equivalent) from each peripheral refraction measurement. As the myopic child develops, the relative peripheral refraction increases. Older age groups demonstrate higher relative peripheral refraction specifically in the nasal periphery of the lens and more extremely in the farthest nasal periphery. The optical property of the lens may thus be determined using statistical methods based on the individual's age or age group and/or the eye's Rx. The correlation may thus be based on data collected in clinical trial(s).

Figure 3:
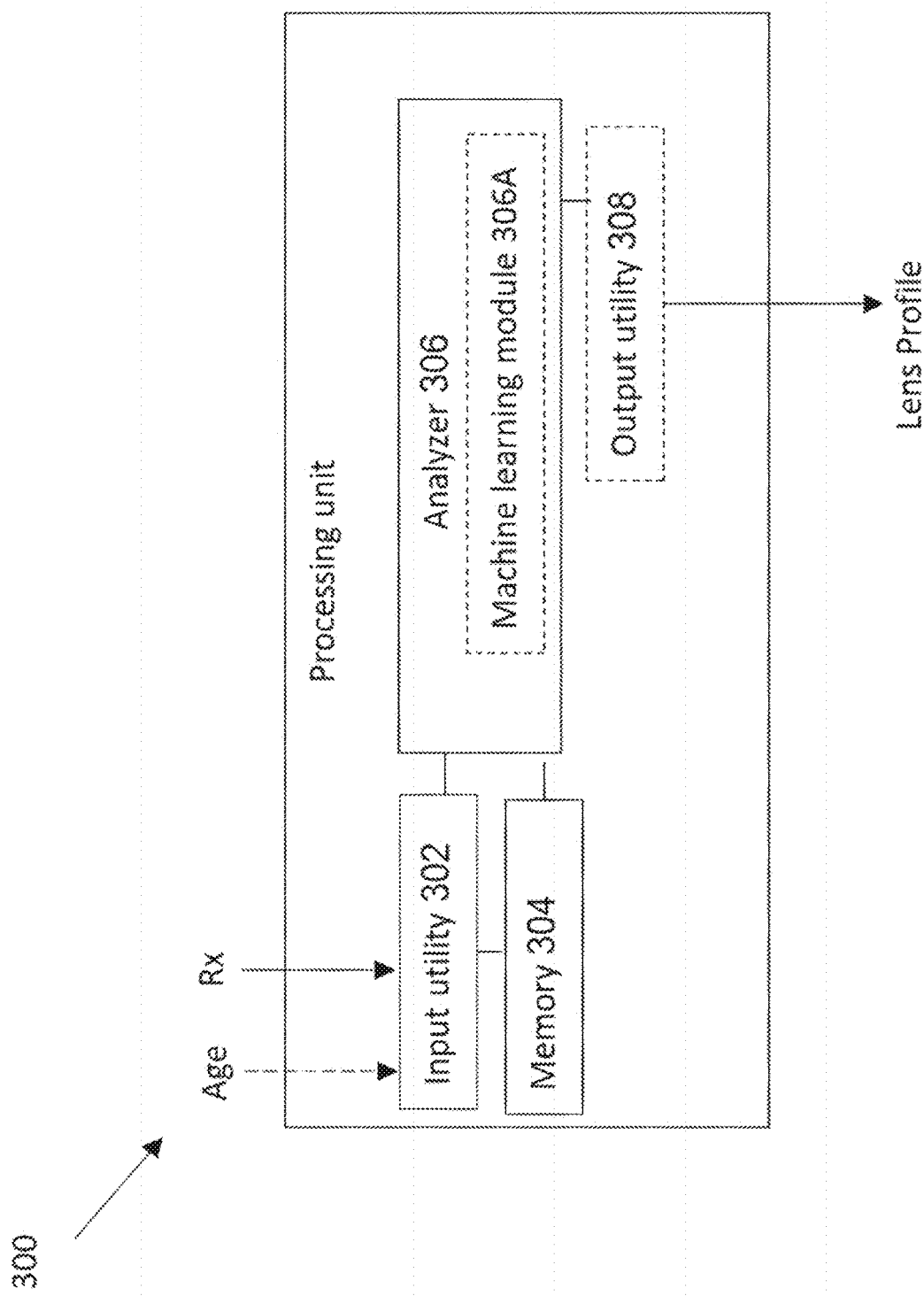
FIG. 3 is a schematic block diagram of a processing unit according to one broad aspect of the presently disclosed subject-matter.

Reference is made to FIG. 3 showing a schematic block diagram of a processing unit according to one broad aspect of the presently disclosed subject-matter. Processing unit 300 includes a computer system including a data analyzer (i.e. data processing utility) 306 and being a part of and connected to a computer network. Processing unit 300 may include a general-purpose computer processor, which is programmed in software to carry out the functions described herein below. Unless specifically stated otherwise, as apparent from the following discussions, it is appreciated that throughout the specification discussions utilizing terms such as "determining", "correlating", "comparing", "calculating", "processing" or the like, refer to the action and/or processes of a computer that manipulate and/or transform data into other data. Also, operations in accordance with the teachings herein may be performed by a computer specially constructed for the desired purposes, or by a general-purpose computer specially configured for the desired purpose by a computer program stored in a computer readable storage medium. Processing unit 300 includes a data input utility 302 including a communication module for receiving a certain conventional prescription (Rx) of an individual and optionally the individual's age, a memory (i.e. non-volatile computer readable medium) 304 for storing database i.e. preselected data indicative of peripheral optical property as a function of an individual's age or age group, and a data analyzer 306 adapted to correlate between an individual's age or age group and at least one peripheral optical property. Memory 304 may be integrated within processing unit 300 or may be an external storage device accessible by processing unit 300. The software may be downloaded to analyzer 306 in electronic form, over a network, for example, or it may alternatively be provided on tangible media, such as optical, magnetic, or electronic memory media.

In one embodiment, this correlation is performed via machine learning techniques that create a statistical model (e.g., a neural network). As used herein, "statistical model or method" refers to any learned and/or statistical data structure that establishes or predicts a relationship between two or more data parameters (e.g., inputs and outputs). The statistical methods can be statistical regression (e.g. linear, polynomial, exponential), machine learning methods, etc. Additionally or alternatively, analyzer 306 may be configured as or include a machine learning module 306A such as a neural network, where multiple categorized prescriptions and peripheral optical properties (e.g. for different ages or age groups) are used for the learning process. The analysis may be based on machine learning techniques. It may be based on comparison with past analysis results, on comparison with accessible knowledgebase available on the Internet such as prescriptions and peripheral optical properties, and/or on user input. The database may be determined by various prescriptions, peripheral optical properties and optionally the individual's age and machine learning techniques utilizing analytical data on prescriptions, peripheral optical properties and optionally the individual's age and relations between them. In this connection, it should be noted that machine learning is a discipline for generating algorithms for implementing statistical methods on computers. It has strong ties to mathematical optimization, which delivers methods, theory and application domains to the field. Machine learning is employed in a range of computing tasks where designing and programming explicit algorithms is not feasible. There are many software tools that are used as machine learning tools including, for example, the following tools: dlib, ELKI, Encog, H2O, Mahout, mlpy, MLPACK, MOA (Massive Online Analysis), ND4J with Deeplearning4j, NuPIC, OpenCV, OpenNN, Orange, PyMC, R, scikit-learn, scikit-image, Shogun, Torch (machine learning), Spark, Yooreeka, Weka, KNIME, RapidMiner, Amazon Machine Learning, Angoss Knowledge STUDIO, Databricks, IBM SPSS Modeler, KXEN Modeler, LION solver, Mathematica, MATLAB, Microsoft Azure Machine Learning, Neural Designer, NeuroSolutions, Oracle Data Mining, RCASE, SAS Enterprise Miner, STATISTICA Data Mine, and TensorFlow.

The processing may utilize cluster analysis, machine learning tools, or any other technique(s) for correlating and identifying relations between prescriptions and peripheral optical properties and optionally the individual's age and user related parameters to thereby identify specific peripheral optical property being configured to focus far images on the nasal peripheral retina and/or on the temporal retina respectively. Processing unit 300 may include an output utility 308 being configured and operable to output a specific lens profile.

Processing unit 300 includes at least one computer entity linked to a server via a network, wherein the network is configured to receive and respond to requests sent across the network, and also transmits one or more modules of computer executable program instructions and displayable data to the network connected user computer platform in response to a request, wherein the modules include modules configured to: receive and transmit optical property information, transmitting a lens profile recommendation based on the calculated correlation, for display by the network connected user computer platform. The disclosed subject-matter may include computer program instructions stored in the local storage that, when executed by processing unit 300, cause processing unit 300 to receive prescription data and/or age data of an individual and determine at least one optical property of a lens. The computer program product may be stored on a tangible computer readable medium, including: a library of software modules which cause a computer executing them to prompt for information pertinent to an optical lens profile recommendation, and to store the information or to display optical lens profile recommendations. The computer program may be intended to be stored in memory 304 of processing unit 300, or in a removable memory medium adapted to cooperate with a reader of the processor unit 300, including instructions for implementing the method as will be described below. More specifically, the computer program may be in communication with an interface to receive the prescription data and/or may provide control points (i.e. target values) for different positions along horizontal eccentricities.

Figure 4A:
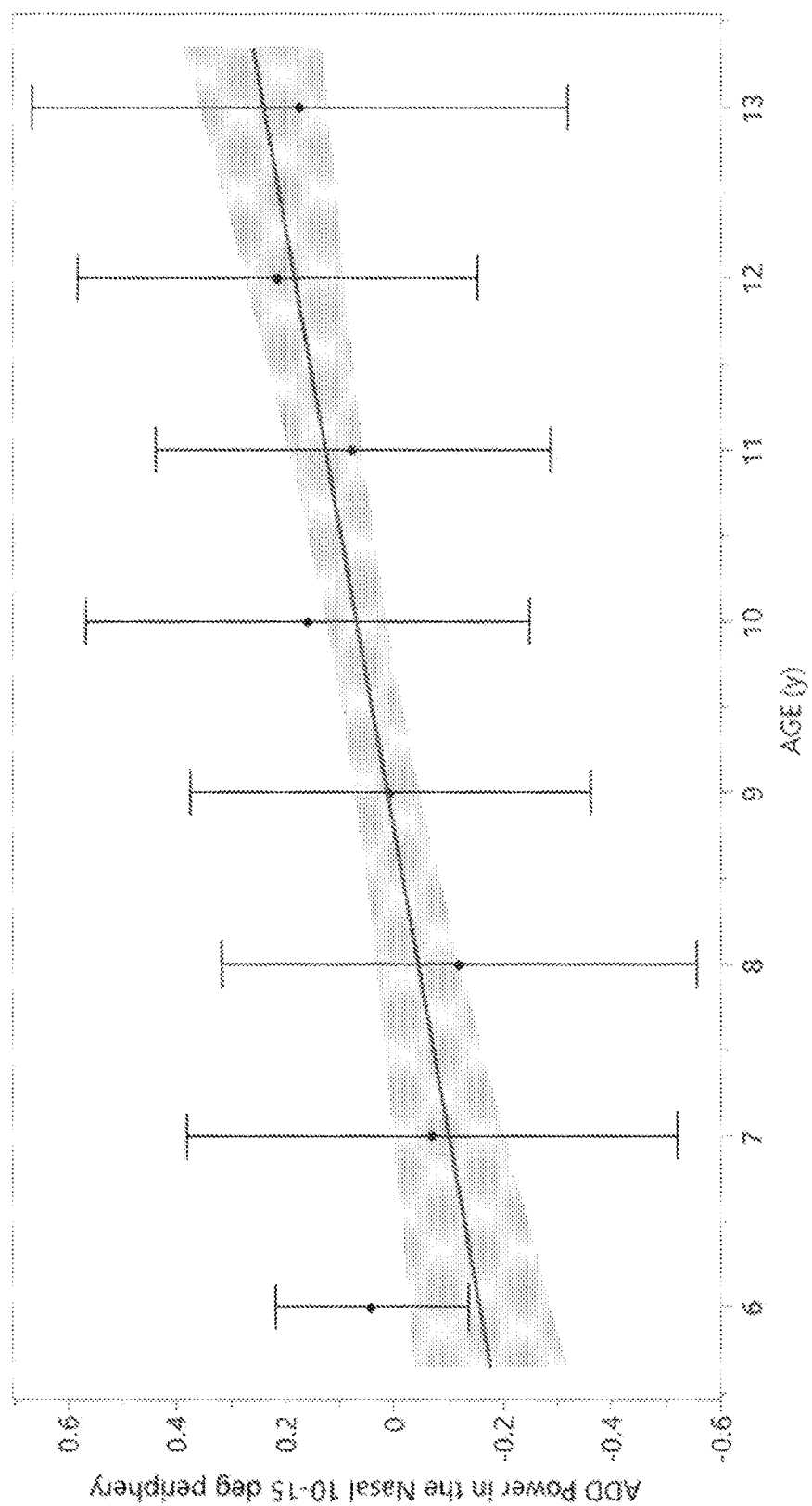
FIGS. 4A-4C are graphical representations of possible different correlations between an individual's age and the add power in the nasal periphery of the retina according to some teachings of the presently disclosed subject-matter.
Figure 4B:
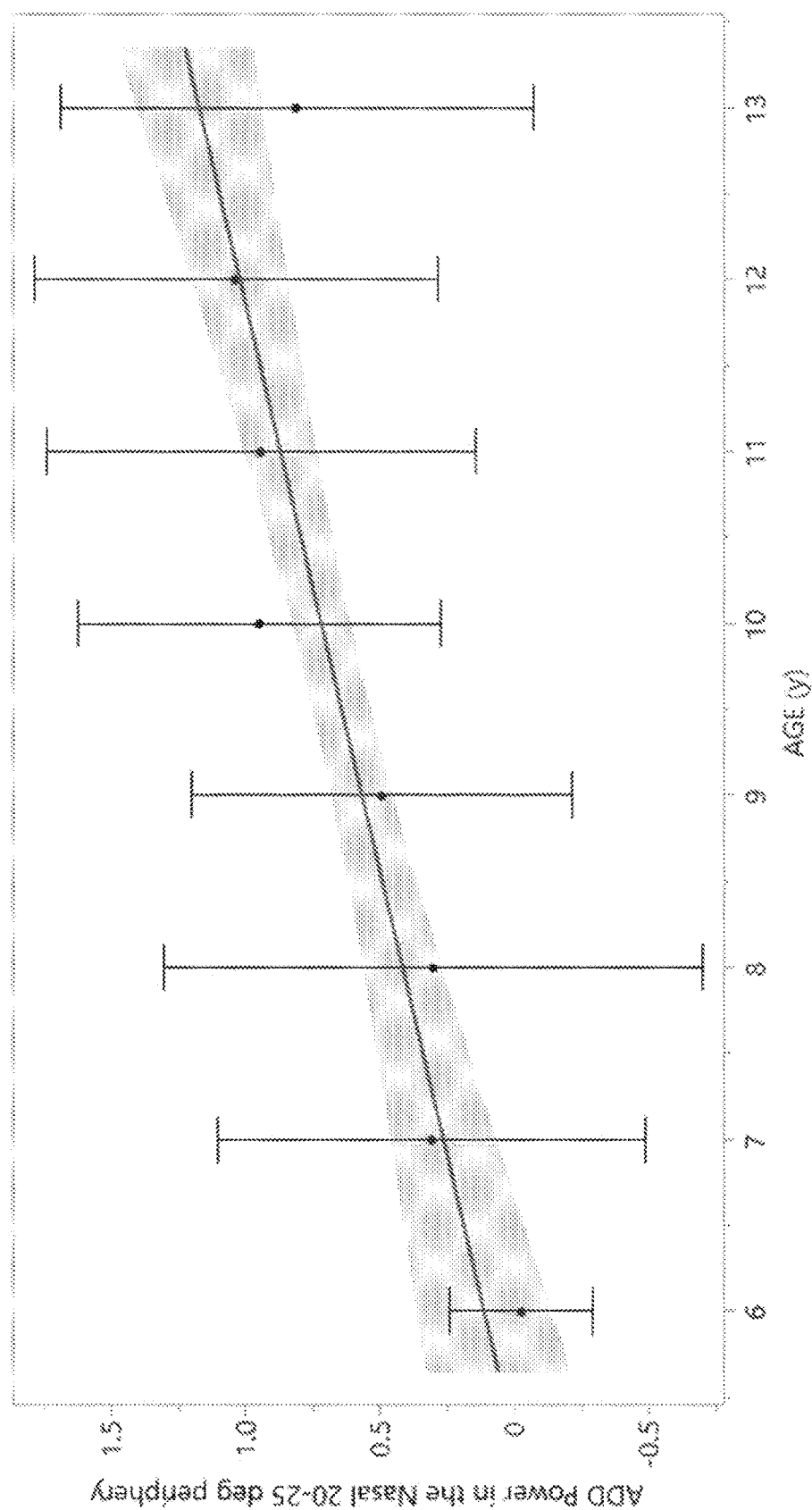
Figure 4C:
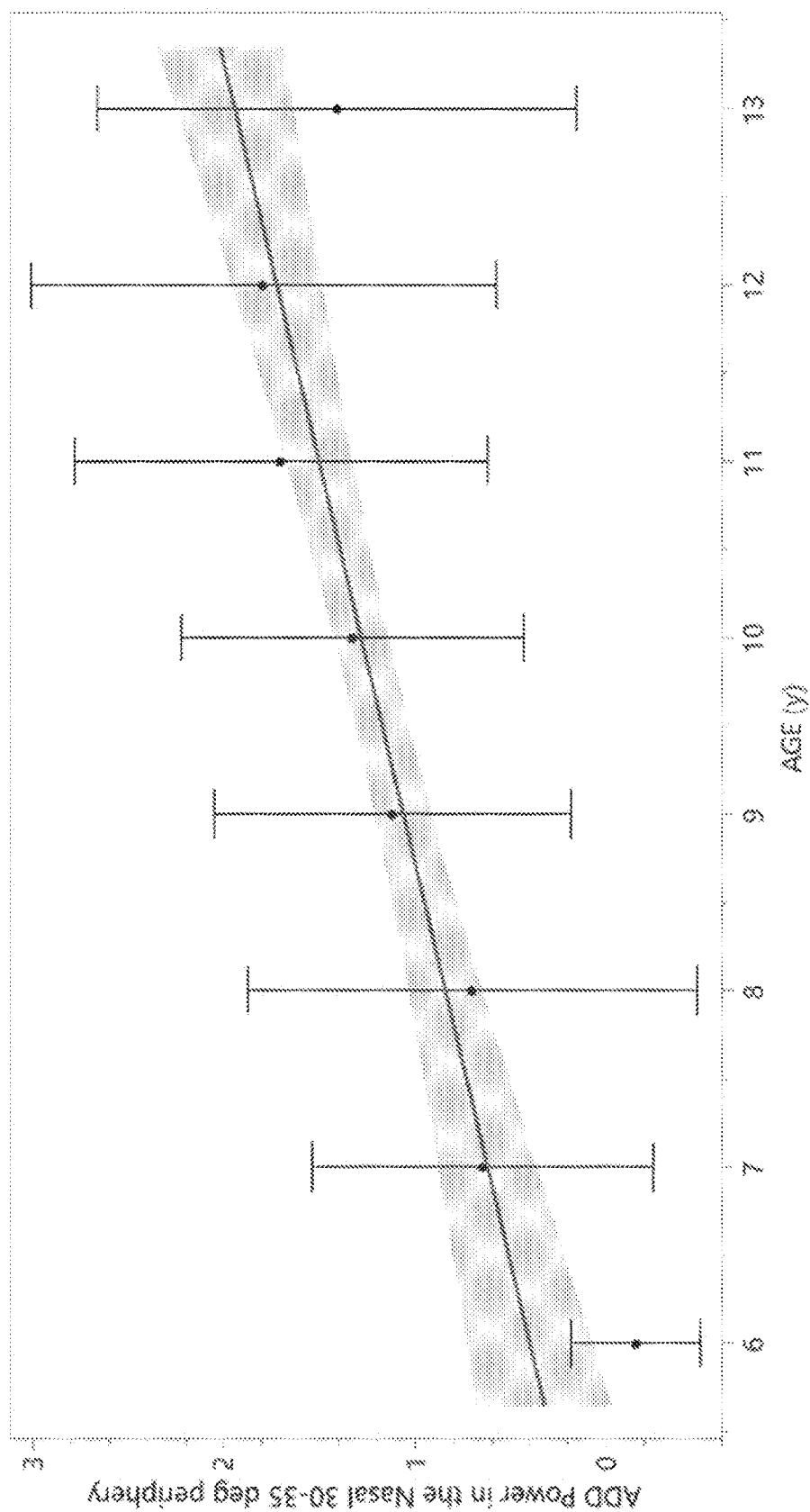
Figure 4D:
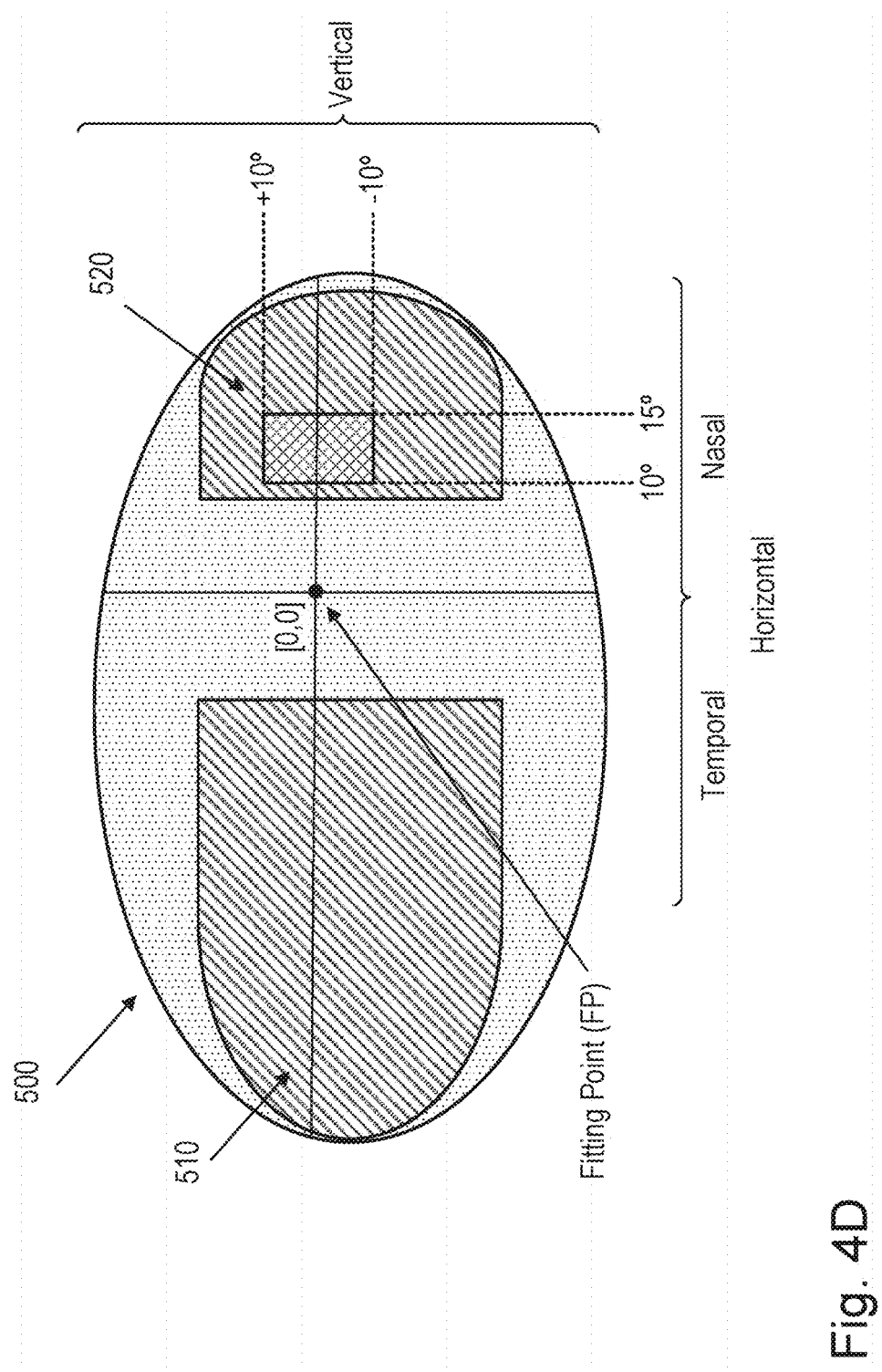
FIG. 4D is a schematic illustration of the horizontal eccentricities referred to in the presently disclosed subject-matter.

According to some embodiments of the presently disclosed subject-matter, the at least one peripheral optical property is determined by correlating between an individual's age or age group and at least one peripheral optical property. This may be implemented by determining at least one change in relative peripheral refraction along horizontal eccentricities of a retinal periphery including the nasal periphery and/or the temporal periphery of the retina in different age groups. Reference is made to FIGS. 4A-4C showing possible correlations between an individual's age and the add power in the nasal periphery of the retina. The correlation may be determined by analyzing the changes in relative peripheral refraction along the horizontal eccentricities of the retinal periphery in different age groups of myopia control clinical trials as shown in FIG. 2 above. More specifically, FIG. 4A shows the changes in relative peripheral refraction in the nasal 10-15° periphery of the retina as a function of age in one example. In this example, the correlation is statistically significant ($p<0.05$) with medium strength ($R=0.16$).

Reference is made to FIG. 4B showing a possible correlation of the same along another horizontal eccentricity. More specifically, FIG. 4B shows the changes in relative peripheral refraction in the nasal 20-25° periphery of the retina as a function of age. In this example, the correlation is statistically significant ($p<0.0001$) with low strength ($R=0.31$). As the myopic child develops, the relative peripheral refraction increases.

Reference is made to FIG. 4C showing a possible correlation of the same along another horizontal eccentricity. More specifically, FIG. 4C shows the changes in relative peripheral refraction in the nasal 30-35° periphery of the retina as a function of age. In this example, the correlation is statistically significant (p<0.0001) with low strength (R=0.34). As the myopic child develops, the relative peripheral refraction increases.

Table 1 and Table 2 below show specific and non-limiting examples of possible lens profiles based on the examples of FIGS. 4A-4C above. More specifically, Table 1 and Table 2 show different correlations between different horizontal peripheral ADD profiles (in Diopters, D) at the nasal retina (i.e. temporal periphery of the lens) and three age groups:

TABLE 1

| | Nasal Retinal eccentricity | | |
|---|---|---|---|
| Age Group | 10-15° | 20-25° | 30-35° |
| 6-9 y | 0.10-0.5 | 0.25-1.25 | 0.50-2.00 |
| 10-12 y | 0.10-0.75 | 0.50-1.75 | 0.75-3.00 |
| 13-16 y | 0.25-1.00 | 1.00-2.50 | 2.00-4.00 |

TABLE 2

| | Nasal Retinal eccentricity | | |
|---|---|---|---|
| Age Group | 10-15° | 20-25° | 30-35° |
| 6-9 y | 0.10-0.75 | 0.50-1.50 | 0.75-2.50 |
| 10-12 y | 0.10-1.00 | 0.75-2.00 | 1.25-3.50 |
| 13-16 y | 0.25-1.5 | 1.25-3.00 | 2.50-5.00 |

As described above, FIG. 4D shows the fitting position FP being a point of intersection of a line of sight for a user with the lens surface 500. Thus, the term "fitting point" or "fitting position" FP relates to a point on a lens surface as mounted in a spectacle frame, aligned with the individual's center of the pupil in its distance viewing position when the individual is looking straight ahead. For example, each of the temporal zone 510 and the nasal zone referred as 520 may be defined as beginning at a horizontal distance in the range of about 3 to 15 degrees (i.e. about 1.5-8 mm) from the FP on the lens surface 500 at the temporal and nasal side of the lens surface 500 respectively and ending at a horizontal distance in the range of about 20 to 40 degrees (i.e. about 10-20 mm) from the FP or at the edge of the frame at each side. The temporal zone 510 and nasal zone 520 can vertically vary from $-3° \leq y \leq +3°$ (i.e. about $-1.5$ mm $\leq y \leq +1.5$ mm) to $-20° \leq y \leq +20°$ (i.e. about $-10$ mm $\leq y \leq +10$ mm). In a specific and non-limiting example, the horizontal eccentricities may refer to vertical values in the range of $-10° \leq y \leq +10°$ (i.e. about $-5$ mm $\leq y \leq +5$ mm). For example, nasal 10-15° refers to all the areas located between those 4 coordinates, as illustrated in the figure.

Figure 5A:
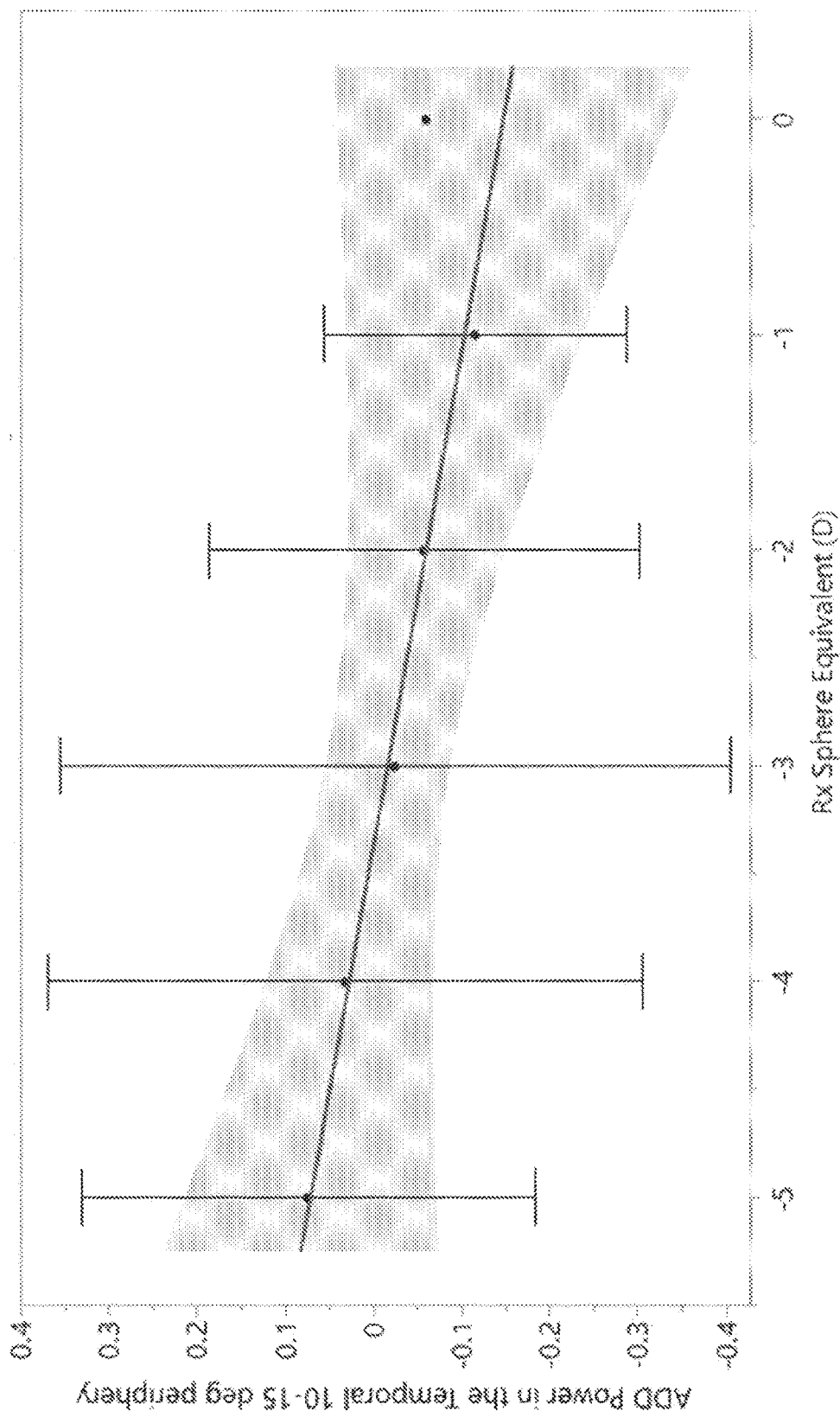
FIGS. 5A-5C are graphical representations of possible different correlations between the add power and the Rx sphere equivalent in the temporal periphery of the retina according to some teachings of the presently disclosed subject-matter.
Figure 5B:
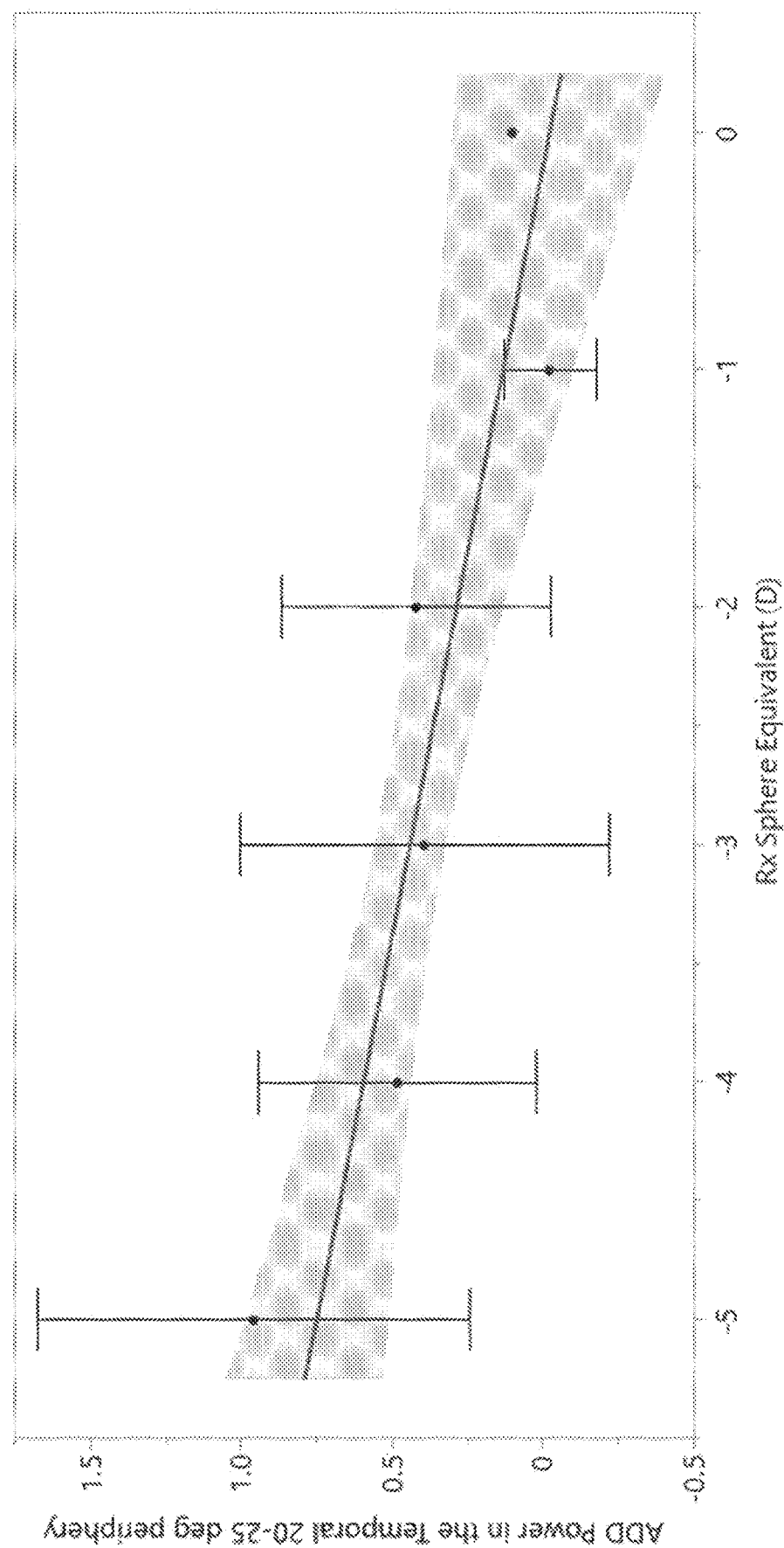
Figure 5C:
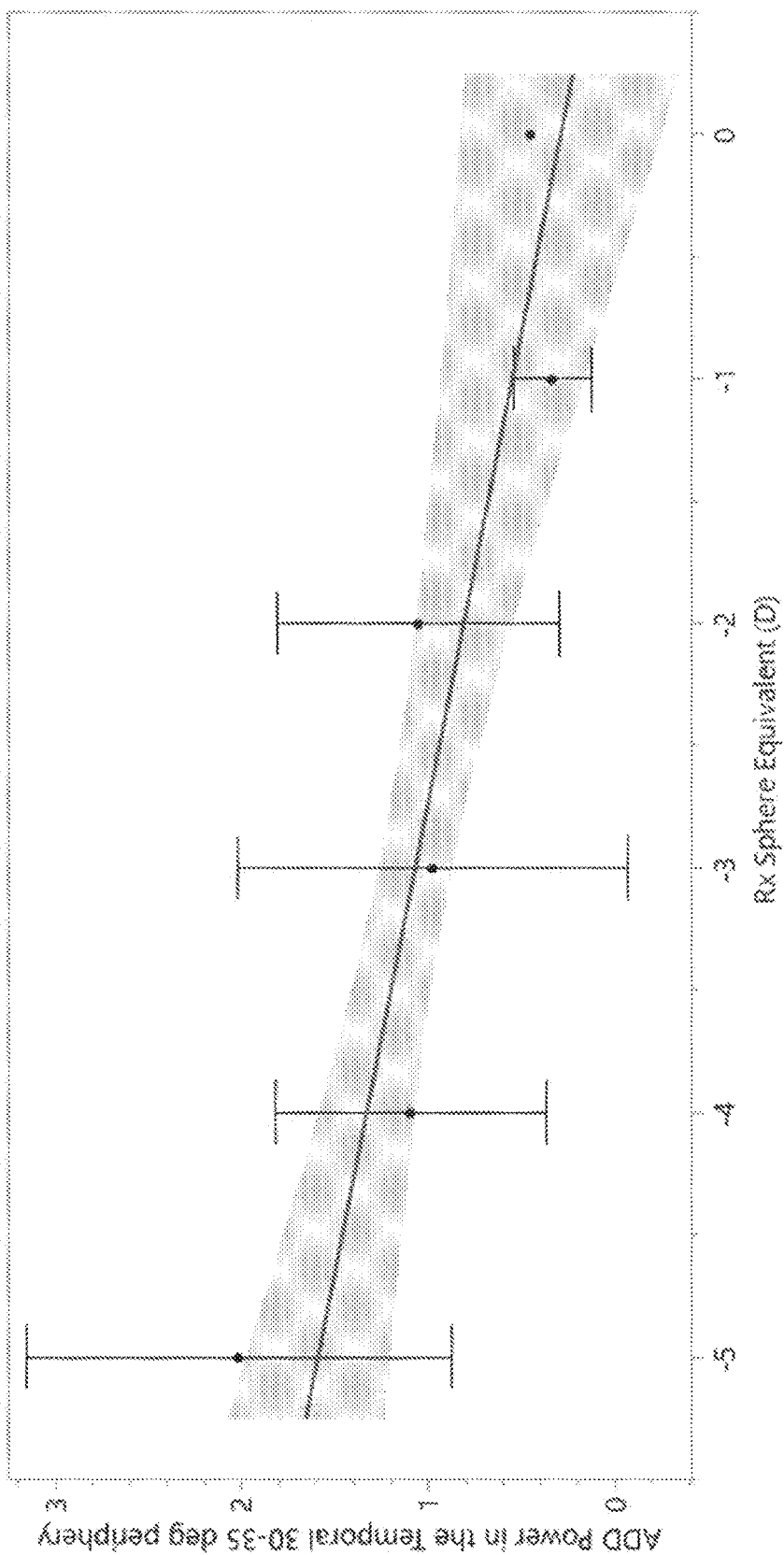

According to another broad aspect of the presently disclosed subject-matter, the optical property profile of the lens is determined by correlating between the eye's Rx and a peripheral optical property at either the nasal or temporal retina. This may be implemented by determining at least one change in relative peripheral refraction along the temporal periphery of the retina as a function of Rx sphere equivalent. Reference is made to FIGS. 5A-5C showing possible correlations between the peripheral add power (i.e. relative PR) and the Rx (central) Sphere Equivalent (SE OD (Right Eye)) in the temporal periphery of the retina. More specifically, FIG. 5A shows sample measurements of the changes in relative peripheral refraction in the temporal 10-15° periphery of the retina as a function of Rx Sphere Equivalent. In this sample, there's a weak trend but no statistically significant correlation.

Reference is made to FIG. 5B showing a possible correlation of the same along another horizontal eccentricity. More specifically, FIG. 5B shows changes in relative peripheral refraction in the temporal 20-25° periphery of the retina as a function of Rx Sphere Equivalent. In this sample, the correlation is statistically significant (p<0.05) with low strength (R=−0.34). Children with higher myopia tend to have higher relative peripheral refraction. Reference is made to FIG. 5C showing a possible correlation of the same along another horizontal eccentricity. More specifically, FIG. 5C shows changes in relative peripheral refraction in the temporal 30-35° periphery of the retina as a function of Rx Sphere Equivalent. In this sample, the correlation is statistically significant (p<0.05) with low strength (R=−0.35). Children with higher myopia tend to have higher relative peripheral refraction.

Table 3 below shows a specific and non-limiting example of a possible lens profile based on the examples of FIG. 5A-5C above. More specifically, Table 3 shows different correlations between different horizontal peripheral ADD profiles at the temporal retina (i.e. nasal periphery of the lens) and two Rx Sphere Equivalent (SE) groups:

TABLE 3

| | Retinal eccentricities | | |
|---|---|---|---|
| Rx SE Group | Temporal 10-15° | Temporal 20-25° | Temporal 30-35° |
| Below −3.00 D | 0.10D-0.75D | 0.50D-1.50D | 1.00D-3.50D |
| −3.00 D and above | 0.25D-1.25D | 0.75D-2.00D | 2.00D-5.00D |

Table 4A and Table 4B below show specific and non-limiting examples of different horizontal peripheral ADD profiles (in Diopters, D) at the temporal periphery of the lens (i.e., corresponding to the nasal retina) and at the nasal periphery of the lens (i.e., corresponding to the temporal retina) in combinations with age groups, Rx and Asian ethnicity.

TABLE 4A

| | Retinal eccentricity | | |
|---|---|---|---|
| Age Group | Nasal 10-15° | Nasal 20-25° | Nasal 30-35° |
| 4-6 y (prevention lens) | 0.10-0.50 | 0.25-0.75 | 0.50-2.00 |
| 6-9 y | Myopia up to −3D SE: 0.25-1.00 | Myopia up to −3D SE: 0.50-1.50 | Myopia up to −3D SE: 1.00-2.50 |
| | Myopia above −3D SE: 0.25-1.50 | Myopia above −3D SE: 1.00-2.50 | Myopia above −3D SE: 1.50-3.00 |

TABLE 4A-continued

| Age Group | Retinal eccentricity | | |
|---|---|---|---|
| | Nasal 10-15° | Nasal 20-25° | Nasal 30-35° |
| 9-12 y | Myopia up to −3D SE: 0.25-1.00 | Myopia up to −3D SE: 0.50-2.00 | Myopia up to −3D SE: 1.00-2.75 |
| | Myopia above −3D SE: 0.25-1.50 | Myopia above −3D SE: 1.50-2.50 | Myopia above −3D SE: 1.50-3.50 |
| 12-16 y | Myopia up to −3D SE: 0.25-1.00 | Myopia up to −3D SE: 1.50-2.50 | Myopia up to −3D SE: 2.00-3.25 |
| | Myopia above −3D SE: 0.25-1.50 | Myopia above −3D SE: 1.50-2.50 | Myopia above −3D SE: 2.50-3.50 |

TABLE 4B

| Age Group | Retinal eccentricity | | |
|---|---|---|---|
| | Temp 10-15° | Temp 20-25° | Temp 30-35° |
| 4-6 y (prevention lens) | 0.10-0.50 | 0.25-0.75 | 0.50-2.00 |
| 6-9 y | Myopia up to −3D SE: 0.10-0.50 | Myopia up to −3D SE: 0.25-1.00 | Myopia up to −3D SE: 0.75-2.25 |
| | Myopia above −3D SE: 0.25-1.00 | Myopia above −3D SE: 0.75-2.00 | Myopia above −3D SE: 1.50-3.25 |
| 9-12 y | Myopia up to −3D SE: 0.10-0.75 | Myopia up to −3D SE: 0.25-1.50 | Myopia up to −3D SE: 0.75-2.50 |
| | Myopia above −3D SE: 0.25-1.00 | Myopia above −3D SE: 0.75-2.00 | Myopia above −3D SE: 1.50-3.50 |
| 12-16 y | Myopia up to −3D SE: 0.10-1.00 | Myopia up to −3D SE: 1.00-2.00 | Myopia up to −3D SE: 2.00-3.00 |
| | Myopia above −3D SE: 0.25-1.00 | Myopia above −3D SE: 1.00-2.50 | Myopia above −3D SE: 2.00-3.50 |

In some embodiments, the optical optimization of the lens surface may also be implemented according to the astigmatism and not only according to sphere equivalent, in contrast to other myopia control lens solutions. Optimization of the peripheral zones induces a more accurate optical optimization of the entire lens surface, which may be thus determined according to both spherical power and cylinder power and axis along the horizontal power profile. Accurate optimization based on both spherical power and cylinder power yields a more precise horizontal power profile in the lens which is expected to result in a more effective myopia control mechanism and may have a positive impact on compliance. The horizontal power profile refers to a horizontal direction plus or minus 30 degrees. The inventors found that lens optimization according to astigmatism is possible, due to a clear trend that was discovered in the clinical data in the change in cylinder power in each peripheral direction related to the cylinder power in the center. They also found a clear trend in the clinical data in the cylinder axis measurements on the retinal periphery, such as the cylinder axis converging to about 90 degrees, regardless of the central cylinder axis of the conventional prescription.

The trend found by the inventors with respect to the change in astigmatism in each periphery relative to the center also indicates a certain nasal-temporal asymmetry. A higher relative cylinder power is found in the temporal retina as compared to the nasal retina (Wilcoxon test, p<0.05). Thus, the lens may have a certain cylinder power profile having a customized horizontal asymmetry across the lens. The horizontal asymmetry relates to the different optical property (e.g. positive power) incorporated in the nasal area compared to the temporal area. The asymmetry across the lens may be implemented by calculating a difference in the cylinder power along horizontal eccentricities in the retinal periphery and correlating between the difference in the cylinder power along horizontal eccentricities of a retinal periphery (including the nasal periphery or the temporal periphery of the retina) and the Rx.

Figure 6A:
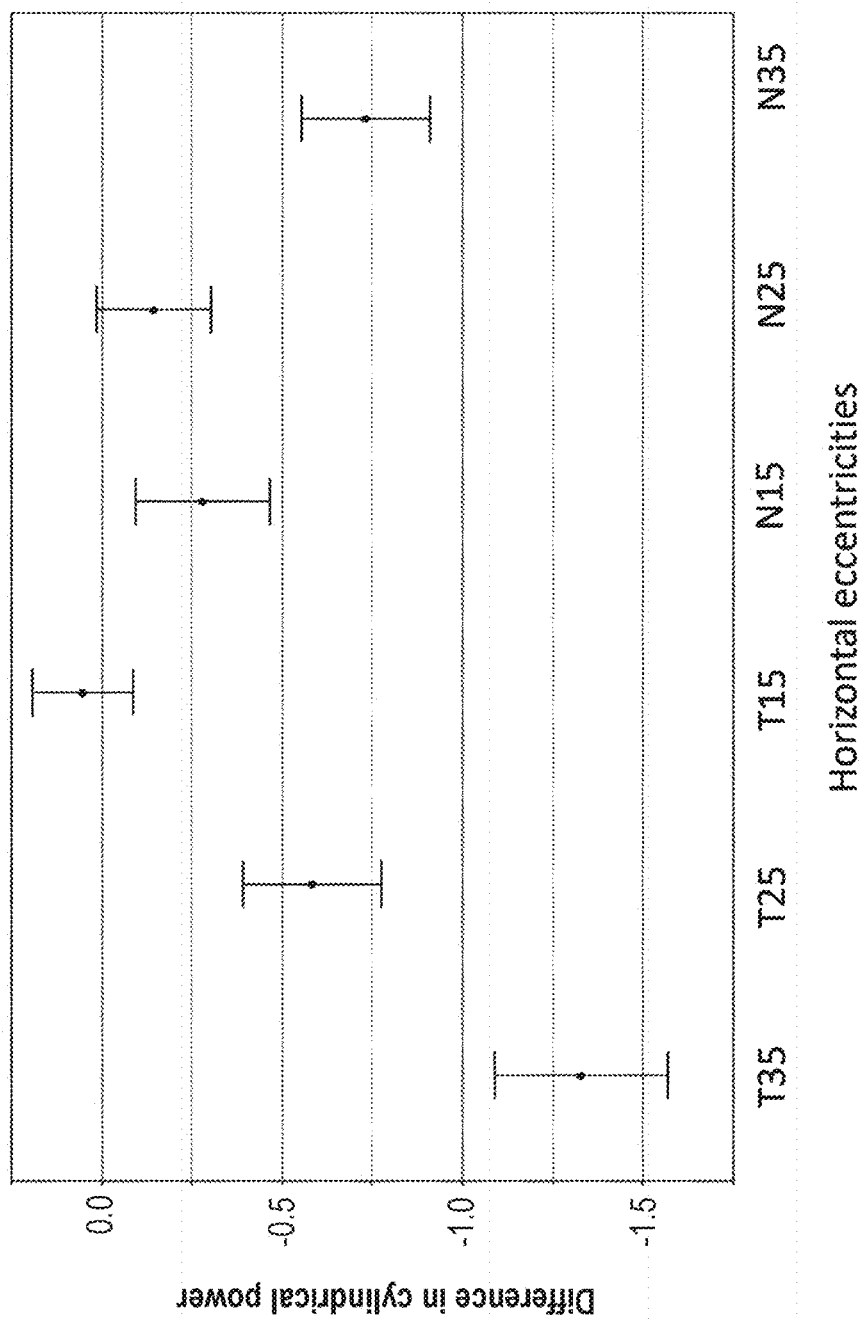
FIGS. 6A-6B are graphical representations showing trends in the difference in the cylinder power (with respect to the cylinder power at the center of the lens) along the peripheral eccentricities according to some teachings of the presently disclosed subject-matter.
Figure 6B:
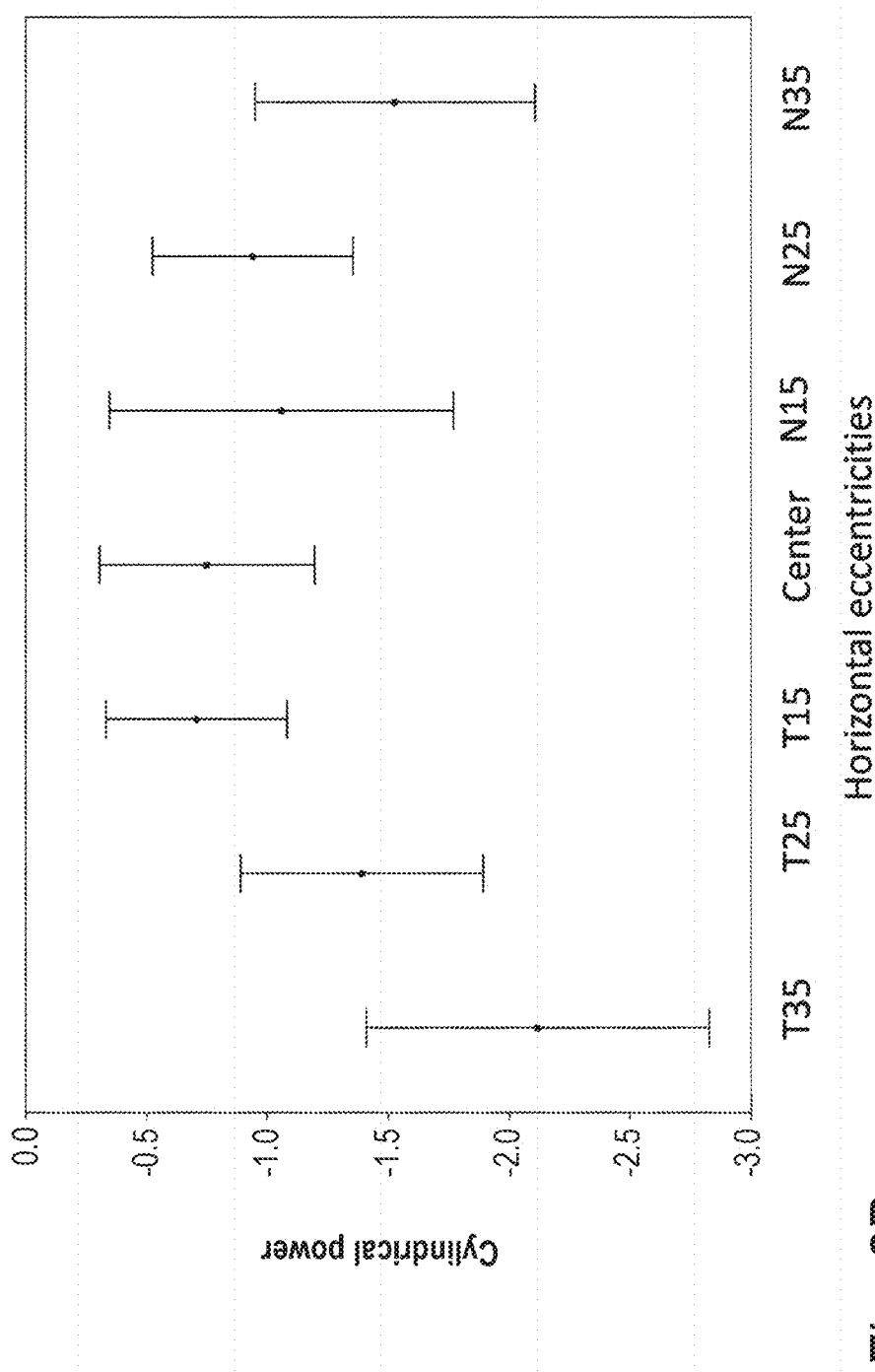

Reference is made to FIGS. 6A-6B showing trends in the difference in the cylinder power (with respect to the cylinder power at the center of the lens) along the peripheral eccentricities. More specifically, FIG. 6A shows trends in the difference in the cylindrical power (relating to the center CYL) along the horizontal eccentricities in the retinal periphery. Farther eccentricities demonstrate higher differences (more negative) in the CYL, and, more specifically, the temporal eccentricities demonstrate higher differences in the CYL compared to the nasal. FIG. 6B shows trends in the cylindrical power along the horizontal eccentricities in the retinal periphery. Farther eccentricities demonstrate stronger (more negative) CYL values, and more specifically, the temporal eccentricities demonstrate stronger CYL values compared to the nasal.

Figure 7A:
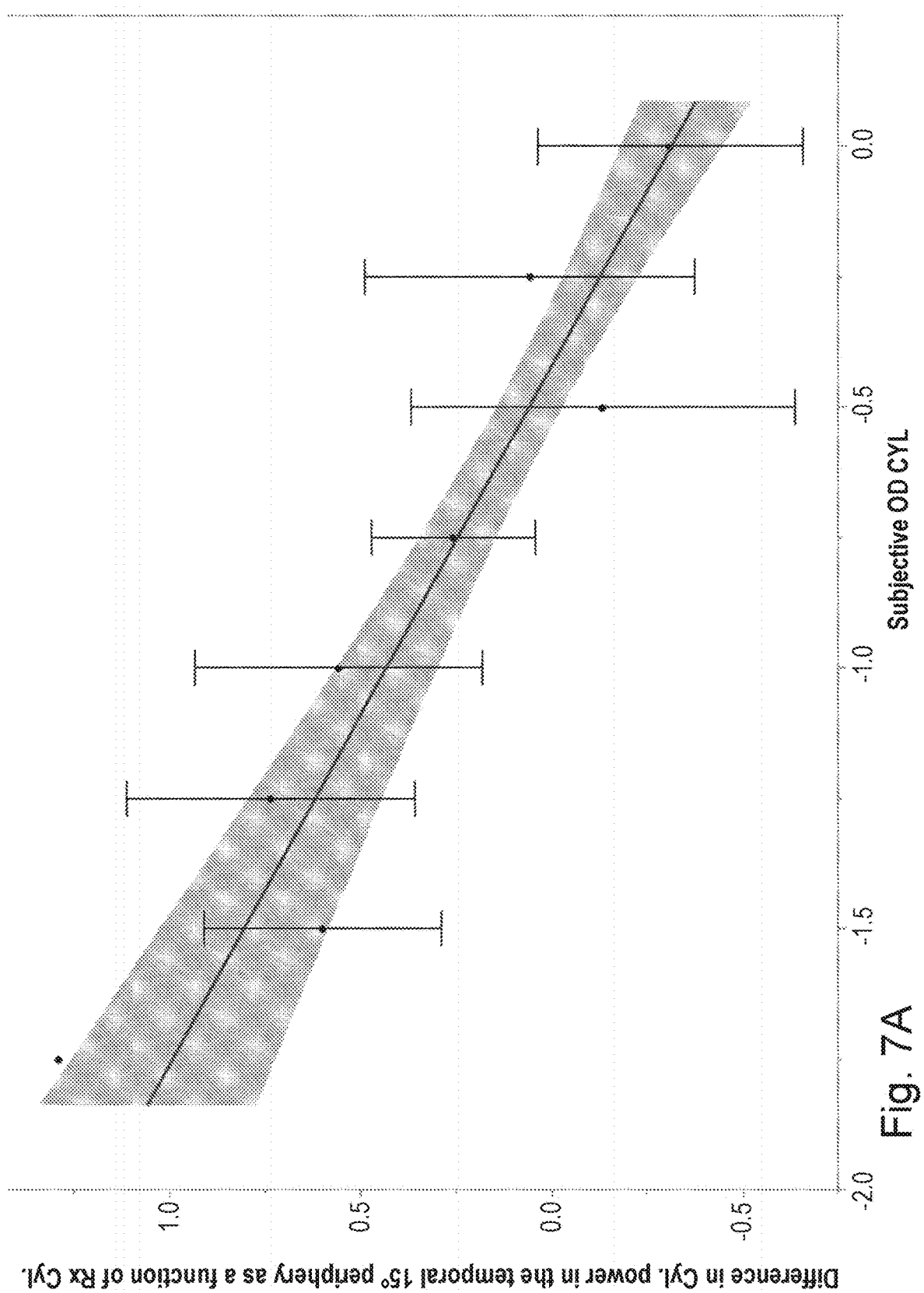
FIGS. 7A-7F are graphical representations of possible different correlations between the difference in the cylinder power along horizontal eccentricities of a retinal periphery and the Rx according to some teachings of the presently disclosed subject-matter.
Figure 7B:
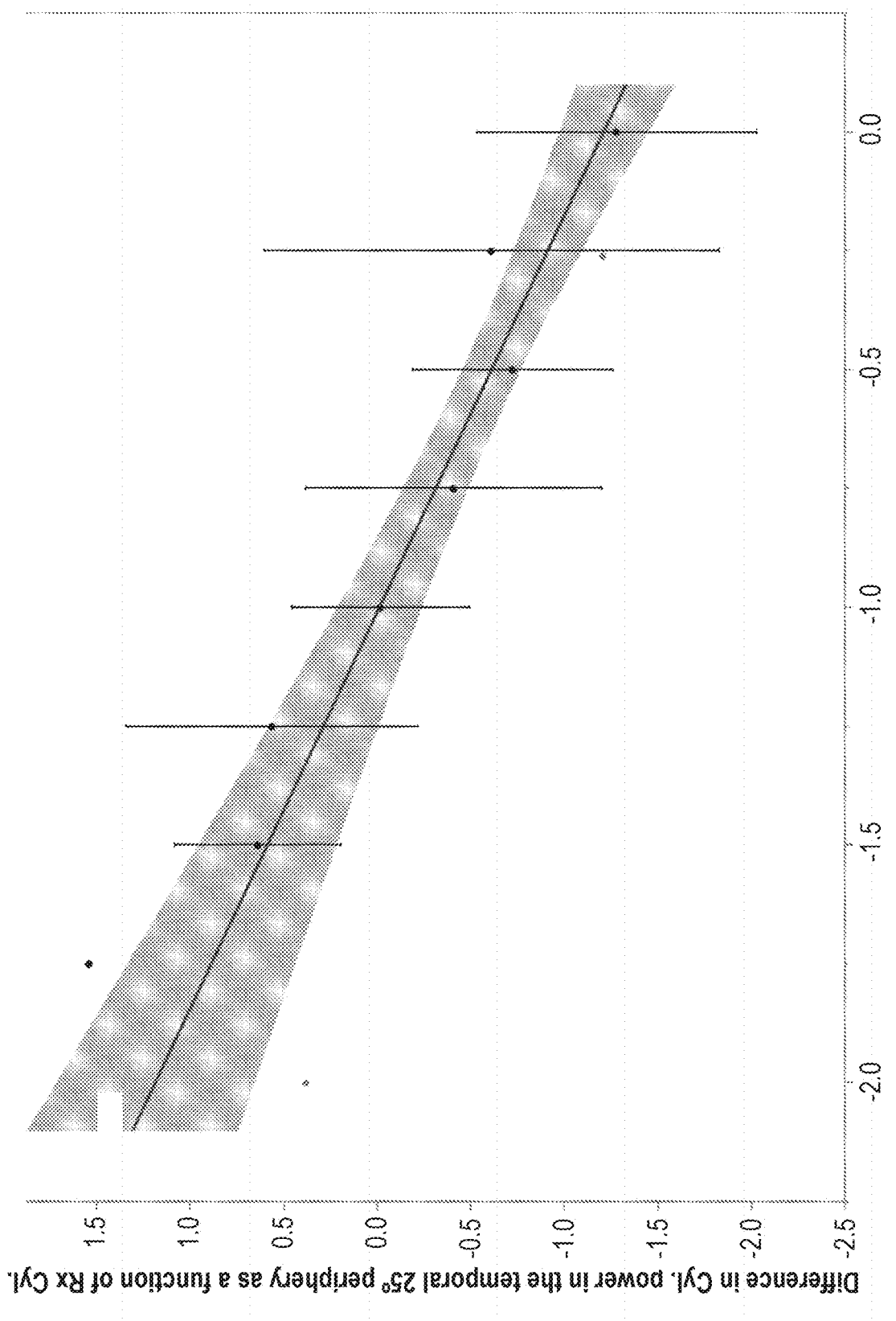
Figure 7C:
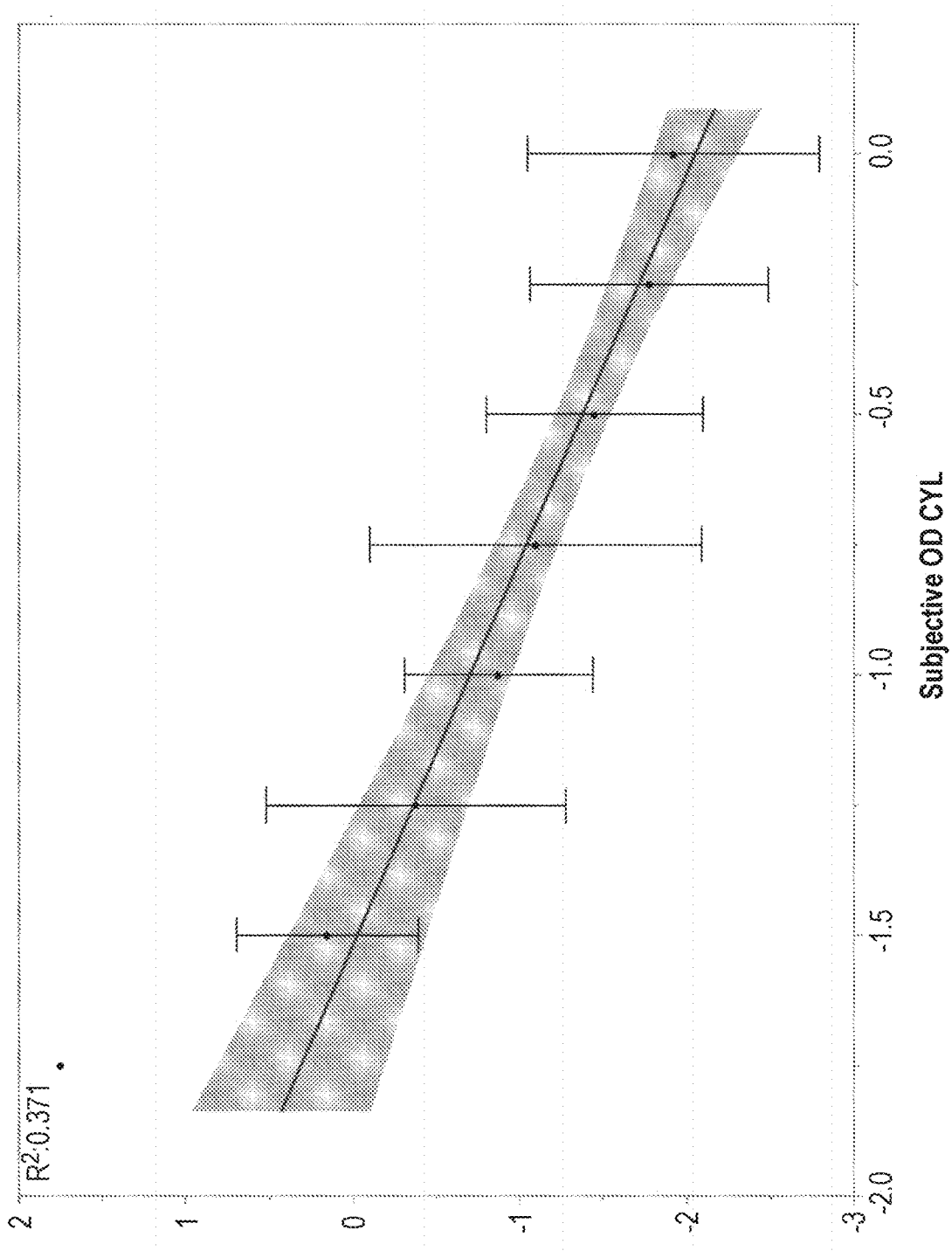
Figure 7D:
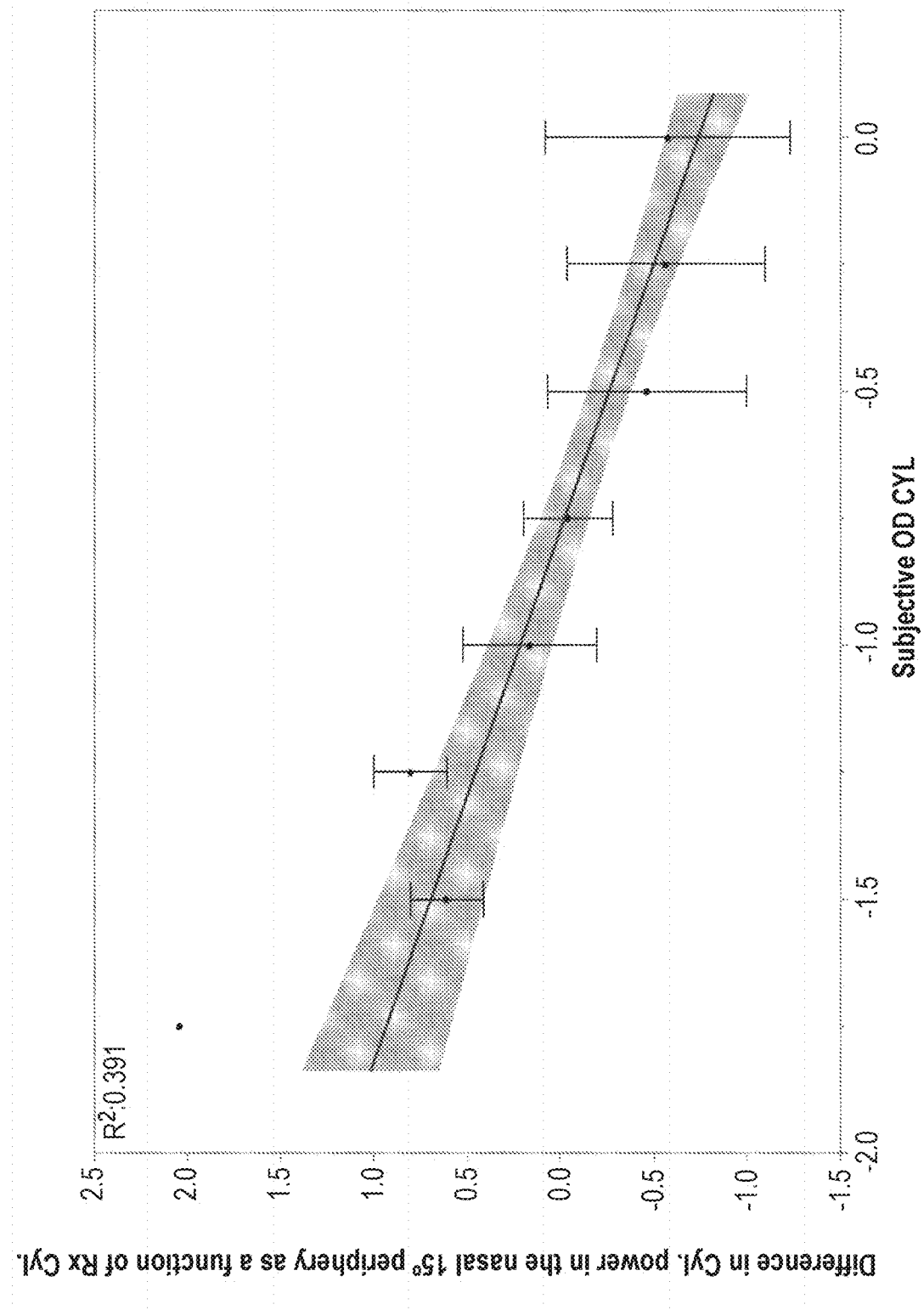
Figure 7E:
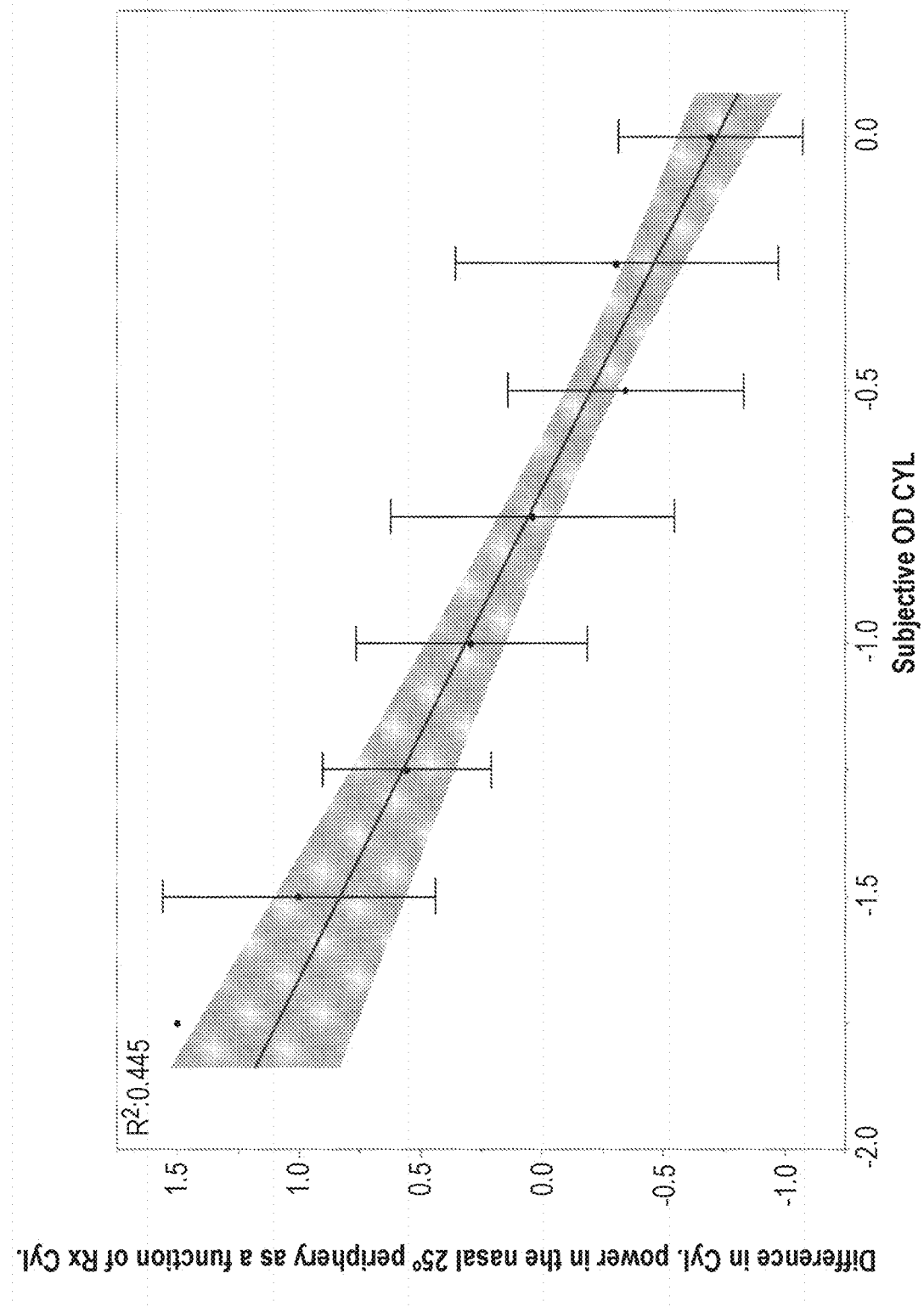
Figure 7F:
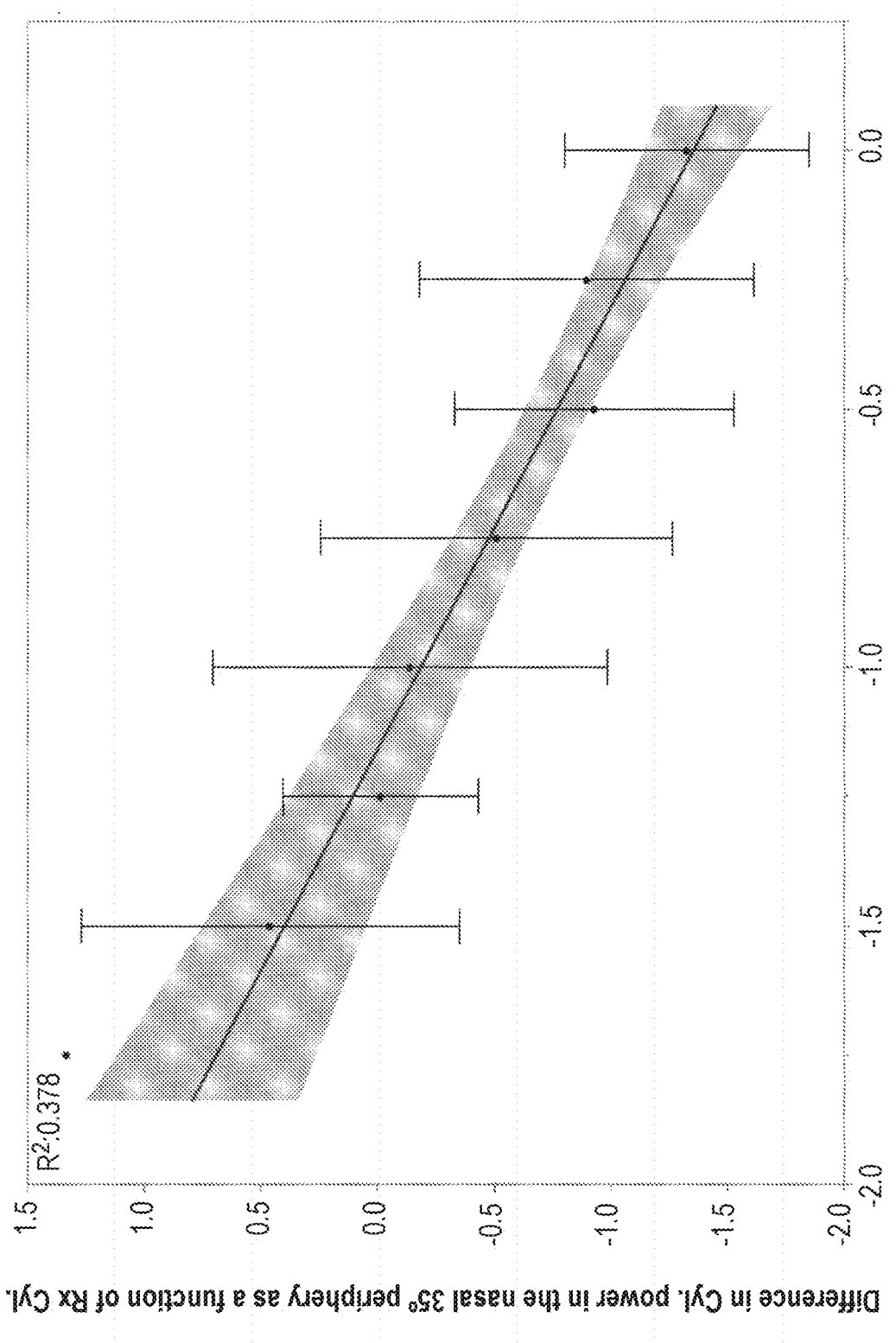

Reference is made to FIGS. 7A-7F showing a correlation between the difference in the cylinder power along horizontal eccentricities of a retinal periphery (including the nasal periphery or the temporal periphery of the retina) and the Rx. More specifically, the figures show correlation between peripheral changes in cylinder power (Cyl) and the cylinder power of the prescription (Rx Cyl). Lower Rx Cyl power demonstrates more negative difference in Cyl (meaning that the measured Cyl at this point is higher (more negative). FIG. 7A shows trends in the difference in Cyl (with respect to the center) at the temporal 15° retinal periphery as a function of Rx Cyl. Correlation is statistically significant (p<0.05) with medium strength (R=−0.63). FIG. 7B shows trends in the difference in Cyl (relative to the center) at the temporal 25° retinal periphery as a function of Rx Cyl. Correlation is statistically significant (p<0.05) with medium strength (R=−0.58). FIG. 7C shows trends in the difference in Cyl (relative to the center) at the temporal 35° retinal periphery as a function of Rx Cyl. The correlation is statistically significant (p<0.05) with medium strength (R=−0.61). FIG. 7D shows trends in the difference in Cyl (relative to the center) at the nasal 15° retinal periphery as a function of Rx Cyl. The correlation is statistically significant (p<0.05) with medium strength (R=−0.63). FIG. 7E shows trends in the difference in Cyl (relative to the center) at the nasal 25° retinal periphery as a function of Rx Cyl. The correlation is statistically significant (p<0.05) with medium strength (R=−0.67). FIG. 7F shows trends in the difference in Cyl (relative to the center) at the nasal 35° retinal periphery as a function of Rx Cyl. The correlation is statistically significant (p<0.05) with medium strength (R=−0.61a).

Tables 5A-5B below show specific and non-limiting examples of possible lens profiles based on the examples of FIG. 7A-7F above. More specifically, Table 5A shows different correlations between the difference in the cylinder power along horizontal eccentricities of a temporal retinal periphery and different values of Rx Cyl and Table 5B shows different correlations between the difference in the cylinder power along horizontal eccentricities of the nasal periphery and different values of Rx Cyl.

TABLE 5A

| Rx CYL Group | Retinal eccentricities | | |
|---|---|---|---|
| | Temporal 10-15° | Temporal 20-25° | Temporal 30-35° |
| 0-0.50 D | −0.50D-+1.00D | −0.50D-+1.00D | −0.50D-+1.00D |
| 0.75-1.00D | −1.50D-0.00D | −1.00D-+0.50D | −1.00D-+0.50D |
| 1.25D and above | −2.50D--1.00D | −2.00D-0.00D | −1.50D-0.00D |

TABLE 5B

| Rx CYL Group | Retinal eccentricities | | |
|---|---|---|---|
| | Nasal 10-15° | Nasal 20-25° | Nasal 30-35° |
| 0-0.50 D | −0.50D-+1.00D | −0.50D-+1.00D | −0.50D-+1.00D |
| 0.75-1.00D | −1.00D-+0.50D | −1.00D-+0.50D | −1.00D-0.00D |
| 1.25D and above | −1.50D-0.00D | −1.50D-0.00D | −2.00D-0.00D |

In some embodiments, further customization of the lens(es) may be provided to optimize the cylinder-related lens parameters, based solely on the age of the individual and/or the conventional prescription (Rx). The dioptric power incorporated in the periphery of the lens may be the add profile and the astigmatism (power and axis) according to the values calculated (using statistical methods based on input parameters—age and Rx). Alternatively, the dioptric power incorporated in the periphery of the lens may be the add profile and the astigmatism (power and axis) being different from (i.e. more/less astigmatism power) the values calculated (using statistical methods based on input parameters—age and/or Rx).

In some embodiments, the lens power, incorporated in the temporal periphery of the lens, is configured according to individual's age, and the power incorporated in the nasal periphery of the lens is configured according to Rx. Alternatively, the peripheral nasal optical property may be determined by correlating between an individual's age or age group and a peripheral nasal optical property, and the peripheral temporal optical property may be determined by correlating between the eye's Rx and the peripheral optical property at the temporal retina. The temporal periphery zone may be configured to have a first peripheral lens power and the nasal periphery zone may be configured to have a second peripheral lens power being determined according to the eye's Rx such that the optical property defines an asymmetry across the lens.

Figure 8:
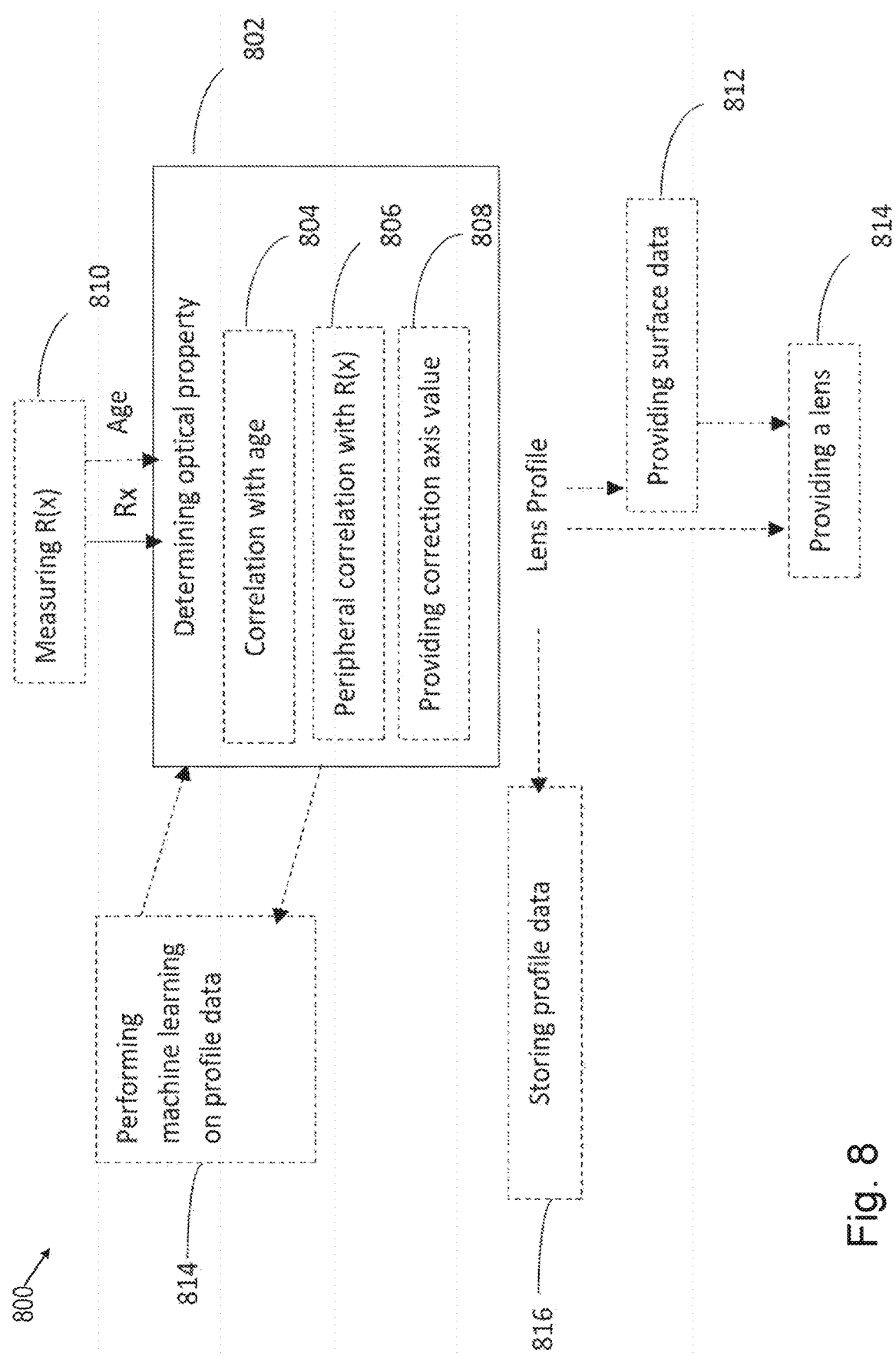
FIG. 8 is a schematic flow chart of a method of configuring a lens aimed at treating at least one eye of an individual according to one broad aspect of the presently disclosed subject-matter.

According to a broad aspect of the presently disclosed subject-matter, there is provided a method of configuring a lens aimed at treating at least one eye of an individual. Reference is made to FIG. 8, exemplifying, by the way of a flow chart, the main steps of method 800 of the presently disclosed subject-matter. Method 800 includes obtaining a prescription (Rx) of at least one eye and optionally obtaining an age of the individual, determining an optical property of a lens in 802 (e.g. peripheral property) according to the eye's Rx, and optionally according to the age of the individual. In some embodiments, determining the optical property includes correlating between an individual's age and at least one peripheral optical power in 804. Alternatively or additionally, determining the optical property includes correlating between the eye's Rx and at least one of peripheral optical property at either the nasal or temporal retina in 806. The correlation analysis may include comparisons between received data and reference data. Reference data can be based on machine learned/statistically shown correlations for defaults of measured values. Reference data may be used to generate data defining an optical surface geometry of a lens. The optical surface geometry can be used to manufacture and provide the lens to a customer. As described with respect to FIG. 3 above, the method may include, after having provided a lens profile, performing a machine learning procedure in 814 in which the lens profile is stored as a reference data to be correlated with future measured data. The reference data can also be personal. Optionally, method 800 may include storing reference data in 816. All the data may be saved into a database. As shown in 814, the method may include employing algorithms of machine learning which are trained using training data sets that include large number of individuals. The database may be determined by various machine learning techniques utilizing analytical data. The correlation may be determined employing machine learning techniques in order to establish a precise correlation. When employed in industrial contexts, machine learning methods may be referred to as predictive analytics or predictive modeling. Additionally or alternatively, Artificial Intelligence (AI) techniques may be used to detect alternate behavior or events indicative of vision impairment.

Alternatively, or additionally to the correlation techniques defined above, determining the optical property may include determining an optical property of a lens by providing a correction of an axis value, such that the axis value converges to about 90 degrees at either nasal or temporal periphery in 808. This technique will be detailed further below with respect to FIGS. 9A-9B.

In some embodiments, method 800 includes the initial step of measuring a prescription (Rx) of at least one eye in 810 and/or the final step of providing surface data (e.g. the geometry of the back and front lens surfaces as well as any other data required for manufacturing including lens parameters such as: blank properties, minimum thickness (of center and edges), lens conventional measuring points such as FP, PRP (Prism Reference Point) . . . ) for generating a lens in 812 or directly (after step 810) or indirectly (after step 812) providing a lens with the optical property in 814.

Figure 9A:
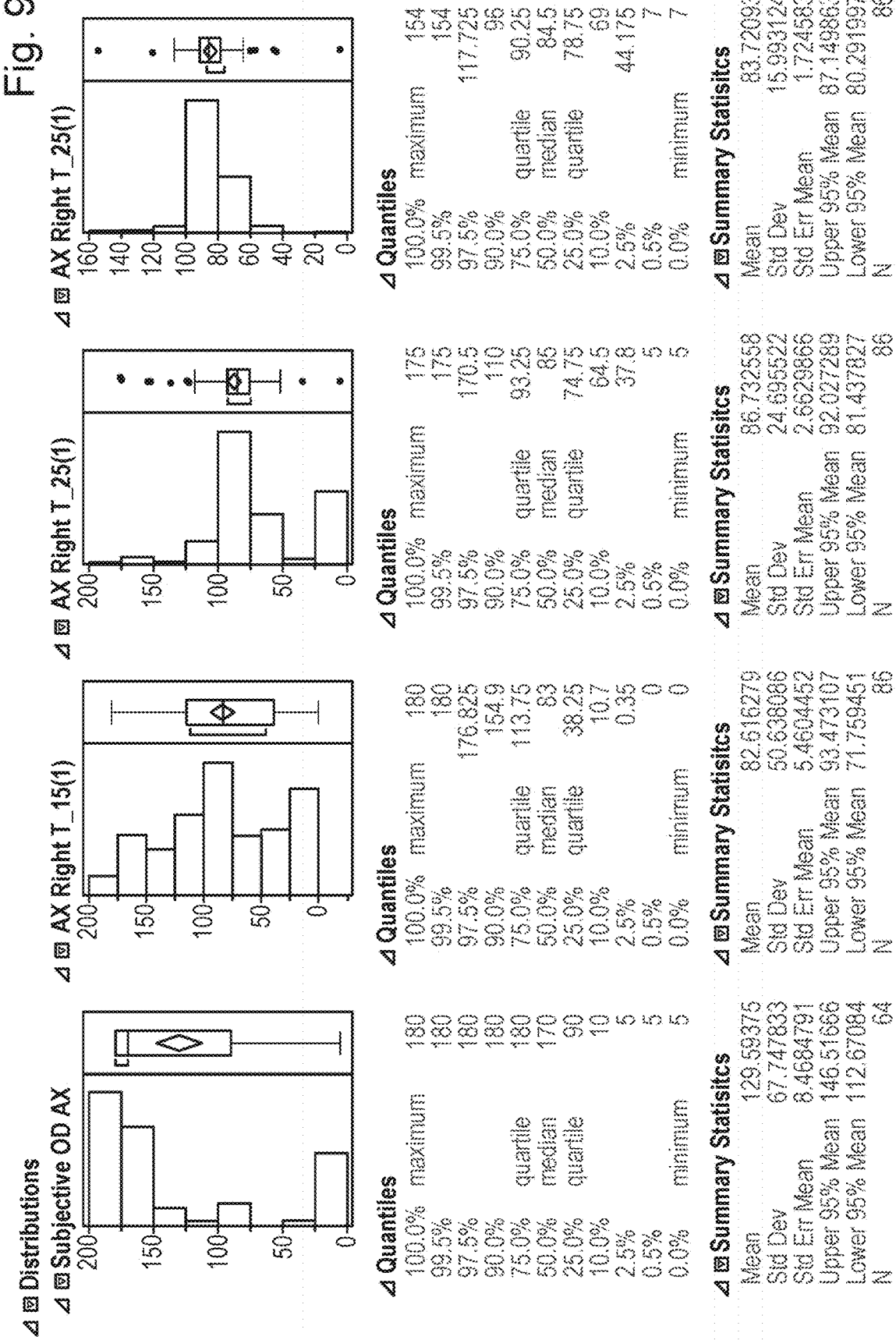
FIGS. 9A-9B are graphical representations showing a trend in changes in the astigmatism axis value along the peripheral eccentricities of the retina according to some teachings of the presently disclosed subject-matter.
Figure 9B:
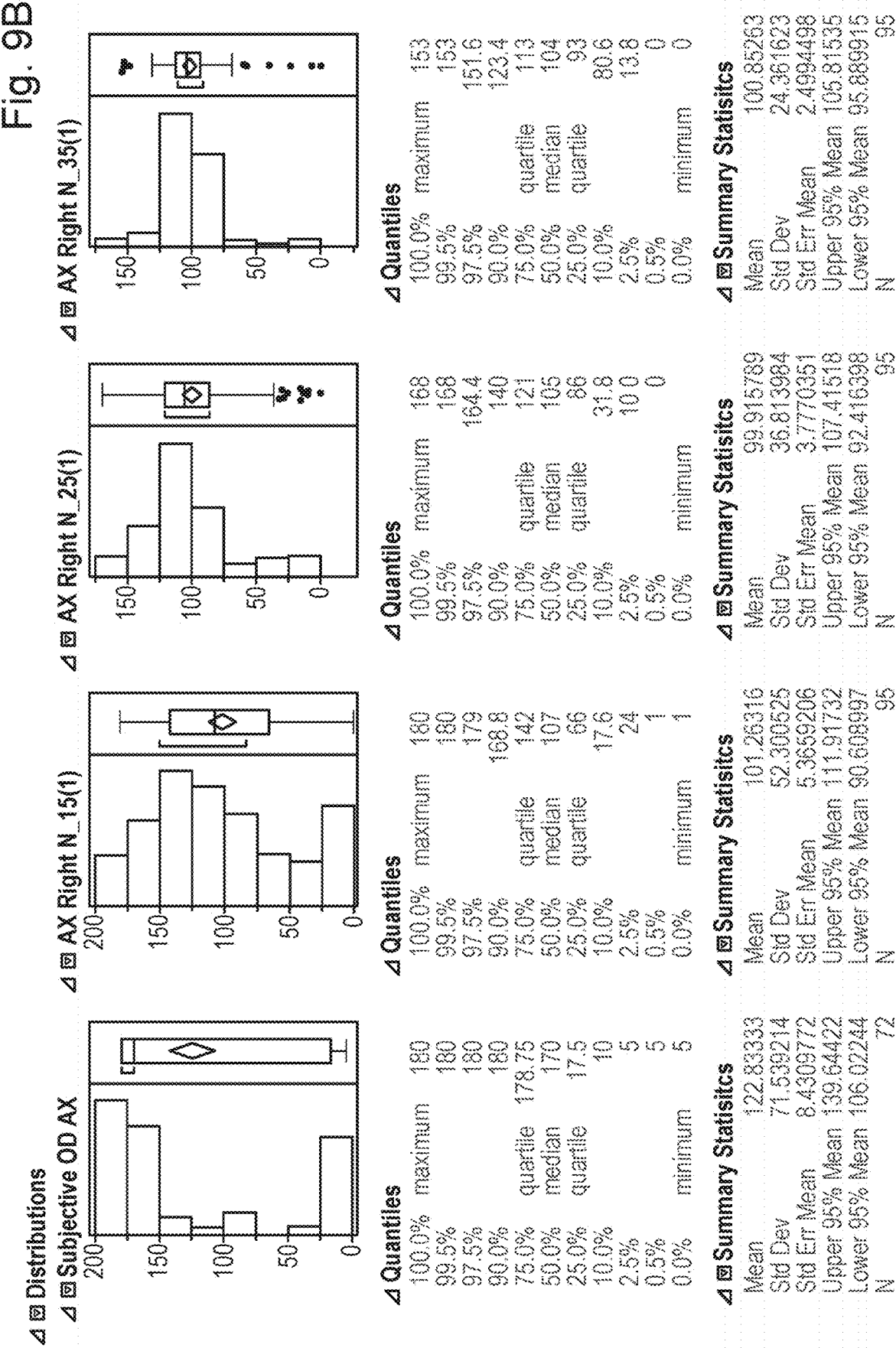

According to another broad aspect of the presently disclosed subject-matter, there is provided a technique for affecting the progression of myopia in an eye of an individual having a certain prescription (Rx), by defining trends in the astigmatism axis along the peripheral eccentricities of the retina. It was found that at least one peripheral eccentricity includes correction of an axis value, such that the axis value converges to about 90 degrees at either nasal or temporal periphery. For example, the axis value may be in a range of about 80 degrees to 120 degrees at the nasal periphery and in a range of about 60 degrees to 100 degrees at the temporal periphery. Reference is made to FIGS. 9A-9B showing a trend in changes in the axis value along the peripheral eccentricities of the retina as found by the inventors of the presently disclosed subject-matter. More specifically, FIG. 9A shows trends in the axis measured at the temporal retina compared to the Rx axis. The left distribution graph demonstrates the Rx axis sample distribution, in which it can be seen that most of the axes measured are close to 0/180 degrees. The three other distribution graphs show axes located in the temporal periphery of the lens (left to right: T15, T25, T35) that get more and more close to 80-90 degrees. FIG. 9B shows trends in the axis measured at the nasal retina compared to the Rx axis. Left distribution graph shows the Rx axis sample distribution, in which it can be seen that most of the axes measured are close to 0/180 degrees. The three other distributions graphs show axes located in the nasal periphery of the lens (left to right: N15, N25, N35) that get more and more close to 100 degrees.

Table 6 below shows specific and non-limiting examples of possible lens profiles based on the examples of FIGS. 9A-9B above. More specifically, Table 6 shows suggested cylinder axis values at different peripheral eccentricities (temporal and nasal) of the retina:

TABLE 6

| Temporal 10-15° | Temporal 20-25° | Temporal 30-35° | Nasal 10-15° | Nasal 20-25° | Nasal 30-35° |
|---|---|---|---|---|---|
| Rx Axis | 60-100° | 60-100° | Rx Axis | 80-120° | 80-120° |

Figure 10:
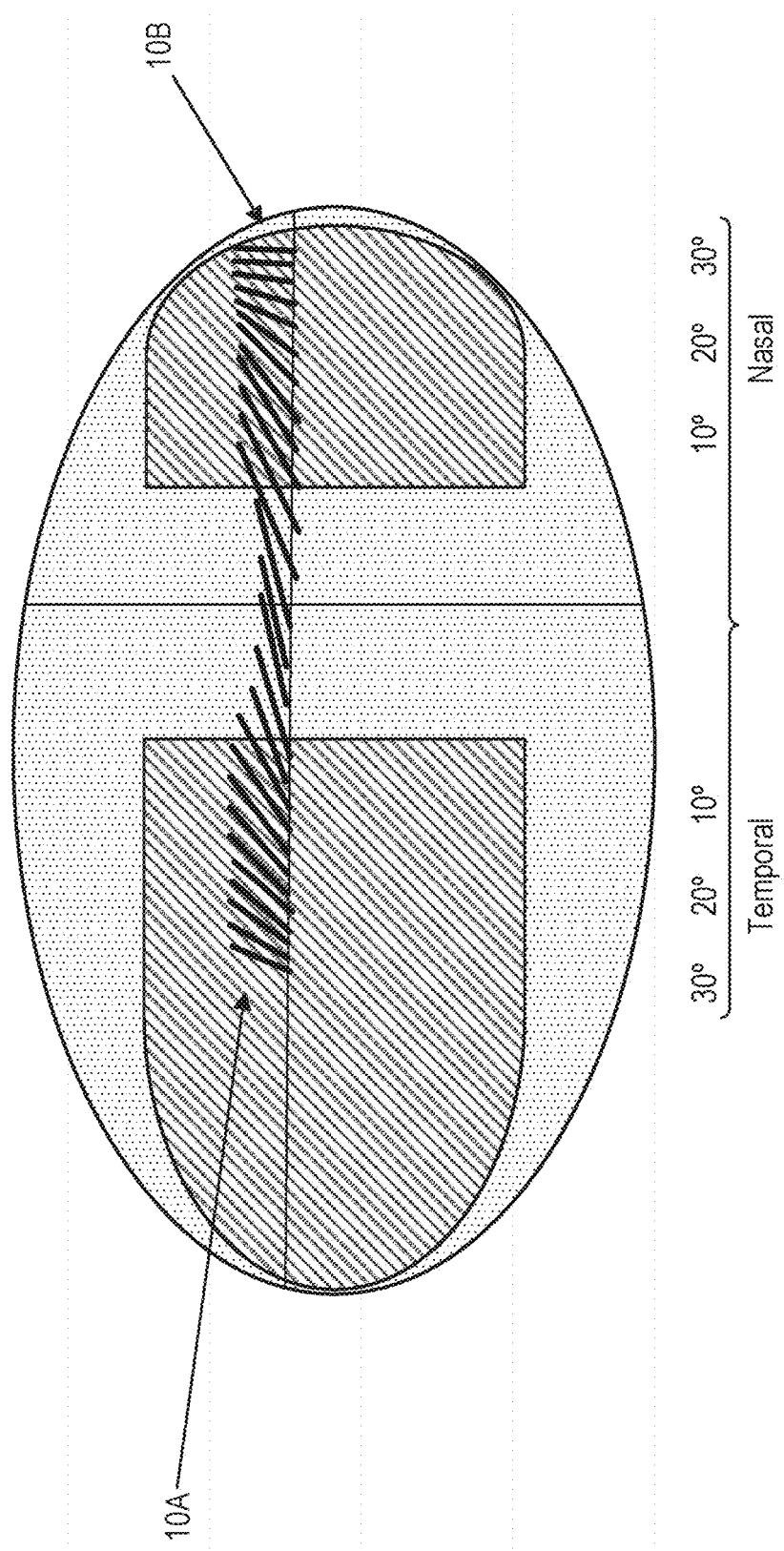
FIG. 10 is a schematic illustration of an example of cylindrical axis convergence according to some embodiments of the presently disclosed subject-matter.

Reference is made to FIG. 10 showing a specific and non-limiting example of a convergence of the axis of the horizontal peripheral power profile of the lens to specific orientations (i.e. 100° at the far temporal periphery of the lens and 90° at the far nasal periphery of the lens). In this specific and non-limiting example as illustrated in region 10A, the axis of the temporal peripheral power profile gradually converges from about 180° around the FP, along the horizontal meridian towards the far temporal periphery and reaches to around 100° when moving from 10° to 30°. In region 10B, the axis of the nasal peripheral power profile converges from about 180° around the FP, along the horizontal meridian towards the far nasal periphery and reaches to around 90° when moving from 10° to 30°.

Figure 11:
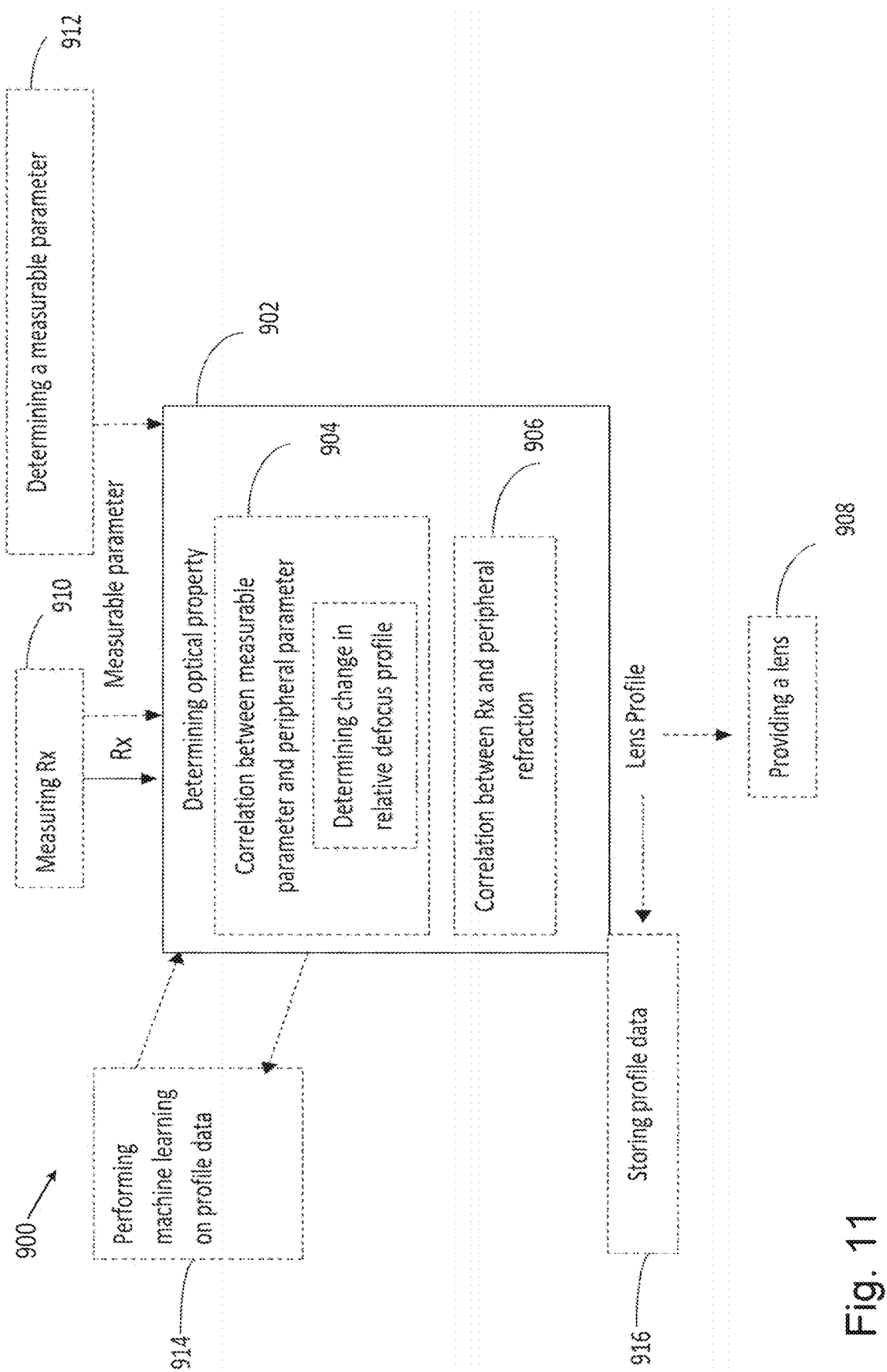
FIG. 11 is a schematic flow chart of a method of configuring a lens aimed at treating at least one eye of an individual according to another broad aspect of the presently disclosed subject-matter.

According to a broad aspect of the presently disclosed subject-matter, there is provided a method of configuring a lens aimed at treating at least one eye of an individual. Reference is made to FIG. 11, exemplifying, by the way of a flow chart, the main steps of method 900 of the presently disclosed subject-matter. Method 900 includes obtaining a prescription (Rx) of at least one eye, and at least one measurable parameter of an individual (such as the age of the individual); and determining in 902 an optical property of a non-central position on a lens according to the eye's Rx and the measurable parameter of the individual. The at least one measurable parameter may include at least one of geographic area of living, type of environment, age of myopia onset, time spent outdoors, parental myopia, the age of the individual, handedness or ethnicity. Determining the optical property in 902 may include providing an optical property defining a central optical zone with an optical correction according to the eye's Rx and at least one peripheral zone providing at least one peripheral optical property being configured to focus far images in front of the peripheral retina. The peripheral optical property may include a horizontal power profile.

Determining the optical property in 902 may include correlating in 904 between at least one measurable parameter and at least one peripheral optical parameter. Determining the correlation between at least one measurable parameter and at least one peripheral optical property in 904 may include determining at least one change in relative peripheral defocus profile along horizontal eccentricities of a retinal periphery including the nasal periphery and/or the temporal periphery of the retina in different measurable parameters.

Additionally or alternatively, determining the optical property in 902 may include correlating in 906 between the eye's Rx and at least one of peripheral refraction at the peripheral retina. The at least one peripheral zone may include temporal and/or nasal zones such that providing at least one peripheral optical property is configured to focus far images in front of the nasal peripheral retina and/or the temporal peripheral retina respectively.

The correlation analysis may include comparisons between at least one measurable parameter and at least one peripheral optical property. As described with respect to FIG. 8 above, the method may include, after having provided a peripheral optical property, performing a machine learning procedure in 914 in which the peripheral optical property of the lens, correlated with a specific measurable parameter, is stored as a reference data to be correlated with future measured data. Optionally, method 900 may include storing reference data in 916. All the data may be saved into a database.

In some embodiments, method 900 includes the initial step of measuring a prescription (Rx) of at least one eye in 910 and/or the final step of providing a lens with the optical property in 908. Additionally or alternatively, method 900 may include the initial step of determining the measurable parameter of the individual in 912. For example, one of the measurable parameters which may be determined may be the parental myopia. The parental myopia may be determined by identifying a plurality of parental parameters including at least one of existence of myopia in at least one parent, a level of myopia of at least one parent, a certain amount of myopia of at least one parent, or an overall parental myopia parameter being a scaled parameter of each parental parameter.

According to another aspect of the presently disclosed subject-matter, there is provided at least one myopia control lens being configured per each individual by using at least one measurable parameter. The myopia control lens may be configured after the collection of the one or more measurable parameters enabling the determination of the horizontal power profile. Alternatively, a set of myopia control lenses may be initially configured according to a predefined set of parameters and the appropriate myopia control lens may be selected among the set of previously configured myopia control lenses by considering for example the age, the prescription (Rx) and parental myopia status of each specific individual. For example, if the parental myopia status is missing from the predefined set of parameters, the parental myopia may be determined as "medium" as a default value as will be described further below.

In one embodiment, the parental myopia parameter is determined by considering the existence of myopia of at least one parent, and/or a scaling of an overall parental myopia parameter being defined as:

"Low": none of the parents are myopic; "Medium": one parent is myopic; and "High": both parents are myopic.

In one embodiment, the parental myopia parameter is determined by considering a level of myopia of at least one parent (rated by no myopia/low myopia (up to about −3D)/ medium myopia (about −3D to −6D)/high myopia (above about −6D)) and/or a scaling of the overall parental myopia parameter being defined in the following Table 7 as:

TABLE 7

| Mother | Father | | |
|---|---|---|---|
| | low | medium | high |
| low | LOW | LOW | MEDIUM |
| medium | LOW | MEDIUM | HIGH |
| high | MEDIUM | HIGH | HIGH |

In one embodiment, the parental myopia parameter is determined by considering an amount of myopia (e.g. sphere equivalent value or sphere power<=0D) of at least one parent and the overall parental myopia parameter. In this case, the overall parental myopia parameter is a numeric value representing a calculation taking into account the sphere equivalent value or sphere power of at least one parent (value<=0D). For example, the overall parental myopia parameter of both parents may be categorized from "low" to "high".

In one embodiment, the parental myopia parameter affects solely the temporal periphery of the lens. The "higher" the parental myopia parameter is, the higher (more positive) the sphere (SPH) power, or the SPH equivalent power is at the temporal periphery of the power profile of the lens in at least one eccentricity.

In one embodiment, the parental myopia parameter affects solely the nasal periphery of the lens. The "higher" the parental myopia parameter is, the higher (more positive) the SPH power, or the SPH equivalent power is at the nasal periphery of the power profile of the lens in at least one eccentricity.

In one embodiment, the parental myopia parameter affects both the temporal and the nasal peripheries of the lens. The "higher" the parental myopia parameter is, the higher (more positive) the SPH power, or the SPH equivalent power is at the temporal and the nasal peripheries of the power profile of the lens in at least one eccentricity of each part (nasal/ temporal).

In one embodiment, the ethnicity parameter affects solely the temporal periphery of the lens. In Asian Ethnicities the SPH power, or the SPH equivalent power at solely the temporal periphery of the power profile of the lens in at least one eccentricity is higher than in Caucasians.

In one embodiment, the ethnicity parameter affects solely the nasal periphery of the lens. For example, in Asian Ethnicities the SPH power, or the SPH equivalent power, at solely the nasal periphery of the power profile of the lens in at least one eccentricity is higher than in Caucasians.

In one embodiment, the ethnicity parameter affects both the temporal and the nasal peripheries of the lens. For example, in Asian Ethnicities, the SPH power, or the SPH equivalent power, at both the temporal and the nasal peripheries of the power profile of the lens in at least one eccentricity of each part (i.e. nasal/temporal) is higher than in Caucasians.

The following Tables 8-9 show specific and non-limiting examples of different horizontal peripheral ADD profiles (in Diopters, D) at the temporal periphery of the lens (i.e. corresponding to the nasal retina) in combinations with four age groups, Rx, Asian ethnicity and parental myopia:

TABLE 8

| Asian Ethnicities, Nasal Retinal Periphery | | | |
|---|---|---|---|
| | Nasal Retinal eccentricity | | |
| Age Group | 10-15° | 20-25° | 30-35° |
| 4-6 y (prevention lens) | Low parental myopia: 0.10-0.25 | Low parental myopia: 0.25-0.50 | Low parental myopia: 0.50-0.75 |
| | Medium parental myopia: 0.25-0.50 | Medium parental myopia: 0.50-0.75 | Medium parental myopia: 0.75-1.00 |
| | High parental myopia: 0.50-0.75 | High parental myopia: 0.75-1.25 | High parental myopia: 1.00-1.50 |
| 6-9 y | Low parental myopia: 0.10-0.25 | Low parental myopia: 0.25-0.50 | Low parental myopia: 0.50-0.75 |
| | Medium parental myopia: 0.25-0.50 | Medium parental myopia: 0.50-0.75 | Medium parental myopia: 0.75-1.00 |
| | High parental myopia: 0.50-0.75 | High parental myopia: 0.75-1.25 | High parental myopia: 1.00-1.50 |
| 10-12 y | Low parental myopia: 0.10-0.25 | Low parental myopia: 0.50-0.75 | Low parental myopia: 0.75-1.50 |
| | Medium parental myopia: 0.25-0.50 | Medium parental myopia: 0.75-1.00 | Medium parental myopia: 1.25-2.00 |
| | High parental myopia: 0.50-1.00 | High parental myopia: 1.00-1.50 | High parental myopia: 1.75-2.50 |

TABLE 8-continued

| | Asian Ethnicities, Nasal Retinal Periphery | | |
|---|---|---|---|
| | Nasal Retinal eccentricity | | |
| Age Group | 10-15° | 20-25° | 30-35° |
| 13-16 y | Low parental myopia: 0.25-0.50<br>Medium parental myopia: 0.50-0.75<br>High parental myopia: 0.75-1.25 | Low parental myopia: 0.75-1.50<br>Medium parental myopia: 1.25-2.00<br>High parental myopia: 1.75-2.50 | Low parental myopia: 1.50-2.25<br>Medium parental myopia: 2.00-2.75<br>High parental myopia: 2.50-4.00 |

TABLE 9

| | Asian Ethnicities, Nasal Retinal Periphery | | |
|---|---|---|---|
| | Nasal Retinal eccentricity | | |
| Age Group | 10-15° | 20-25° | 30-35° |
| 4-6 y (prevention lens) | Low parental myopia: 0.10-0.25<br>Medium parental myopia: 0.25-0.75<br>High parental myopia: 0.75-1.00 | Low parental myopia: 0.25-0.50<br>Medium parental myopia: 0.50-1.00<br>High parental myopia: 1.00-2.00 | Low parental myopia: 0.50-1.00<br>Medium parental myopia: 0.75-2.00<br>High parental myopia: 1.50-3.00 |
| 6-9 y | Low parental myopia: 0.10-0.25<br>Medium parental myopia: 0.25-1.00<br>High parental myopia: 0.50-1.50 | Low parental myopia: 0.25-0.50<br>Medium parental myopia: 0.50-1.00<br>High parental myopia: 0.75-2.00 | Low parental myopia: 0.50-1.00<br>Medium parental myopia: 0.75-2.00<br>High parental myopia: 1.00-2.50 |
| 10-12 y | Low parental myopia: 0.10-0.25<br>Medium parental myopia: 0.25-1.00<br>High parental myopia: 0.50-2.00 | Low parental myopia: 0.50-0.75<br>Medium parental myopia: 0.75-1.50<br>High parental myopia: 1.00-2.50 | Low parental myopia: 0.75-1.50<br>Medium parental myopia: 1.25-2.50<br>High parental myopia: 1.75-3.00 |
| 13-16 y | Low parental myopia: 0.25-0.50<br>Medium parental myopia: 0.50-1.00<br>High parental myopia: 0.75-2.00 | Low parental myopia: 0.75-1.50<br>Medium parental myopia: 1.25-2.50<br>High parental myopia: 2.00-4.00 | Low parental myopia: 1.50-2.25<br>Medium parental myopia: 2.00-2.75<br>High parental myopia: 2.50-5.00 |

Tables 10-11 below show specific and non-limiting examples of different horizontal peripheral ADD profiles (in Diopters, D) at the nasal periphery of the lens (i.e., corresponding to the temporal retina) in combinations with Rx, parental myopia and Asian ethnicity.

TABLE 10

| | Asian Ethnicities, Temporal Retinal Periphery | | |
|---|---|---|---|
| | Temporal Retinal eccentricity | | |
| Rx Group | 10-15° | 20-25° | 30-35° |
| Below −3D | Low parental myopia: 0.10-0.25<br>Medium parental myopia: 0.25-0.50<br>High parental myopia: 0.50-0.75 | Low parental myopia: 0.25-0.50<br>Medium parental myopia: 0.50-0.75<br>High parental myopia: 0.75-1.50 | Low parental myopia: 0.75-1.00<br>Medium parental myopia: 1.00-1.75<br>High parental myopia: 1.50-2.50 |
| −3D and above | Low parental myopia: 0.10-0.50<br>Medium parental myopia: 0.25-0.75<br>High parental myopia: 0.50-1.00 | Low parental myopia: 0.25-0.50<br>Medium parental myopia: 0.50-1.00<br>High parental myopia: 0.75-2.00 | Low parental myopia: 0.50-1.00<br>Medium parental myopia: 0.75-1.50<br>High parental myopia: 1.00-3.00 |

TABLE 11

Asian Ethnicities, Temporal Retinal Periphery

| Rx Group | Temporal Retinal eccentricity | | |
|---|---|---|---|
| | 10-15° | 20-25° | 30-35° |
| Below −3D | Low parental myopia: 0.10-0.25 | Low parental myopia: 0.25-0.50 | Low parental myopia: 0.75-1.00 |
| | Medium parental myopia: 0.25-0.50 | Medium parental myopia: 0.50-0.75 | Medium parental myopia: 1.00-1.75 |
| | High parental myopia: 0.50-0.75 | High parental myopia: 0.75-2.00 | High parental myopia: 1.50-3.50 |
| −3D and above | Low parental myopia: 0.10-0.75 | Low parental myopia: 0.25-0.75 | Low parental myopia: 0.50-2.50 |
| | Medium parental myopia: 0.50-1.00 | Medium parental myopia: 0.50-1.50 | Medium parental myopia: 2.00-3.50 |
| | High parental myopia: 0.75-1.50 | High parental myopia: 1.00-2.50 | High parental myopia: 3.00-5.00 |

Table 12 below shows a specific and non-limiting example of different horizontal peripheral ADD profiles (in Diopters, D) at the temporal periphery of the lens in combinations with age, Caucasian ethnicity and parental myopia:

TABLE 12

Caucasian Ethnicities, Nasal Retinal Periphery

| Age Group | Nasal Retinal eccentricity | | |
|---|---|---|---|
| | 10-15° | 20-25° | 30-35° |
| 4-6 y (prevention lens) | Low parental myopia: 0.10-0.25 | Low parental myopia: 0.25-0.50 | Low parental myopia: 0.50-0.75 |
| | Medium parental myopia: 0.25-0.50 | Medium parental myopia: 0.50-0.75 | Medium parental myopia: 0.75-1.00 |
| | High parental myopia: 0.50-0.75 | High parental myopia: 0.75-1.00 | High parental myopia: 1.00-1.25 |
| 6-9 y | Low parental myopia: 0.10-0.25 | Low parental myopia: 0.25-0.50 | Low parental myopia: 0.50-0.75 |
| | Medium parental myopia: 0.25-0.50 | Medium parental myopia: 0.50-0.75 | Medium parental myopia: 0.75-1.00 |
| | High parental myopia: 0.50-0.75 | High parental myopia: 0.75-1.00 | High parental myopia: 1.00-1.25 |
| 10-12 y | Low parental myopia: 0.10-0.25 | Low parental myopia: 0.50-0.75 | Low parental myopia: 0.75-1.25 |
| | Medium parental myopia: 0.25-0.50 | Medium parental myopia: 0.75-1.00 | Medium parental myopia: 1.25-1.50 |
| | High parental myopia: 0.50-1.00 | High parental myopia: 1.00-1.25 | High parental myopia: 1.50-1.75 |
| 13-16 y | Low parental myopia: 0.25-0.50 | Low parental myopia: 0.75-1.50 | Low parental myopia: 1.00-1.75 |
| | Medium parental myopia: 0.50-0.75 | Medium parental myopia: 1.25-1.75 | Medium parental myopia: 1.50-2.00 |
| | High parental myopia: 0.75-1.25 | High parental myopia: 1.75-2.25 | High parental myopia: 2.00-2.50 |

Table 13 below shows a specific and non-limiting example of different horizontal peripheral ADD profiles (in Diopters, D) at the nasal periphery of the lens in combination with Rx, parental myopia and Caucasian ethnicity:

TABLE 13

Caucasian Ethnicities, Temporal Retinal Periphery

| Rx Group | Temporal Retinal eccentricity | | |
|---|---|---|---|
| | 10-15° | 20-25° | 30-35° |
| Below −3D | Low parental myopia: 0.00-0.10 | Low parental myopia: 0.10-0.25 | Low parental myopia: 0.25-0.50 |

TABLE 13-continued

Caucasian Ethnicities, Temporal Retinal Periphery

| Rx Group | Temporal Retinal eccentricity | | |
|---|---|---|---|
| | 10-15° | 20-25° | 30-35° |
| −3D and above | Medium parental myopia: 0.10-0.25<br>High parental myopia: 0.25-0.50<br>Low parental myopia: 0.10-0.50<br>Medium parental myopia: 0.25-0.50<br>High parental myopia: 0.50-1.00 | Medium parental myopia: 0.25-0.50<br>High parental myopia: 0.50-1.00<br>Low parental myopia: 0.25-0.50<br>Medium parental myopia: 0.50-0.75<br>High parental myopia: 0.75-1.50 | Medium parental myopia: 0.50-1.00<br>High parental myopia: 1.00-1.50<br>Low parental myopia: 0.50-0.75<br>Medium parental myopia: 0.75-1.50<br>High parental myopia: 1.50-2.00 |

The inventors found that right or left handedness may also affect the peripheral refraction profile and at least one peripheral optical property of the right and/or left lens respectively. It seems that the handedness of an individual may influence the positioning of an individual with respect to a content to be read, inducing a certain distance between a certain eye (corresponding to the handedness) and the content to be read. Table 14 below shows a specific and non-limiting example of different horizontal peripheral ADD profiles (in Diopters, D) at the temporal periphery of the lens (i.e., corresponding to the nasal retina) of each eye (RE, LE) in combinations with age, Asian ethnicity and right-handedness.

TABLE 14

Asian Ethnicities, Right-Handedness

| | Retinal eccentricity | | |
|---|---|---|---|
| Age Group | Right Eye Nasal 20-25° | Right Eye Nasal 30-35° | Left Eye Nasal 30-35° |
| Less than 10 y | 1.50-2.50 | 2.50-3.50 | 2.00-3.00 |
| 10 y and above | 2.00-3.00 | 3.50-4.50 | 3.00-4.00 |

Tables 15A-15B below show specific and non-limiting examples of different horizontal peripheral ADD profiles (in Diopters, D) at the temporal periphery of the lens (Table 15A i.e., corresponding to the nasal retina) and at the nasal periphery of the lens (Table 15B i.e., corresponding to the temporal retina) that may be implemented in lenses of children with different baseline parameters relating to a combination of a plurality of measurable parameters i.e. ethnicity, age, refractive error and parental myopia.

TABLE 15A

Retinal Peripheries

| | | Retinal eccentricity | | |
|---|---|---|---|---|
| Age Group | Type of treatment | Nasal 10-15° | Nasal 20-25° | Nasal 30-35° |
| Example A: An Asiatic 13-year-old child with a refractive error of −4.50D (Sphere Equivalent) with a medium parental myopia | Myopia Control Lens | 0.75 | 1.75 | 2.75 |
| Example B: An Asiatic 5-year-old child with a refractive error of +0.50D (Sphere Equivalent) with a high parental myopia | Myopia Prevention Lens | 0.50 | 1.00 | 1.50 |
| Example C: A Caucasian 8-year-old child with a refractive error of −3.00D (Sphere Equivalent) with a medium parental myopia | Myopia Control Lens | 0.25 | 0.75 | 1.00 |

TABLE 15B

Retinal Peripheries

| | | Retinal eccentricity | | |
|---|---|---|---|---|
| Age Group | Type of treatment | Temporal 10-15° | Temporal 20-25° | Temporal 30-35° |
| Example A: An Asiatic 13-year-old child with a refractive error of −4.50D (Sphere Equivalent) with a medium parental myopia | Myopia Control Lens | 0.50 | 1.50 | 2.50 |
| Example B: An Asiatic 5-year-old child with a refractive error of +0.50D (Sphere Equivalent) with a high parental myopia | Myopia Prevention Lens | 0.50 | 1.00 | 1.50 |

TABLE 15B-continued

| | | Retinal Peripheries | | |
| --- | --- | --- | --- | --- |
| | | | Retinal eccentricity | |
| Age Group | Type of treatment | Temporal 10-15° | Temporal 20-25° | Temporal 30-35° |
| Example C: A Caucasian 8-year-old child with a refractive error of −3.00D (Sphere Equivalent) with a medium parental myopia | Myopia Control Lens | 0.25 | 0.75 | 1.00 |

The processing unit of FIG. 3 may also be configured and operable to determine an optical property of a non-central position on a lens according to the eye's Rx and the measurable parameter of the individual. In this case, memory 304 of FIG. 3 is configured and operable to store a database including preselected data indicative of peripheral optical property as a function of at least one measurable parameter, data analyzer 306 is configured and operable to correlate between at least one measurable parameter and at least one peripheral optical property and data output utility 308 is configured and operable to provide a lens optical property profile defining a central optical zone having an optical correction according to the Rx of the eye and at least one peripheral zone providing at least one peripheral optical property being configured to focus far images in front of the peripheral retina. As described above with respect to FIG. 11, data analyzer 306 of FIG. 3 may be configured and operable to correlate between at least one measurable parameter and at least one peripheral optical property by machine learning.

Data analyzer 306 of FIG. 3 may also be configured and operable to determine the parental myopia by identifying a plurality of parental parameters including at least one of existence of myopia in at least one parent, a level of myopia of at least one parent, a certain amount of myopia of at least one parent, or an overall parental myopia parameter being a scaled parameter of each parental parameter, as described above with respect to FIG. 11. Data analyzer 306 of FIG. 3 may also be configured and operable to determine the optical property profile by correlating between the eye's Rx and a peripheral optical property at at least one peripheral zone, as described above with respect to FIG. 11.

Figure 12A:
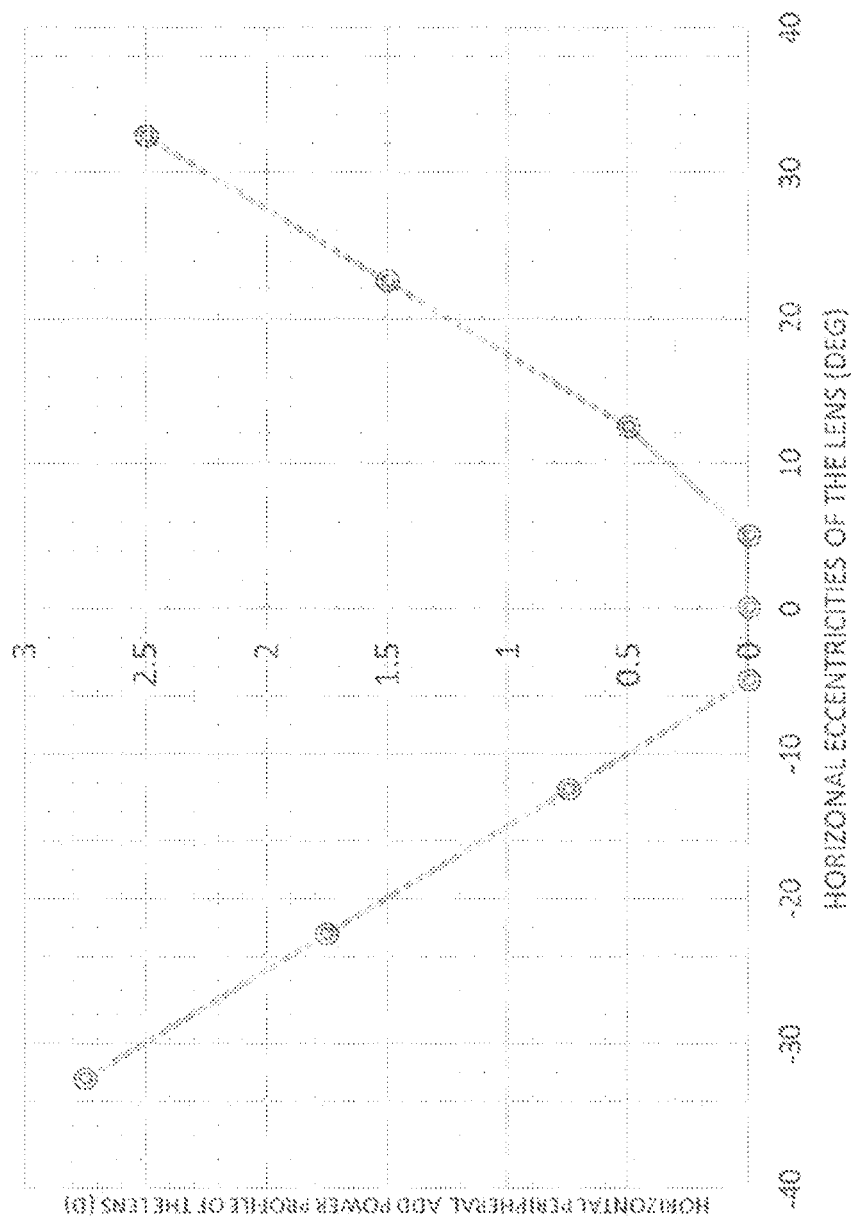
FIGS. 12A-12C show three different examples of schematic representations of horizontal power profiles of three different lenses fitted according to the teachings of the presently disclosed subject-matter.
Figure 12B:
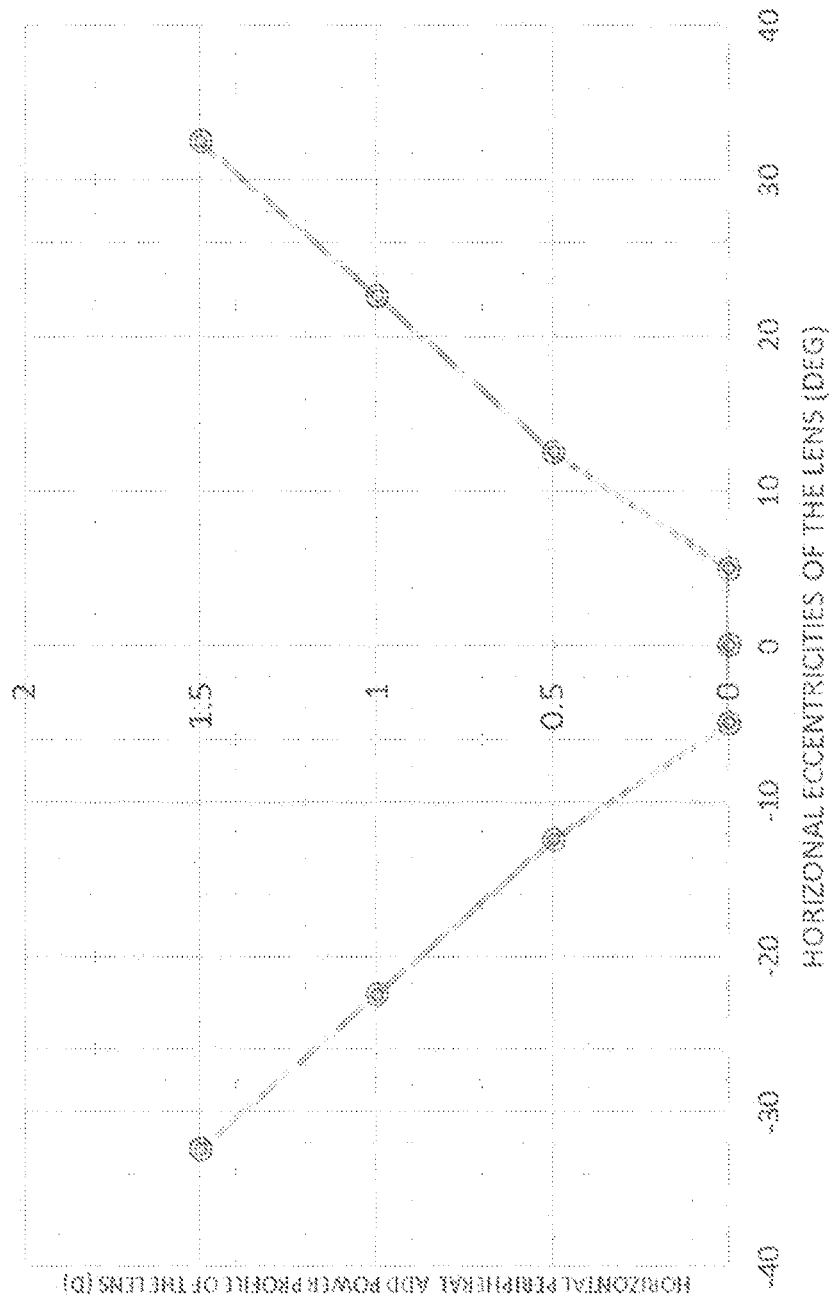
Figure 12C:
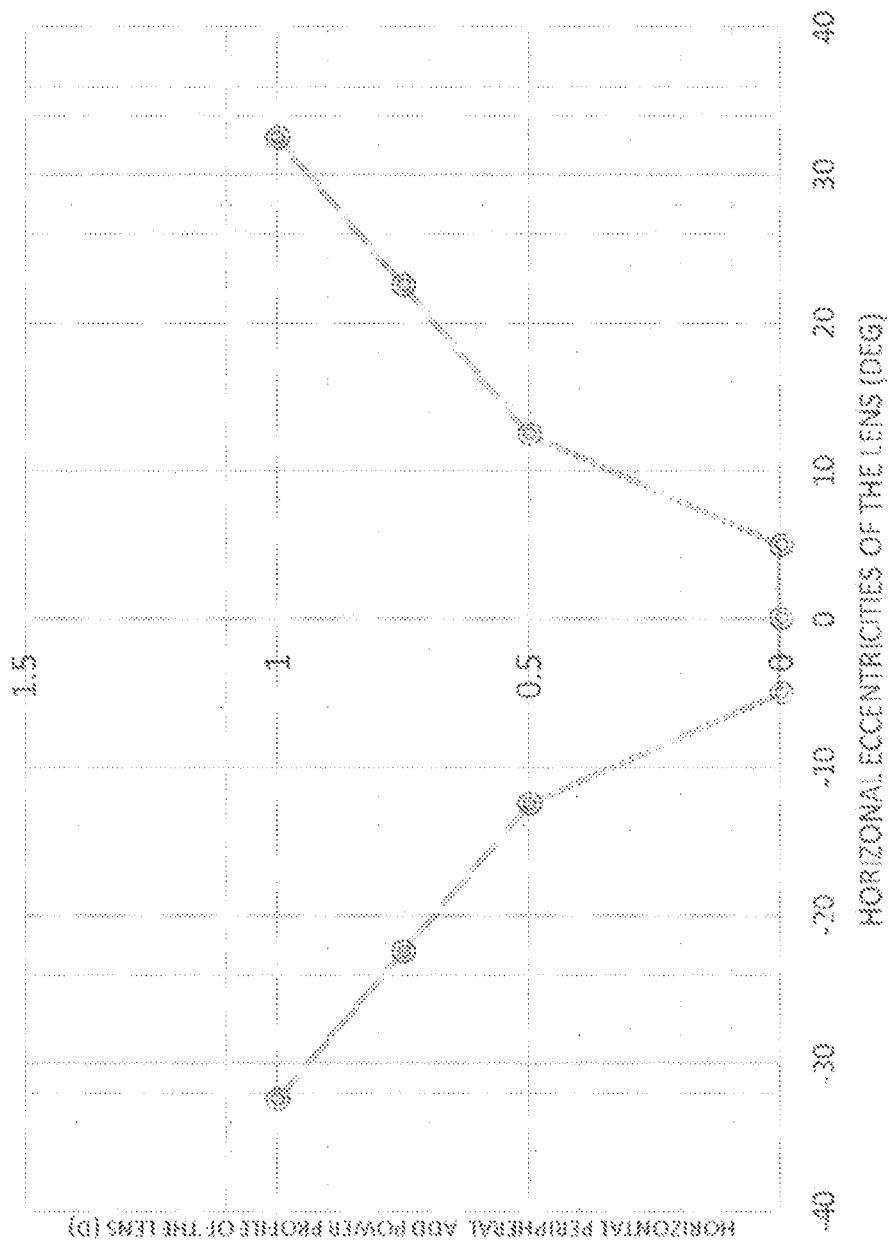

Reference is made to FIGS. 12A-12C showing schematic presentations of horizontal power profiles of three different lenses fitted according to the examples A, B and C of Tables 15A-15B above respectively. The negative values show the temporal periphery of the lens when the positive values show the nasal periphery of the lens.

Tables 16A-16B below shows specific and non-limiting examples of different horizontal peripheral ADD profiles (in Diopters, D) at the temporal periphery of the lens (Table 16A i.e., corresponding to the nasal retina) and at the nasal periphery of the lens (Table 16B i.e., corresponding to the temporal retina) that can be implemented in lenses of children with different baseline parameters relating to a combination of measurable parameters including solely age and refractive error.

TABLE 16A

| | | Retinal Peripheries | | |
| --- | --- | --- | --- | --- |
| | | | Retinal eccentricity | |
| Age Group | Type of treatment | Nasal 10-15° | Nasal 20-25° | Nasal 30-35° |
| Example A: A 7-year-old child with a refractive error of −1.50D (Sphere Equivalent) | Myopia Control Lens | 0.25 | 1.00 | 2.00 |
| Example B: A 14-year-old child with a refractive error of −5D (Sphere Equivalent) | Myopia Control Lens | 0.75 | 2.00 | 4.00 |

TABLE 16B

| | | Retinal Peripheries | | |
| --- | --- | --- | --- | --- |
| | | | Retinal eccentricity | |
| Age Group | Type of treatment | Temporal 10-15° | Temporal 20-25° | Temporal 30-35° |
| Example A: A 7-year-old child with a refractive error of −1.50D (Sphere Equivalent) | Myopia Control Lens | 0.25 | 1.00 | 2.00 |
| Example B: A 14-year-old child with a refractive error of −5D (Sphere Equivalent) | Myopia Control Lens | 0.75 | 2.00 | 4.00 |

Figure 13A:
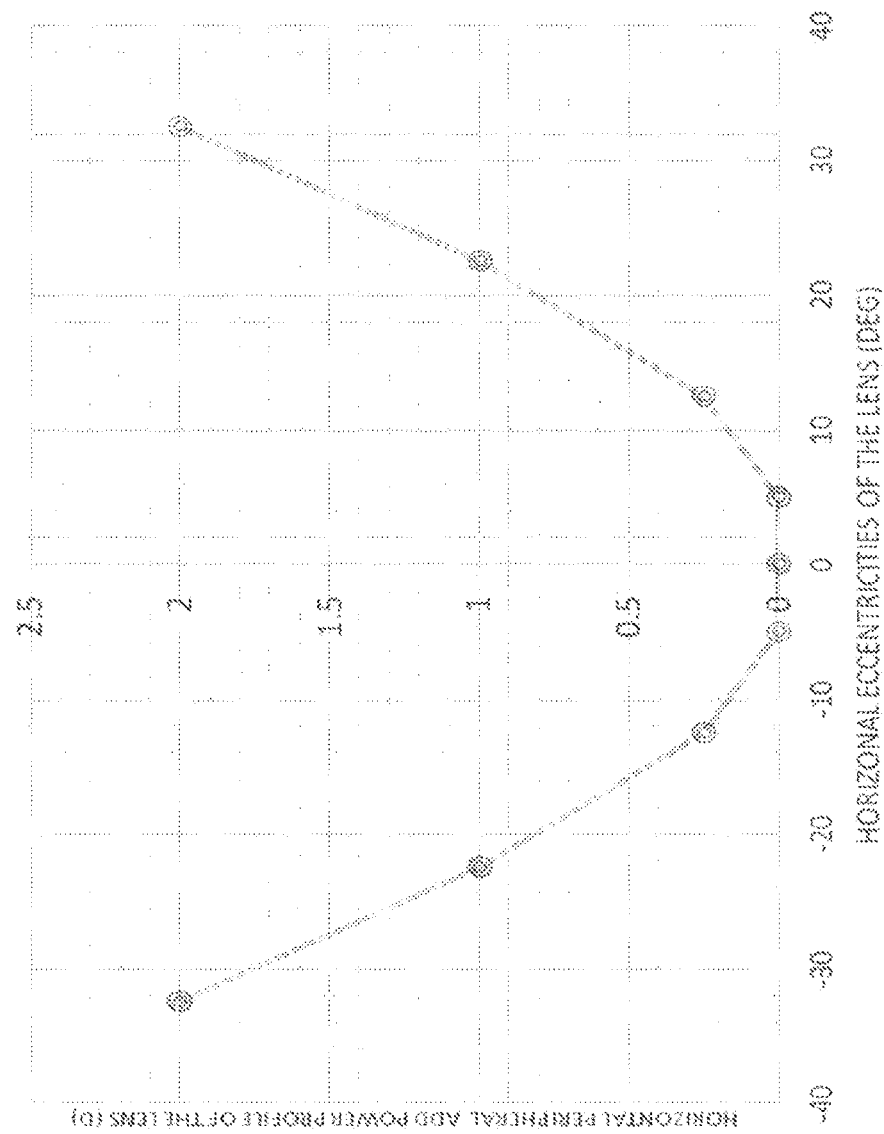
FIGS. 13A-13B show three different examples of schematic representations of horizontal power profiles of three different lenses fitted according to the teachings of the presently disclosed subject-matter.
Figure 13B:
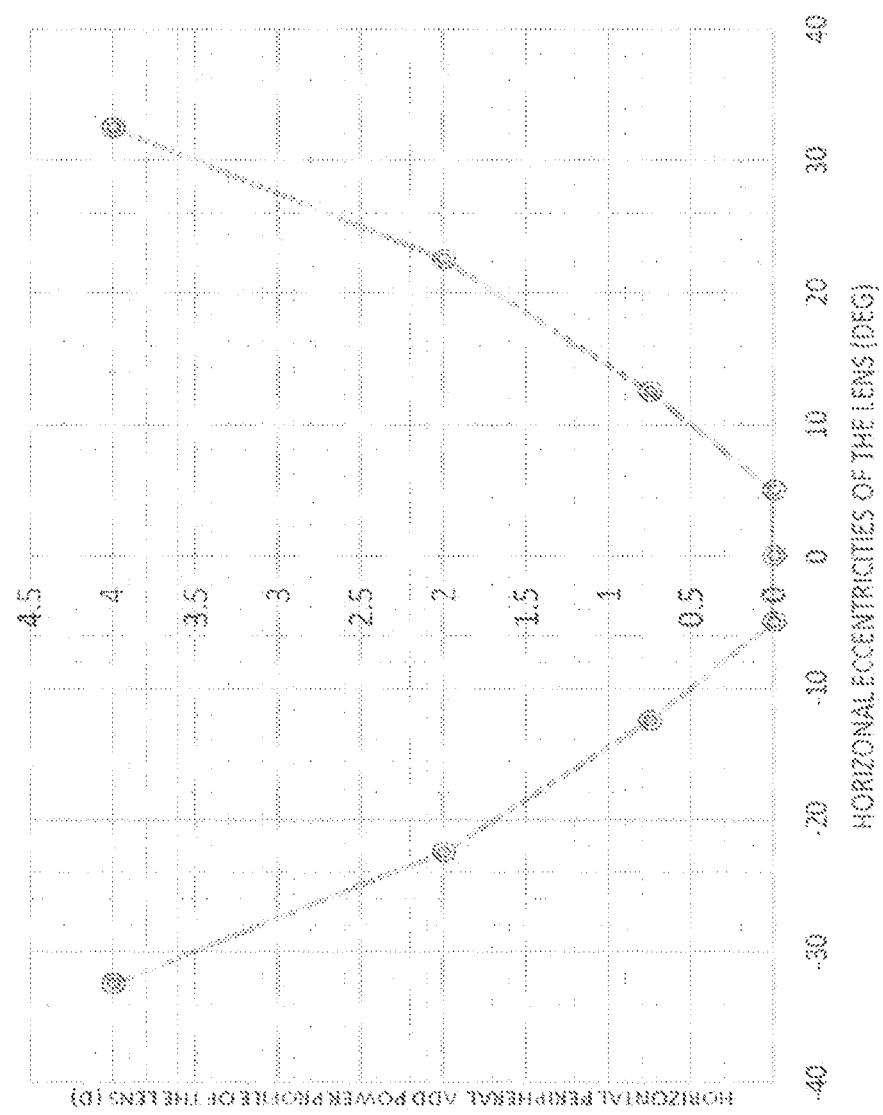

Reference is made to FIGS. 13A-13B showing schematic representations of horizontal power profiles of three different lenses fitted according to the examples A, B and C of Tables 16A-16B above respectively. The negative values show the temporal periphery of the lens when the positive values show the nasal periphery of the lens.

EMBODIMENTS

1. An ophthalmic lens for affecting progression of myopia in an eye of an individual having a certain prescription (Rx), the lens comprising an optical property profile defining (1) a central optical zone having an optical correction according to the Rx of the eye and (2) temporal and/or nasal zones providing at least one peripheral optical property being configured to focus far images in front of the nasal peripheral retina and/or on the temporal peripheral retina respectively, wherein the at least one peripheral optical property is determined by correlating between an individual's age or age group and at least one peripheral optical property.

2. The lens of embodiment 1, wherein determining the correlation between an individual's age or age group and at least one peripheral optical property comprises determining at least one change in relative peripheral refraction along horizontal eccentricities of a retinal periphery including the nasal periphery and/or the temporal periphery of the retina in different age groups.

3. The lens of embodiment 1 or 2, wherein the peripheral nasal optical property is determined by correlating between an individual's age or age group and a peripheral nasal optical property, the peripheral temporal optical property is determined by correlating between the eye's Rx and the peripheral optical property at the temporal retina.

4. The lens of any one of embodiments 1 to 3, wherein said optical property is determined using statistical methods based on at least one of the individual's age, age group or the eye's Rx.

5. The lens of any one of embodiments 1 to 4, wherein said optical property profile is determined by correlating between the eye's Rx and a peripheral optical property at either the nasal or temporal retina, wherein the prescription comprises optical parameters including at least one of sphere power, cylinder power, add power, prismatic power or axis value, and wherein the at least one peripheral optical property comprises optical parameters including at least one of sphere value, cylinder power, cylinder axis, at at least one point on the temporal and/or nasal zone.

6. The lens of embodiment 5, wherein determining the correlation between the eye's Rx and a peripheral optical property comprises determining at least one change in relative peripheral refraction along the temporal periphery of the retina as a function of Rx sphere equivalent.

7. The lens of embodiment 5 or 6, wherein the at least one peripheral optical property comprises correction of the axis value such that the axis value converges to about 90 degrees at either nasal or temporal periphery.

8. The lens of embodiment 7, wherein the axis value is in a range of about 80 degrees to 120 degrees at the nasal periphery and in a range of about 60 degrees to 100 degrees at the temporal periphery.

9. The lens of any one of embodiments 1 to 8, wherein the temporal periphery zone is configured to have a first peripheral lens power and the nasal periphery zone is configured to have a second peripheral lens power being determined according to the eye's Rx such that the optical property defines an asymmetry across the lens.

10. A method comprising: obtaining a prescription (Rx) of at least one eye; obtaining an age of the individual; and determining an optical property of a non-central position on a lens according to the eye's Rx and the age of the individual.

11. The method of embodiment 10, further comprising measuring a prescription (Rx) of at least one eye.

12. The method of embodiment 10 or 11, further comprising providing a lens with the optical property.

13. The method of any one of embodiments 10 to 12, wherein said determining of the optical property comprises providing an optical property defining (1) a central optical zone with an optical correction according to the eye's Rx and (2) temporal and/or nasal zones providing at least one peripheral optical property being configured to focus far images in front of the nasal peripheral retina and/or on the temporal peripheral retina respectively.

14. The method of any one of embodiments 10 to 13, wherein said determining of the optical property comprises correlating between an individual's age and at least one peripheral optical property.

15. The method of embodiment 14, wherein correlating between an individual's age and at least one peripheral optical property comprises determining at least one change in relative peripheral refraction along horizontal eccentricities of a retinal periphery including the nasal periphery or the temporal periphery of the retina in different age groups.

16. The method of any one of embodiments 10 to 15, wherein said determining of the optical property comprises using statistical methods based on the individual's age and/or the eye's Rx.

17. The method of any one of embodiments 13 to 16, wherein said determining of the optical property comprises correlating between the eye's Rx and at least one of peripheral optical property at either the nasal or temporal retina, wherein the prescription comprises optical parameters including at least one of sphere power, cylinder power, add power, prismatic power or axis value and, wherein the at least one peripheral optical property comprises optical parameters including at least one of sphere value, cylinder power, cylinder axis, at at least one point on the temporal and/or nasal zone.

18. The method of embodiment 17, wherein defining the at least one peripheral optical property comprises defining a correction of the axis value such that the axis value converges to about 90 degrees at either nasal or temporal periphery.

19. The method of embodiment 18, wherein the axis value is in a range of about 80 degrees to 120 degrees at the nasal periphery and in a range of about 60 degrees to 100 degrees at the temporal periphery.

20. The method of any one of embodiments 13 to 19, wherein determining the peripheral nasal optical property comprises correlating between an individual's age or age group and a peripheral nasal optical property and determining the peripheral temporal optical property comprises correlating between the eye's Rx and the peripheral optical property at the temporal retina.

21. The method of any one of embodiments 10 to 20, wherein determining the optical property comprises determining a first lens power of the temporal zone and a second lens power of the nasal zone according to the eye's Rx such that the optical property defines an asymmetry across the lens.

22. An ophthalmic lens for affecting the progression of myopia in an eye of an individual having a certain prescription (Rx), the lens comprising an optical profile defining (1) a central optical zone having an optical correction according to the eye's Rx and (2) temporal and/or nasal zones providing at least one peripheral optical property being configured to focus far images in front of the nasal peripheral retina and/or on the temporal peripheral retina respectively, wherein the at least one peripheral optical property is determined by at least one of correlating between at least one parameter and a peripheral optical property at either the nasal or temporal retina or determining a correction of an axis value of at least one peripheral optical property, such that the axis value converges to about 90 degrees at either nasal or temporal periphery.

23. The lens of embodiment 22, wherein the at least one parameter comprises at least one of an individual's age, age group, the eye's Rx or at least one measurable parameter affecting the peripheral refraction profile.

24. The lens of embodiment 22 or 23, wherein the prescription comprises optical parameters including at least one of sphere power, cylinder power, add power, prismatic power or axis value, and wherein the at least one peripheral optical property comprises optical parameters including at least one of sphere value, cylinder power, cylinder axis, at at least one point on the temporal and/or nasal zone.

25. The lens of embodiment 23 or 24, wherein determining the correlation between the eye's Rx and a peripheral optical property comprises determining at least one change in relative peripheral refraction along the temporal periphery of the retina as a function of Rx sphere equivalent.

26. The lens of any one of embodiments 22 to 25, wherein the temporal periphery zone is configured to have a first peripheral lens power and the nasal periphery zone is configured to have a second peripheral lens power being determined according to the eye's Rx such that the optical property defines an asymmetry across the lens.

27. The lens of any one of embodiments 22 to 26, wherein the at least one peripheral optical property is determined by correlating between an individual's age or age group and a peripheral optical property.

28. The lens of any one of embodiments 22 to 27, wherein the at least one peripheral optical property is determined using statistical methods based on at least one of the individual's age, age group, or the eye's Rx.

29. The lens of any one of embodiments 22 to 28, wherein the axis value is in a range of about 80 degrees to 120 degrees at the nasal periphery and in a range of about 60 degrees to 100 degrees at the temporal periphery.

30. A method comprising: obtaining a prescription of at least one eye wherein the prescription comprises optical parameters including at least one of sphere power, cylinder power, add power, prismatic power or axis value; determining at least one peripheral optical property of a lens according to the eye's Rx, wherein the at least one peripheral optical property comprises at least one optical parameter including at least one of sphere value, cylinder power, cylinder axis, at at least one point on the temporal and/or nasal zone, wherein determining the at least one peripheral optical property comprises correlating between the eye's Rx and a peripheral optical property at either the nasal or temporal retina.

31. The method of embodiment 30, further comprising measuring a prescription (Rx) of at least one eye.

32. The method of embodiment 30 or embodiment 31, further comprising providing a lens with the optical property.

33. The method of any one of embodiments 30 to 32, wherein determining the correlation between the eye's Rx and a peripheral optical property comprises determining at least one change in relative peripheral refraction along the temporal periphery of the retina as a function of Rx sphere equivalent.

34. The method of any one of embodiments 30 to 33, wherein determining the optical property comprises determining a first lens power of the temporal zone according to an individual's age or age group, and a second lens power of the nasal zone according to the eye's Rx.

35. The method of any one of embodiments 30 to 34, wherein determining the optical property comprises using statistical methods based on the individual's age or age group and/or the eye's Rx.

36. The method of any one of embodiments 30 to 35, wherein the at least one peripheral optical property comprises correction of the axis value such that the axis value converges to about 90 degrees at either nasal or temporal periphery.

37. The method of embodiment 36, wherein the axis value is in a range of about 80 degrees to 120 degrees at the nasal periphery and in a range of about 60 degrees to 100 degrees at the temporal periphery.

38. An ophthalmic lens for affecting the progression of myopia in an eye of an individual having a certain prescription (Rx), the lens comprising an optical property defining (1) a central optical zone having an optical correction according to the Rx of the eye and (2) temporal and/or nasal zones providing at least one peripheral optical property being configured to focus far images in front of the nasal peripheral retina and/or on the temporal retina respectively, wherein the at least one peripheral optical property comprises correction of an axis value, such that the axis value converges to about 90 degrees at either nasal or temporal periphery.

39. The lens of embodiment 38, wherein the axis value is in a range of about 80 degrees to 120 degrees at the nasal periphery and in a range of about 60 degrees to 100 degrees at the temporal periphery.

40. A method comprising: obtaining a prescription (Rx) of at least one eye; and determining at least one optical property of a lens by providing a correction of an axis value, such that the axis value converges to about 90 degrees at either nasal or temporal periphery.

41. The method of embodiment 40, further comprising measuring a prescription (Rx) of at least one eye.

42. The method of embodiment 40 or embodiment 41, further comprising providing a lens with the optical property.

43. The method of any one of embodiments 40 to 42, wherein the axis value is in a range of about 80 degrees to 120 degrees at the nasal periphery and in a range of about 60 degrees to 100 degrees at the temporal periphery.

44. The method of any one of embodiments 40 to 43, wherein said determining of the optical property comprises providing an optical property defining (1) a central optical zone with an optical correction according to the eye's Rx and (2) temporal and/or nasal zones providing at least one peripheral optical property being configured to focus far images in front of the nasal peripheral retina and/or on the temporal peripheral retina respectively.

45. A processing unit for providing an individualized lens optical property profile, the processing unit comprising a data input utility being configured and operable to receive a certain prescription (Rx) of an individual and the individual's age, a memory being configured and operable to storing database including preselected data indicative of peripheral optical property as a function of an individual's age or age group, a data processing utility being configured and operable to correlate between an individual's age or age group and at least one peripheral optical property, and a data output utility being configured and operable to provide a lens optical property profile defining a central optical zone having an optical correction according to the Rx of the eye and temporal and/or nasal zones providing at least one peripheral optical property being configured to focus far images in front of the nasal peripheral retina and/or on the temporal retina respectively.

46. The processing unit of embodiment 45, wherein said data processing utility is configured and operable to determine at least one change in relative peripheral refraction along horizontal eccentricities of a retinal periphery including the nasal periphery and/or the temporal periphery of the retina in different age groups.

47. The processing unit of embodiment 45 or 46, wherein said data processing utility is configured and operable to correlate between an individual's age or age group and at least one peripheral optical property by machine learning.

48. A processing unit for providing an individualized lens optical property profile, the processing unit comprising a data input utility being configured and operable to receive a certain prescription (Rx) of an individual, a memory being configured and operable to store a database including preselected data indicative of peripheral optical property as a function of Rx, a data processing utility adapted and being configured and operable to correlate between the eye's Rx and a peripheral optical property at either the nasal or temporal retina, and a data output utility being configured and operable to provide a lens optical property profile defining a central optical zone having an optical correction according to the Rx of the eye and temporal and/or nasal zones providing at least one peripheral optical property being configured to focus far images in front of the nasal peripheral retina and/or on the temporal peripheral retina respectively.

49. The processing unit of embodiment 48, wherein said data processing utility is configured and operable to determine the correlation between the eye's Rx and a peripheral optical property and which comprises determining at least one change in relative peripheral refraction along the temporal periphery of the retina as a function of Rx sphere equivalent.

50. The processing unit of embodiment 48 or 49, wherein said data processing utility is configured and operable to determine an asymmetry across the lens by calculating a difference in a cylinder power along horizontal eccentricities in a retinal periphery.

51. The processing unit of embodiment 50, wherein said data processing utility is configured and operable to correlate between the difference in the cylinder power along horizontal eccentricities of a retinal periphery including the nasal periphery or the temporal periphery of the retina and the Rx.

52. An ophthalmic lens for affecting progression of myopia in an eye of an individual having a certain prescription (Rx), the lens comprising an optical property profile defining a central optical zone having an optical correction according to the Rx of the eye and at least one peripheral zone providing at least one peripheral optical property being configured to focus far images in front of the peripheral retina, wherein the at least one peripheral optical property is determined by correlating between at least one measurable parameter affecting the peripheral refraction profile and at least one peripheral optical property.

53. The lens of embodiment 52, wherein the at least one measurable parameter comprises at least one of geographic area of living, type of environment, age of myopia onset, time spent outdoors, parental myopia, age of the individual, handedness or ethnicity.

54. The lens of embodiment 53, wherein the parental myopia is determined by a plurality of parental parameters including at least one of existence of myopia in at least one parent, a level of myopia of at least one parent, a certain amount of myopia of at least one parent, or an overall parental myopia parameter being a scaled parameter of each parental parameter.

55. The lens of any one of embodiments 52 to 54, wherein the peripheral optical property comprises a horizontal power profile.

56. The lens of any one of embodiments 52 to 55, wherein the optical property profile is determined by correlating between the eye's Rx and a peripheral optical property at at least one peripheral zone, wherein the Rx comprises optical parameters including sphere power, cylinder power, axis and also optionally prismatic power, and wherein the at least one peripheral optical properties comprise optical parameters including sphere value, cylinder power and cylinder axis, at at least one point on the peripheral zone.

57. The lens of any one of embodiments 52 to 56, wherein the at least one peripheral zone comprises temporal and/or nasal zones providing at least one peripheral optical property being configured to focus far images in front of the nasal peripheral retina and/or in front of the temporal peripheral retina respectively.

58. The lens of any one of embodiments 52 to 57, wherein the correlation between at least one measurable parameter and at least one peripheral optical property comprises determining at least one change in relative peripheral power profile along horizontal eccentricities of a retinal periphery including the nasal periphery and/or the temporal periphery of the retina in different measurable parameters.

59. A method comprising: obtaining a certain prescription (Rx) of at least one eye; obtaining at least one measurable parameter of an individual; and determining an optical property of a non-central position on a lens according to the eye's Rx and the measurable parameter of the individual.

60. The method of embodiment 59, wherein the at least one measurable parameter comprises at least one of geographic area of living, type of environment, age of myopia onset, time spent outdoors, parental myopia, age of the individual, handedness or ethnicity.

61. The method of embodiment 60, further comprising determining the parental myopia by identifying a plurality of parental parameters including at least one of existence of myopia in at least one parent, a level of myopia of at least one parent, a certain amount of myopia of at least one parent, or an overall parental myopia parameter being a scaled parameter of each parental parameter.

62. The method of embodiment 61, further comprising measuring a certain prescription (Rx) of at least one eye.

63. The method of any one of embodiments 59 to embodiment 62, further comprising providing a lens with the optical property.

64. The method of any one of embodiments 59 to 63, wherein said determining of the optical property comprises providing an optical property defining a central optical zone with an optical correction according to the eye's Rx and at least one peripheral zone providing at least one peripheral optical property being configured to focus far images in front of the peripheral retina.

65. The method of embodiment 64, wherein the peripheral optical property comprises a horizontal power profile.

66. The method of embodiment 64 or embodiment 65, wherein said determining of the optical property comprises correlating between at least one measurable parameter and at least one peripheral optical property.

67. The method of embodiment 66, wherein said determining of the optical property comprises correlating between the eye's Rx and at least one of peripheral refraction at the peripheral retina, wherein the Rx comprises optical parameters including sphere power, cylinder power, axis and also optionally prismatic power and, wherein the at least one peripheral optical property comprises optical parameters including sphere value, cylinder power and cylinder axis, at at least one point on the at least one peripheral zone.

68. The method of any one of embodiments 64 to 67, wherein the at least one peripheral zone comprises temporal and/or nasal zones providing at least one peripheral optical property being configured to focus far images in front of the nasal peripheral retina and/or on the temporal peripheral retina respectively.

69. The method of any one of embodiments 66 to 68, wherein determining the correlation between at least one measurable parameter and at least one peripheral optical property comprises determining at least one change in relative peripheral defocus profile along horizontal eccentricities of a retinal periphery including the nasal periphery and/or the temporal periphery of the retina in different measurable parameters.

70. A processing unit for providing an individualized lens optical property profile, the processing unit comprising a data input utility being configured and operable to receive a certain prescription (Rx) of an individual and the individual's age, a memory being configured and operable to storing database including preselected data indicative of peripheral optical property as a function of at least one measurable parameter, a data processing utility being configured and operable to correlate between at least one measurable parameter and at least one peripheral optical property, and a data output utility being configured and operable to provide a lens optical property profile defining a central optical zone having an optical correction according to the Rx of the eye and at least one peripheral zone providing at least one peripheral optical property being configured to focus far images in front of the peripheral retina.

71. The processing unit of embodiment 70, wherein said data processing utility is configured and operable to correlate between at least one measurable parameter and at least one peripheral optical property by machine learning.

72. The processing unit of embodiment 70 or embodiment 71, wherein the at least one measurable parameter comprises at least one of geographic area of living, type of environment, age of myopia onset, time spent outdoors, parental myopia, handedness, or ethnicity.

73. The processing unit of embodiment 72, wherein said data processing utility is configured and operable to determine the parental myopia by identifying a plurality of parental parameters including at least one of existence of myopia in at least one parent, a level of myopia of at least one parent, a certain amount of myopia of at least one parent, or an overall parental myopia parameter being a scaled parameter of each parental parameter.

74. The processing unit of any one of embodiments 70 to 73, wherein the peripheral optical property comprises a horizontal power profile.

75. The processing unit of any one of embodiments 70 to 74, further comprising determining the optical property profile by correlating between the eye's Rx and a peripheral optical property at at least one peripheral zone, wherein the Rx comprises optical parameters including sphere power, cylinder power, axis and also optionally prismatic power, and wherein the at least one peripheral optical properties comprises optical parameters including sphere value, cylinder power and cylinder axis, at at least one point on the peripheral zone.

76. The processing unit of any one of embodiments 70 to 75, wherein the at least one peripheral zone comprises temporal and/or nasal zones providing at least one peripheral optical property being configured to focus far images in front of the nasal peripheral retina and/or in front of the temporal peripheral retina respectively.

77. The processing unit of any one of embodiments 70 to 76, wherein determining the correlation between at least one measurable parameter and at least one peripheral optical property comprises determining at least one change in relative peripheral power profile along horizontal eccentricities of a retinal periphery including the nasal periphery and/or the temporal periphery of the retina in different measurable parameters.

The invention claimed is:

1. An ophthalmic lens for affecting progression of myopia in an eye of an individual having a certain prescription (Rx) and being of a certain age, the lens comprising an optical property profile, being determined based on said certain prescription and said certain age of the individual, said optical property profile defining (1) a central optical zone having an optical correction according to the prescription of the eye and (2) at least one peripheral zone, being temporal and/or nasal zones providing at least one peripheral optical property of the lens according to the prescription of the eye and the age of the individual, and being configured to focus far images in front of a nasal peripheral retina and/or in front of a temporal peripheral retina respectively, wherein the at least one peripheral optical property is defined based on preselected data indicative of the at least one peripheral optical property as a function of the individual's age or age group and correlation between the individual's age and at least one peripheral optical property, which is implemented by determining at least one change in relative peripheral refraction along horizontal eccentricities of a retinal periphery including nasal periphery and/or temporal periphery of the retina in different age groups.

2. The lens of claim 1, wherein the at least one peripheral optical property comprises correction of a cylinder axis value such that the cylinder axis value converges to about 90 degrees at either nasal or temporal periphery.

3. The lens of claim 1, wherein a cylinder axis value is in a range of about 80 degrees to 120 degrees at the nasal periphery and in a range of about 60 degrees to 100 degrees at the temporal periphery.

4. The lens of claim 1, wherein the temporal periphery zone is configured to have a first peripheral lens power and the nasal periphery zone is configured to have a second peripheral lens power being determined according to the eye's prescription such that the optical property defines an asymmetry across the lens.

5. A method for designing a spectacle lens for affecting progression of myopia in an individual for the purpose of manufacturing the lens, the method being implemented by a computer and comprising:
obtaining a prescription (Rx) of at least one eye of the individual;
obtaining an age of the individual; and
utilizing said prescription and said age of the individual for determining an optical property profile of the lens, said determining of the optical property profile of the lens comprising:
defining a central optical zone with an optical correction according to the prescription of the eye;
defining at least one peripheral zone, including temporal and/or nasal zones, providing at least one peripheral optical property of the lens according to the eye's prescription and the age of the individual, said at least one peripheral optical property being configured to focus far images in front of nasal peripheral retina and/or in front of a temporal peripheral retina respectively, wherein said providing comprises utilizing preselected data indicative of the at least one peripheral optical property as a function of the individual's age or age group and correlating between the age of said individual and at least one peripheral optical property, wherein said correlating comprises determining at least one change in relative peripheral refraction along horizontal eccentricities of a retinal periphery including the nasal periphery and/or the temporal periphery of the retina in different age groups.

6. The method of claim 5, wherein said obtaining of the prescription (Rx) comprises measuring the prescription (Rx) of at least one eye.

7. The method of claim 5, wherein said determining of the optical property profile further comprises at least one of (i) using statistical methods based on the individual's age and/or the eye's prescription; ii) correlating between the eye's prescription and at least one peripheral optical property at either the nasal or temporal retina, wherein the prescription comprises optical parameters including at least one of sphere power, cylinder power, add power, prismatic power or axis value and, wherein the at least one peripheral optical property comprises optical parameters including at least one of sphere value, cylinder power, cylinder axis, at least one point on the temporal and/or nasal zone; or (iii) determining a first lens power of the temporal zone and a second lens power of the nasal zone according to the eye's prescription such that the optical property defines an asymmetry across the lens.

8. The method of claim 5, wherein providing the at least one peripheral optical property comprises defining a correction of the cylinder axis value such that the axis value converges to about 90 degrees at either nasal or temporal periphery.

9. The method of claim 8, wherein the cylinder axis value is in a range of about 80 degrees to 120 degrees at the nasal periphery and in a range of about 60 degrees to 100 degrees at the temporal periphery.

10. The method of claim 5, comprising determining peripheral nasal optical property by correlating between an individual's age or age group and a peripheral nasal optical property, and determining a peripheral temporal optical property by correlating between the eye's prescription and the peripheral optical property at the temporal retina.

11. An ophthalmic lens for affecting the progression of myopia in an eye of an individual having a certain prescription (Rx), the lens comprising an optical profile defining (1) a central optical zone having an optical correction according to the eye's prescription and (2) temporal and/or nasal zones providing at least one peripheral optical property being configured to focus far images in front of the nasal peripheral retina and/or on the temporal peripheral retina respectively, wherein the at least one peripheral optical property is determined by at least one of correlating between at least one parameter including at least one of an individual's age, age group, the eye's prescription or at least one measurable parameter affecting the peripheral refraction profile and a peripheral optical property or determining a correction of a cylinder axis value of at least one peripheral optical property, such that the cylinder axis value converges to about 90 degrees at either nasal or temporal periphery, wherein the prescription comprises optical parameters including at least one of sphere power, cylinder power, add power, prismatic power or axis value, and wherein the at least one peripheral optical property comprises optical parameters including at least one of sphere value, cylinder power, cylinder axis, at least one point on the temporal and/or nasal zone.

12. The lens of claim 11, wherein the temporal zone is configured to have a first peripheral lens power and the nasal zone is configured to have a second peripheral lens power being determined according to the eye's Rx such that the optical property defines an asymmetry across the lens.

13. The lens of claim 11, wherein the at least one measurable parameter comprises at least one of geographic area of living, type of environment, age of myopia onset, time spent outdoors, parental myopia, handedness or ethnicity.

14. The lens of claim 13, wherein the parental myopia is determined by a plurality of parental parameters including at least one of existence of myopia in at least one parent, a level of myopia of at least one parent, a certain amount of myopia of at least one parent, or an overall parental myopia parameter being a scaled parameter of each parental parameter.

15. The lens of claim 13, wherein the peripheral optical property comprises a horizontal power profile.

16. The lens of claim 13, wherein the optical property profile is determined by correlating between the eye's prescription and a peripheral optical property at least one peripheral zone.

17. The lens of claim 13, wherein the correlation between at least one measurable parameter and at least one peripheral optical property comprises determining at least one change in relative peripheral power profile along horizontal eccentricities of a retinal periphery including the nasal periphery and/or the temporal periphery of the retina in different measurable parameters.

18. An ophthalmic lens for affecting progression of myopia in an eye of an individual having a certain prescription (Rx), the lens comprising an optical property profile defining (1) a central optical zone having an optical correction according to the prescription of the eye and (2) temporal and/or nasal zones providing at least one peripheral optical property being configured to focus far images in front of the nasal peripheral retina and/or on the temporal peripheral retina respectively, wherein the at least one peripheral optical property is determined by correlating between an individual's age or age group and at least one peripheral optical property, wherein the ophthalmic lens is characterized by at least one of the following:
the at least one peripheral optical property comprises correction of a cylinder axis value of the prescription (Rx) such that the cylinder axis value converges to about 90 degrees at either nasal or temporal periphery;
the at least one peripheral optical property comprises a cylinder axis value is in a range of about 80 degrees to 120 degrees at the nasal periphery and in a range of about 60 degrees to 100 degrees at the temporal periphery; or
the temporal periphery zone is configured to have a first peripheral lens power and the nasal periphery zone is configured to have a second peripheral lens power being determined according to the eye's prescription such that the optical property defines an asymmetry across the lens.

* * * * *